United States Patent
Kim et al.

(10) Patent No.: US 12,127,202 B2
(45) Date of Patent: Oct. 22, 2024

(54) METHOD FOR TRANSMITTING OR RECEIVING UPLINK SIGNAL BETWEEN TERMINAL AND BASE STATION IN WIRELESS COMMUNICATION SYSTEM SUPPORTING UNLICENSED BAND, AND APPARATUS FOR SUPPORTING SAME

(71) Applicant: LG ELECTRONICS INC., Seoul (KR)

(72) Inventors: Seonwook Kim, Seoul (KR); Hanjun Park, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 17/266,553

(22) PCT Filed: Aug. 9, 2019

(86) PCT No.: PCT/KR2019/010087
§ 371 (c)(1),
(2) Date: Feb. 5, 2021

(87) PCT Pub. No.: WO2020/032696
PCT Pub. Date: Feb. 13, 2020

(65) Prior Publication Data
US 2021/0314938 A1 Oct. 7, 2021

Related U.S. Application Data

(60) Provisional application No. 62/716,918, filed on Aug. 9, 2018.

(51) Int. Cl.
*H04W 72/21* (2023.01)
*H04L 5/00* (2006.01)
(Continued)

(52) U.S. Cl.
CPC ............. *H04W 72/21* (2023.01); *H04L 5/001* (2013.01); *H04L 27/26025* (2021.01); *H04W 72/0453* (2013.01); *H04W 76/10* (2018.02)

(58) Field of Classification Search
CPC ......... H04W 72/0413; H04W 72/0453; H04W 76/10; H04W 16/14; H04L 5/001;
(Continued)

(56) References Cited

U.S. PATENT DOCUMENTS

2018/0124790 A1* 5/2018 Yerramalli ........ H04W 72/0453
2019/0387550 A1* 12/2019 Pan ................... H04W 74/0833
(Continued)

FOREIGN PATENT DOCUMENTS

KR    20170128120    11/2017
WO    2018026182    2/2018

OTHER PUBLICATIONS

PCT International Application No. PCT/KR2019/010087, International Search Report dated Nov. 18, 2019, 18 pages.
(Continued)

*Primary Examiner* — Sharmin Chowdhury
(74) *Attorney, Agent, or Firm* — LEE, HONG, DEGERMAN, KANG & WAIMEY

(57) ABSTRACT

The present disclosure provides a method for transmitting or receiving uplink signal between a terminal and a base station in a wireless communication system supporting an unlicensed band, and an apparatus for supporting same. According to one specific embodiment of the present disclosure, the terminal may perform, on the basis of uplink resource information received from the base station, uplink signal transmission through at least one interlace included only in a part of sub-bands among all the sub-bands included in the unlicensed band.

4 Claims, 20 Drawing Sheets

(51) Int. Cl.
  *H04L 27/26* (2006.01)
  *H04W 72/0453* (2023.01)
  *H04W 76/10* (2018.01)
(58) Field of Classification Search
  CPC ............. H04L 27/26025; H04L 1/0026; H04L
        1/0031; H04L 1/1692; H04L 5/0012;
        H04L 5/0026; H04L 5/0032; H04L
        5/0041; H04L 5/0048; H04L 5/0064;
        H04L 5/0092; H04L 27/261
  See application file for complete search history.

(56) References Cited

U.S. PATENT DOCUMENTS

| 2020/0008131 | A1* | 1/2020 | Chakraborty | H04W 16/28 |
| 2020/0119894 | A1* | 4/2020 | Jia | H04L 5/0092 |
| 2020/0196289 | A1* | 6/2020 | Jia | H04W 72/23 |
| 2021/0127411 | A1* | 4/2021 | Zhang | H04W 72/21 |
| 2021/0136767 | A1* | 5/2021 | Pitaval | H04L 5/0041 |
| 2021/0144739 | A1* | 5/2021 | Jiang | H04L 27/2613 |
| 2021/0242988 | A1* | 8/2021 | Kwak | H04L 27/26 |

OTHER PUBLICATIONS

Nokia et al., "On uplink signal and channel structures for NR-U," R1-1806107, 3GPP TSG RAN WG1 Meeting #93, May 2018, 9 pages.

Samsung, "Potential solutions and techniques for NR-U Operation," R1-1802014, 3GPP TSG RAN WG1 Meeting #92, Mar. 2018, 9 pages.

Ericsson, "On UL signals and channels," R1-1806252, 3GPP TSG-RAN WG1 Meeting #93, May 2018, 7 pages.

* cited by examiner

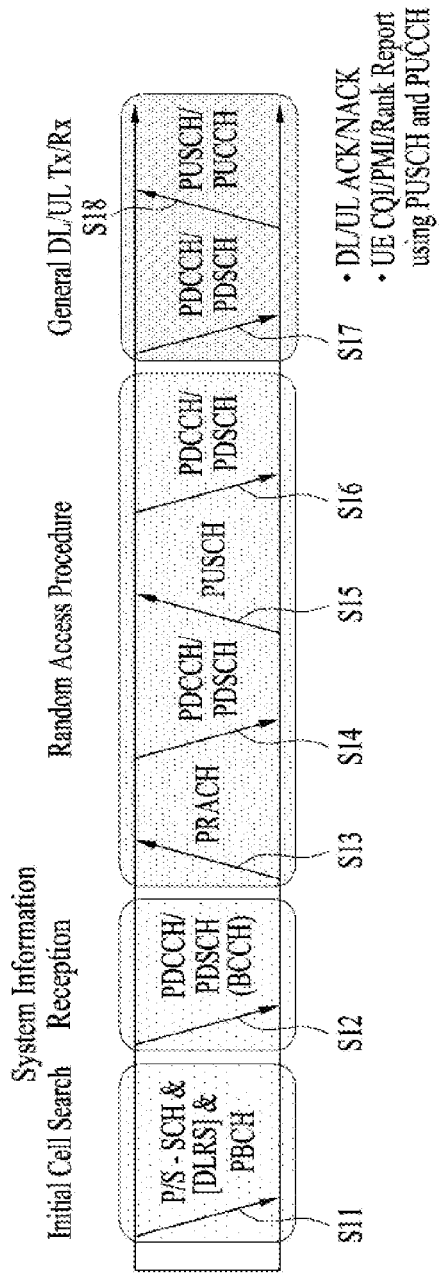
[FIG. 1]

[FIG. 2]
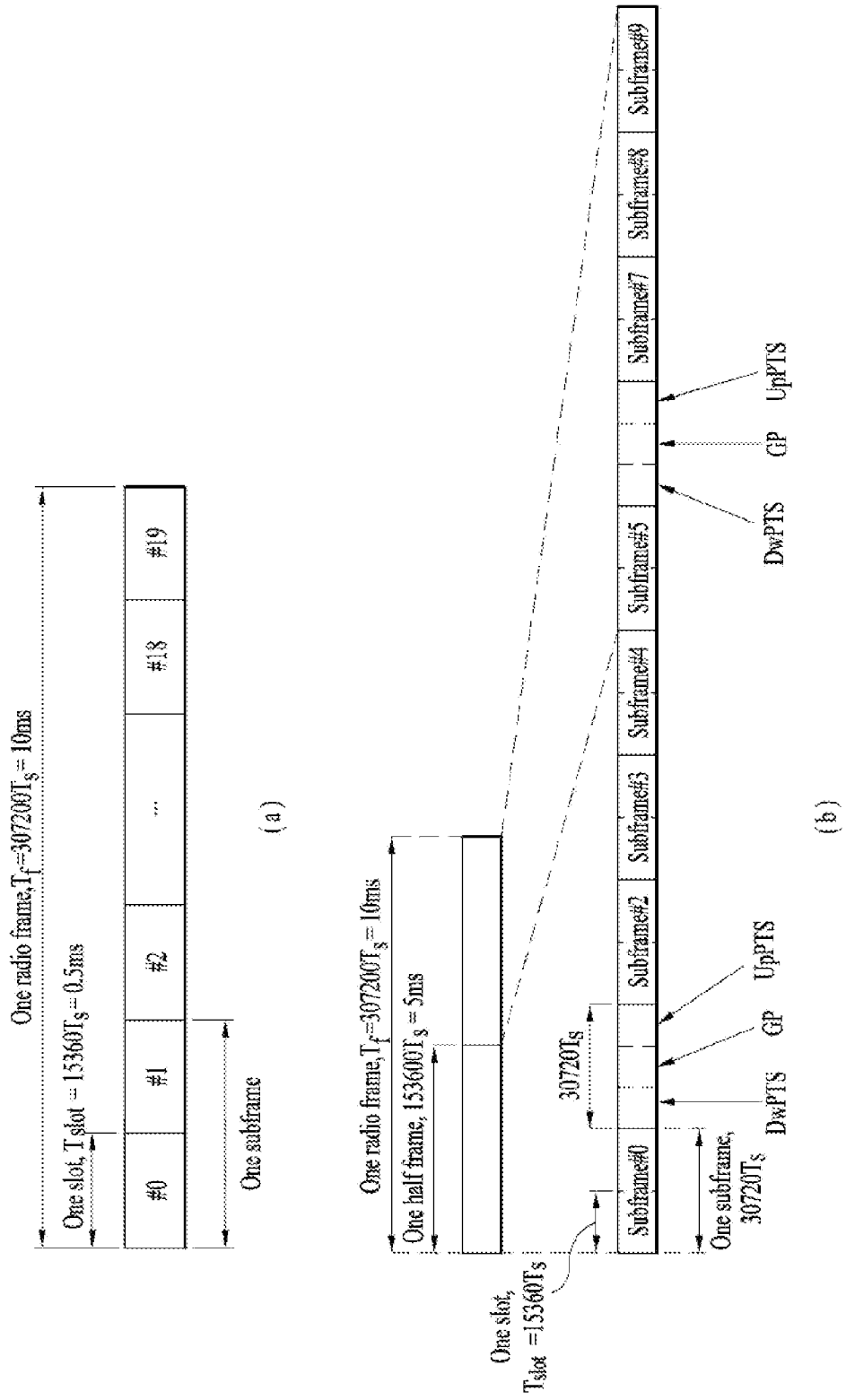

【FIG. 3】
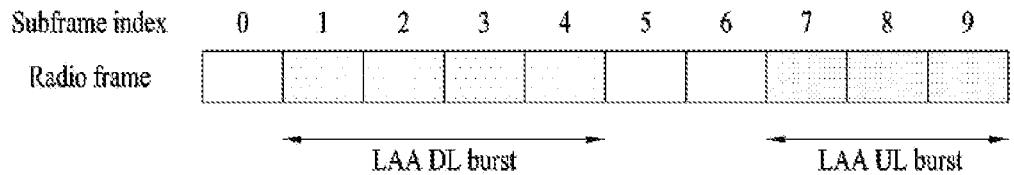
【FIG. 4】
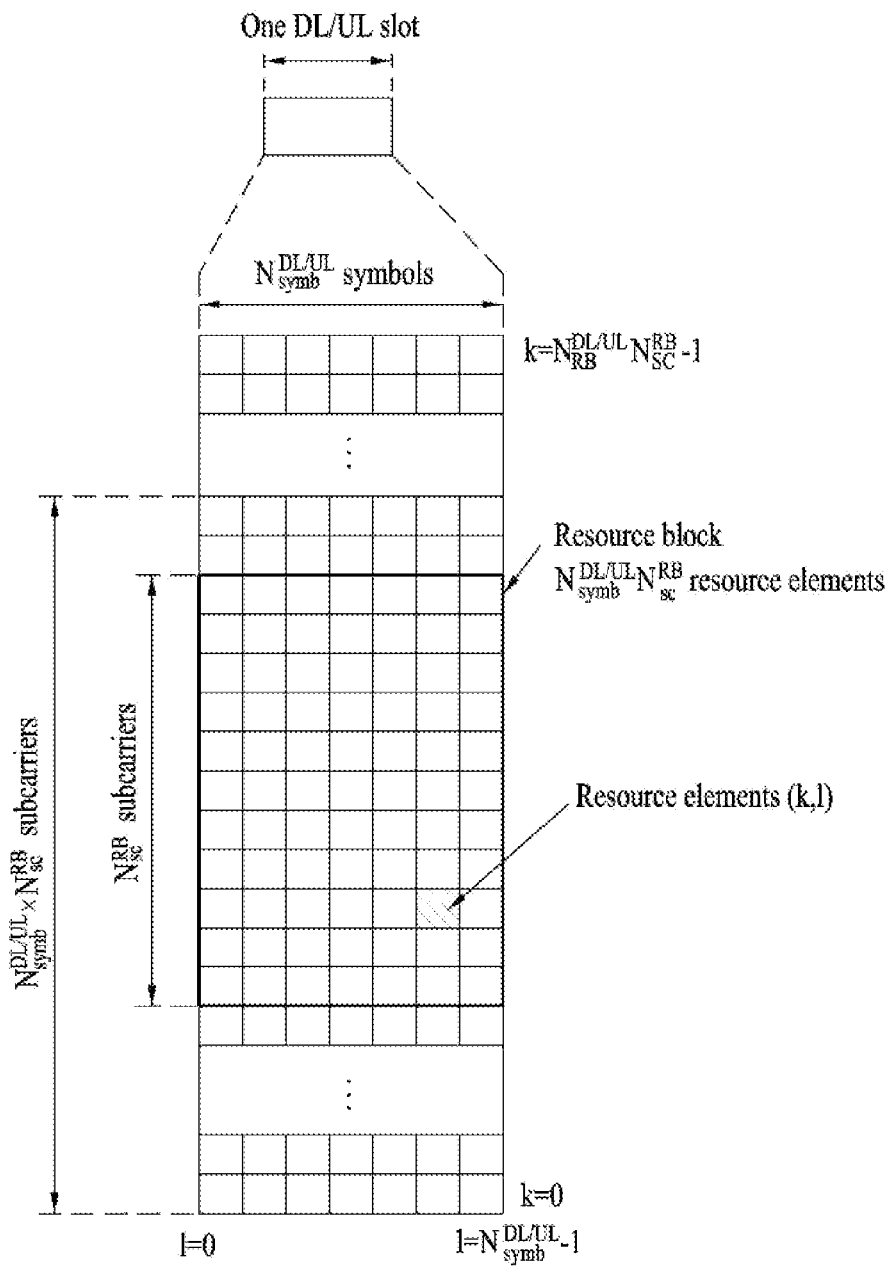

[FIG. 5]
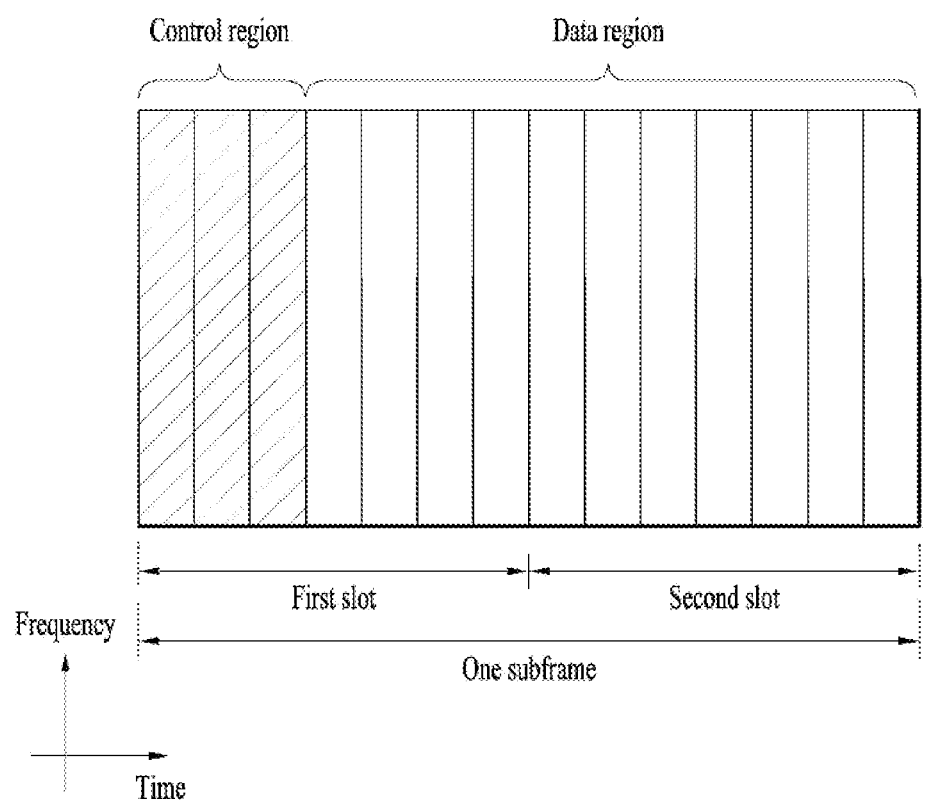

[FIG. 6]
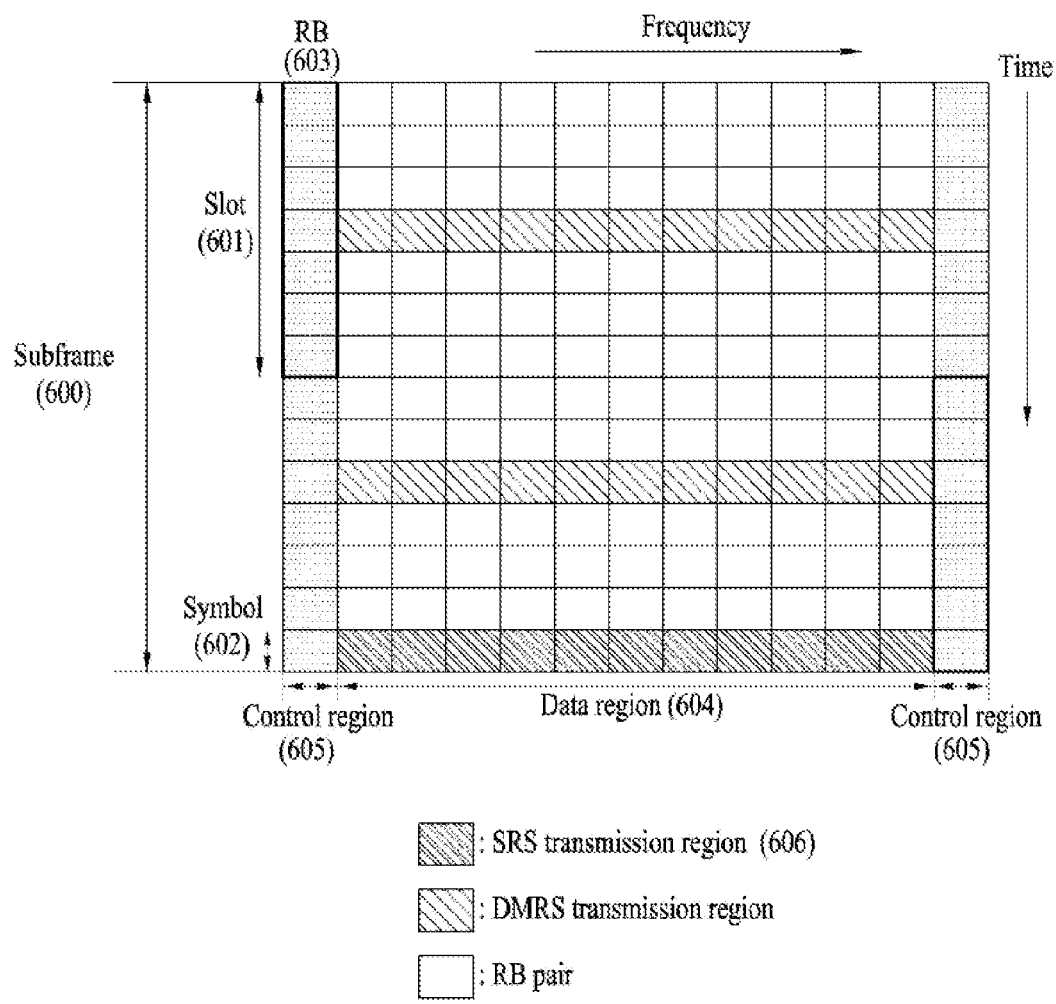

[FIG. 7]
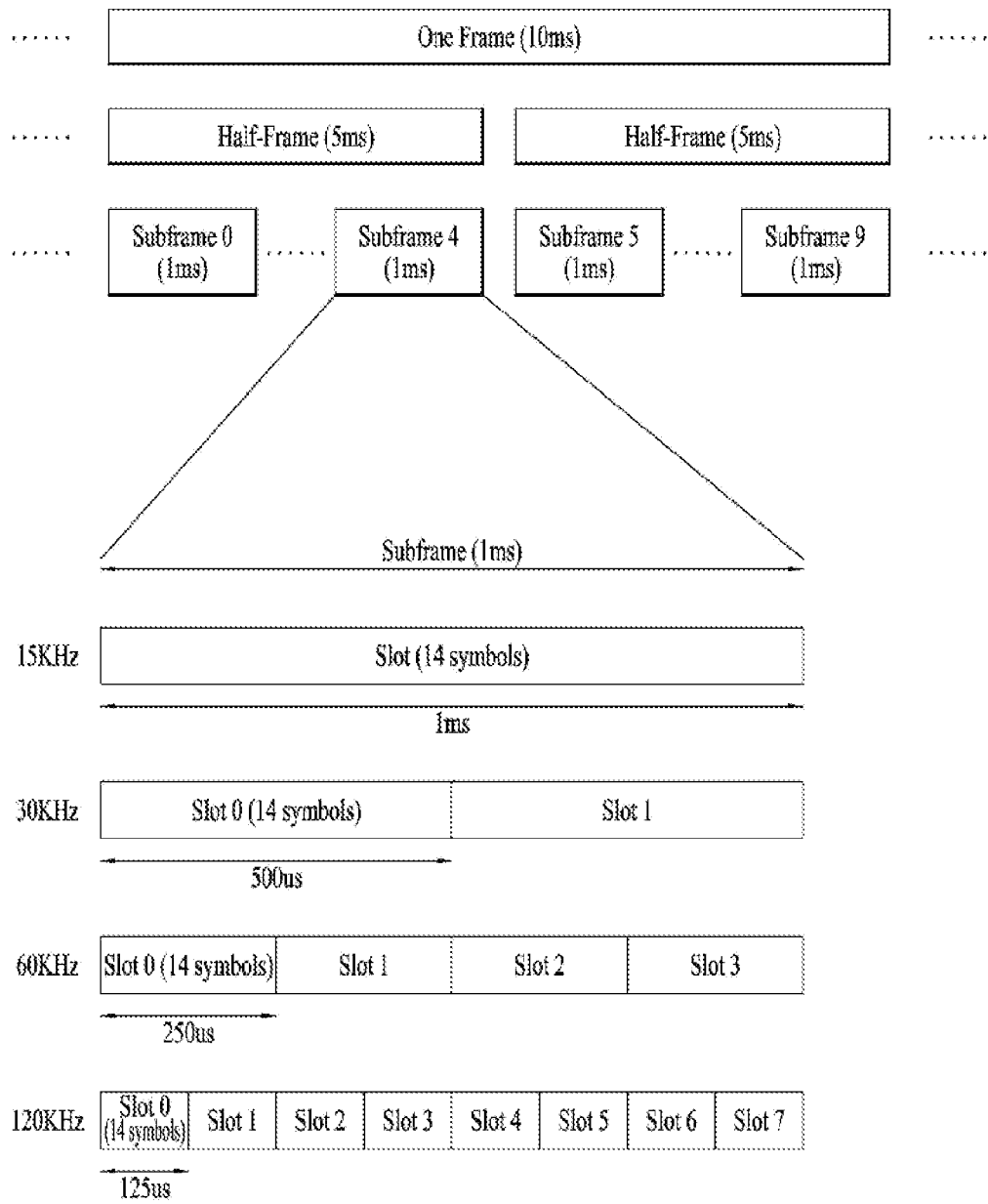

[FIG. 8]
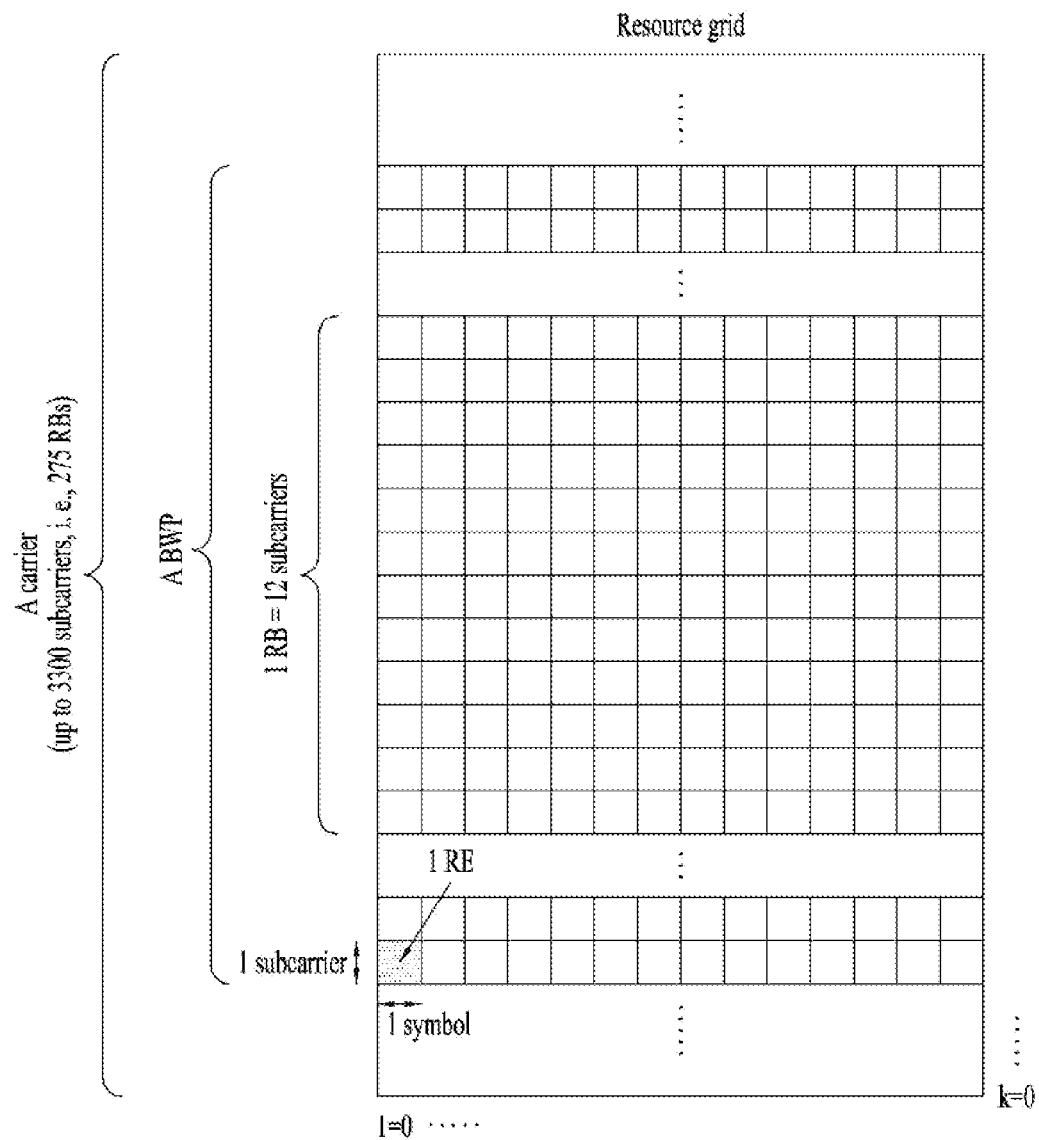

[FIG. 9]
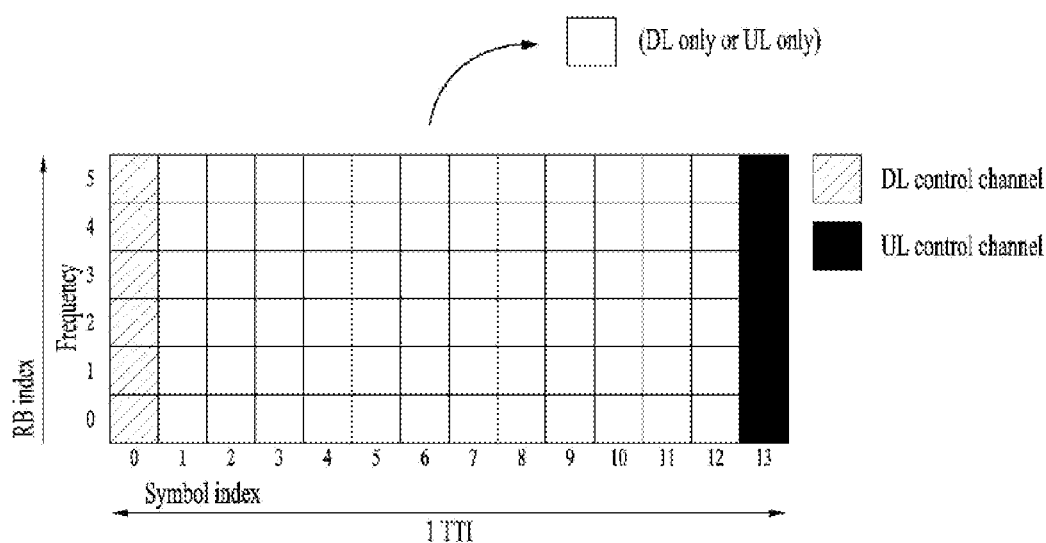
[FIG. 10]
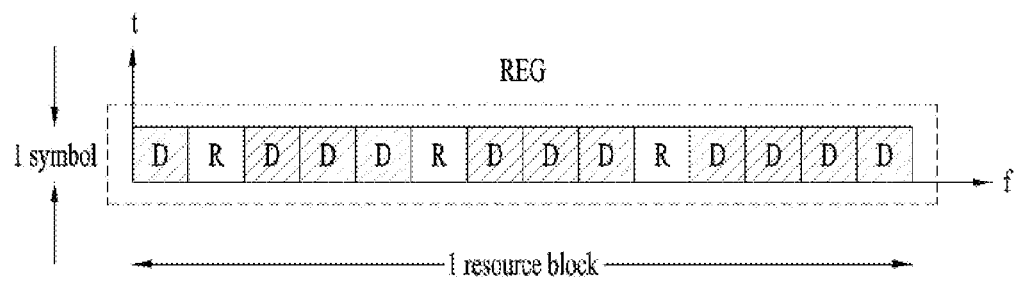

[FIG. 11]
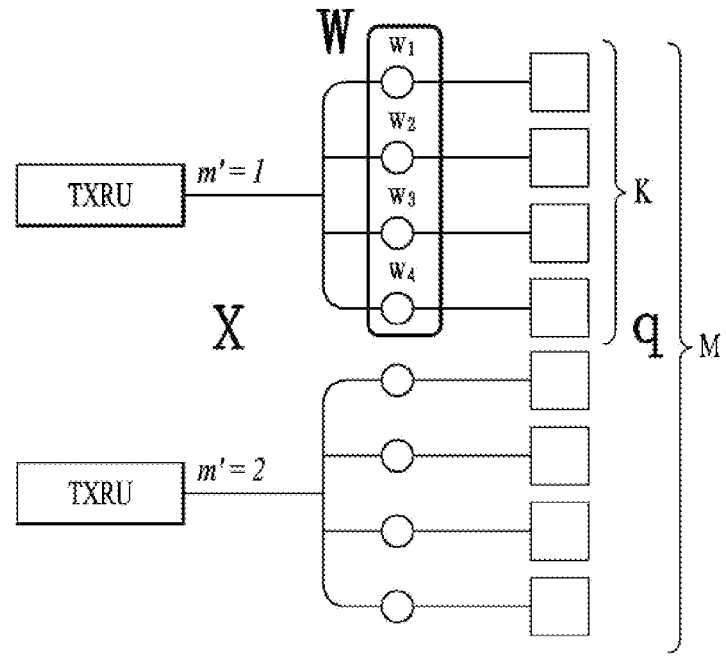
[FIG. 12]
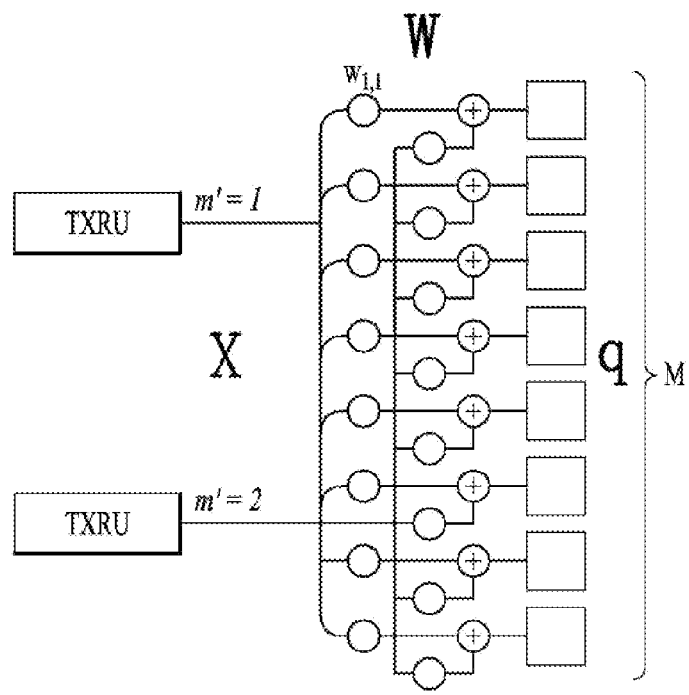

【FIG. 13】
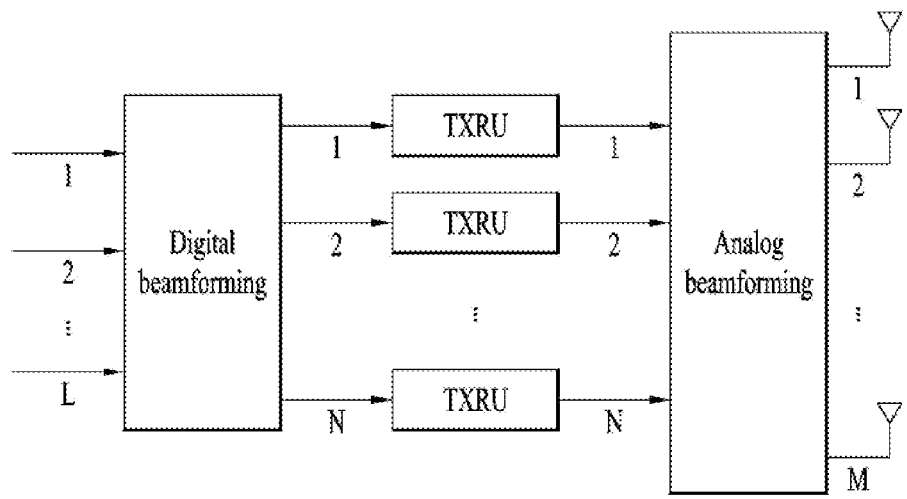
【FIG. 14】
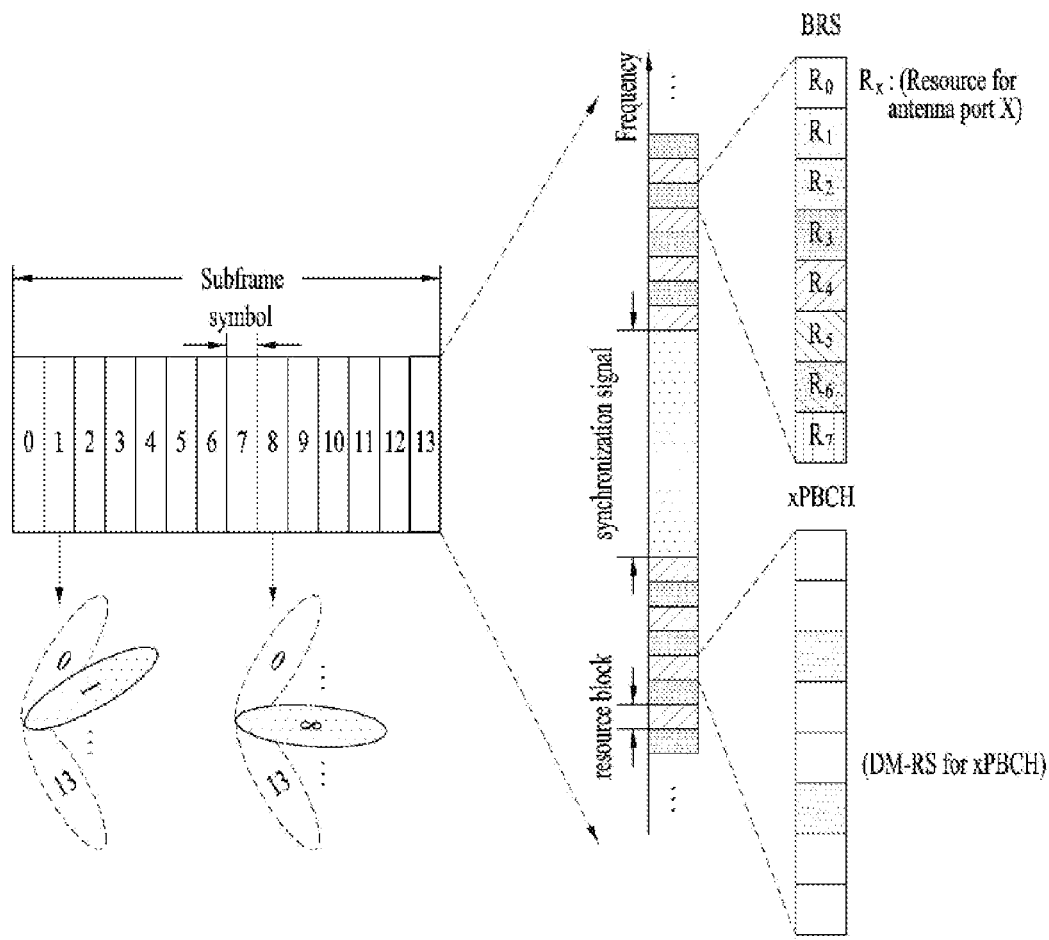

【FIG. 15】
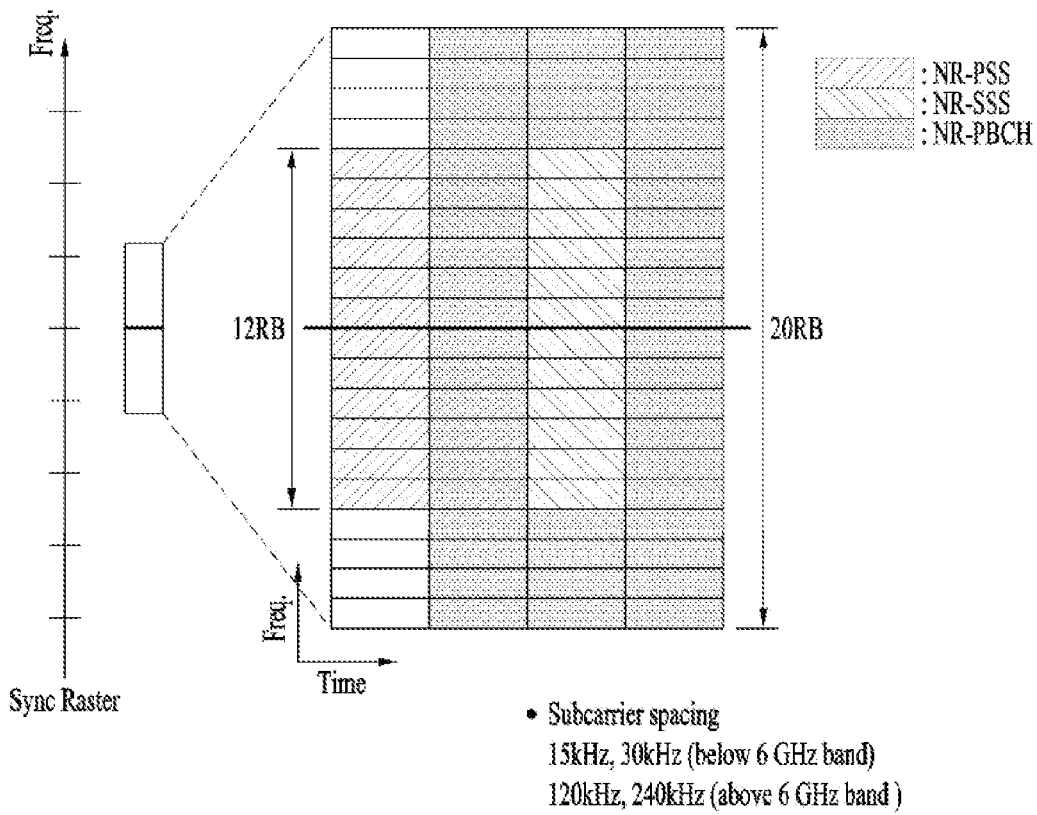
【FIG. 16】
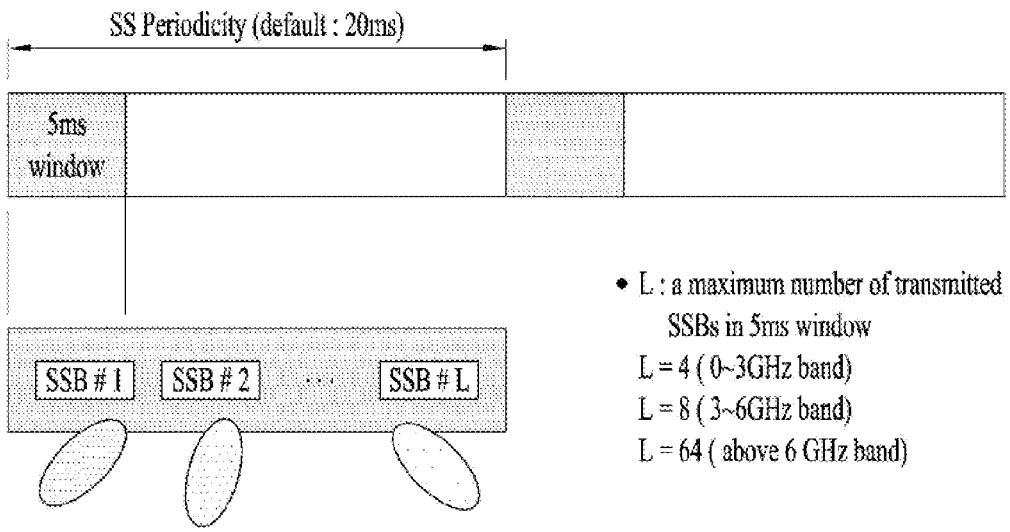

[FIG. 17]
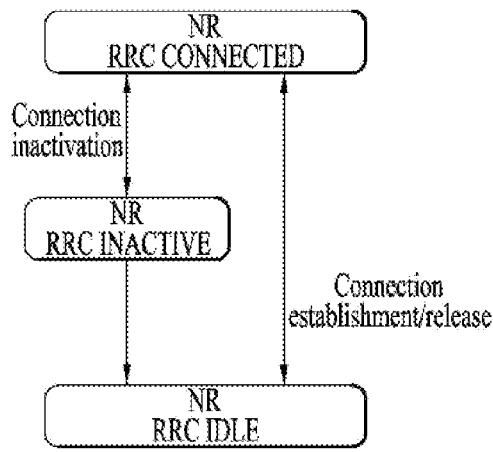
[FIG. 18]
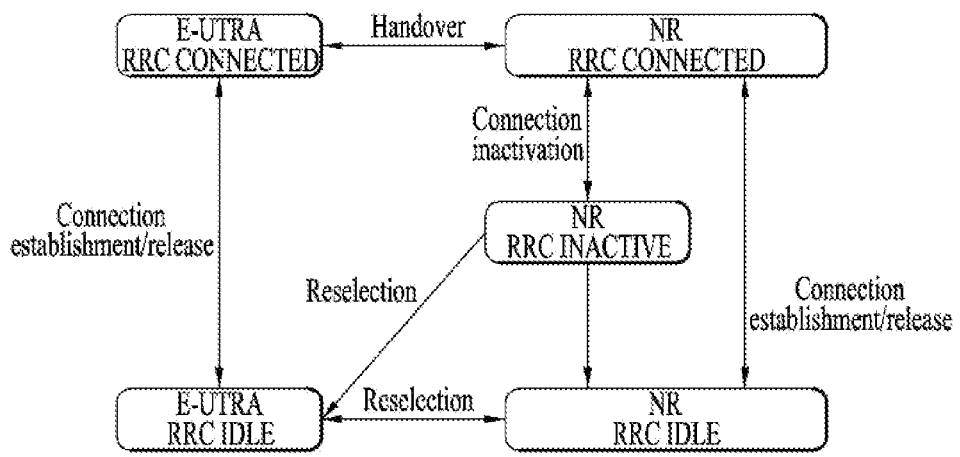
[FIG. 19]
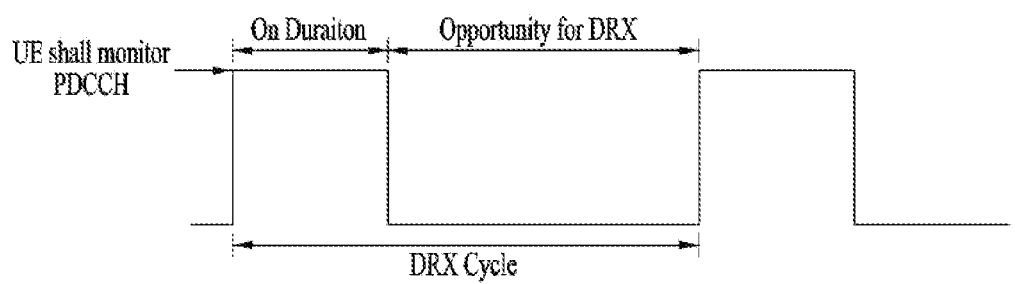

[FIG. 20]
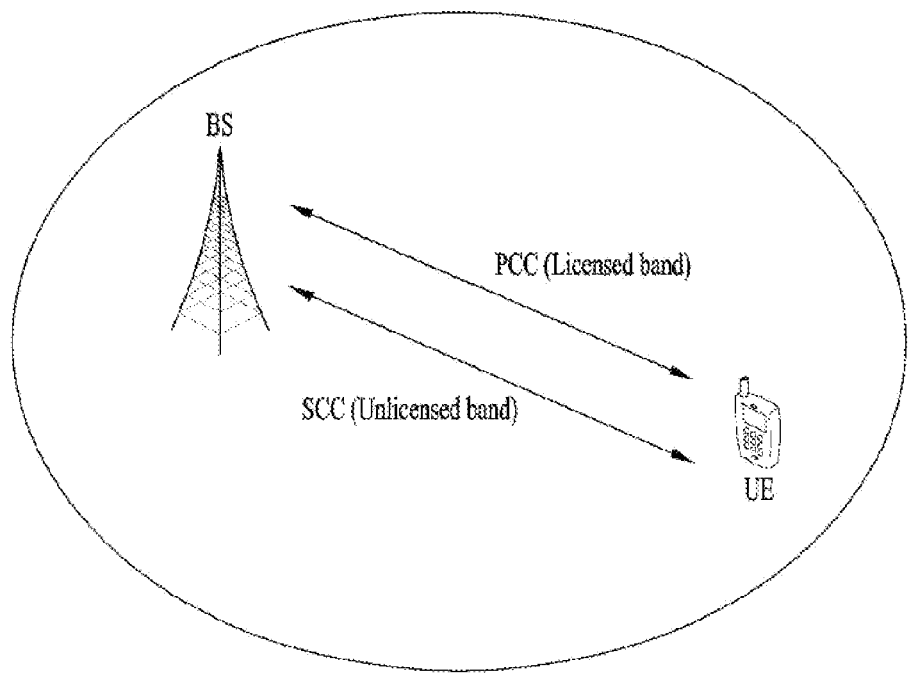
(a) Carrier aggregation between L-band and U-band
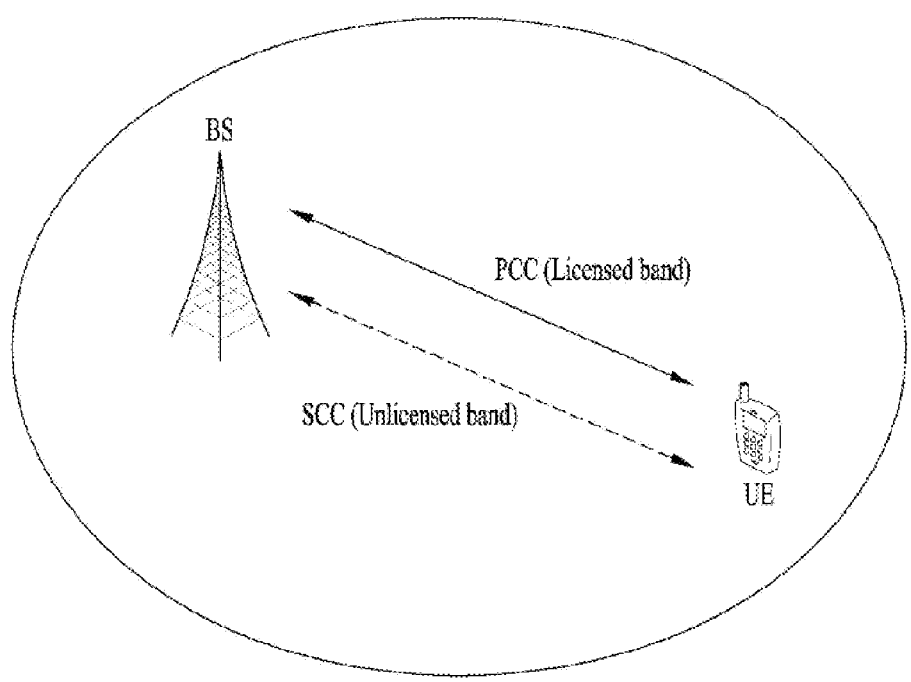
(b) Standalone U-band(s)

【FIG. 21】
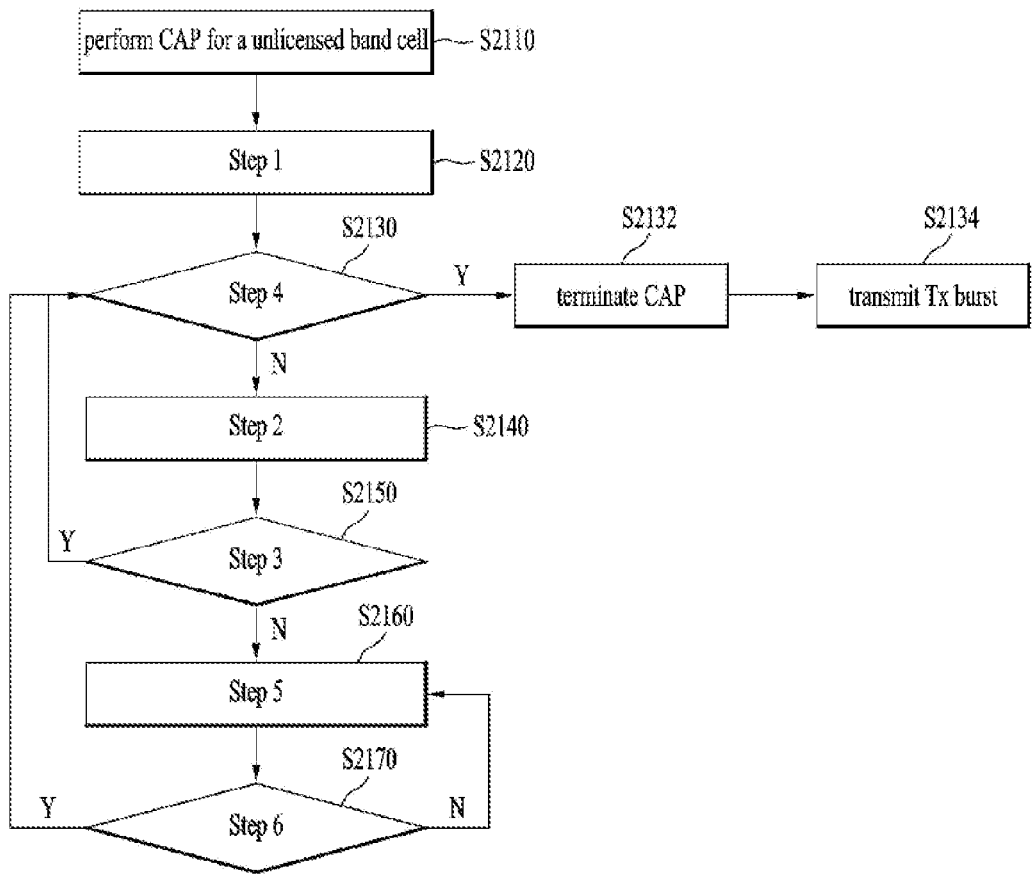
【FIG. 22】
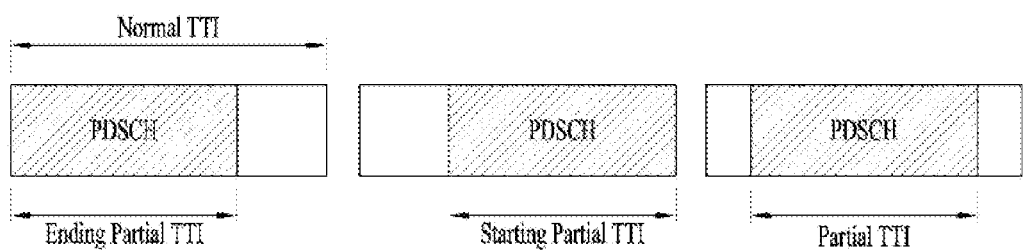

【FIG. 23】
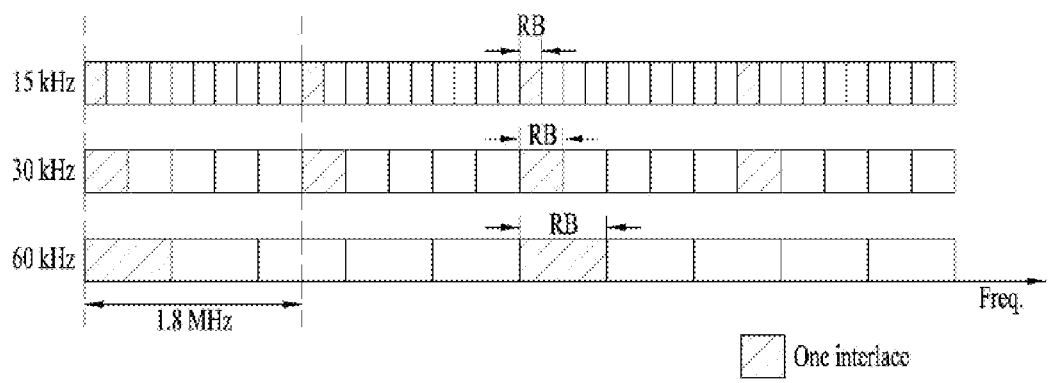
【FIG. 24】
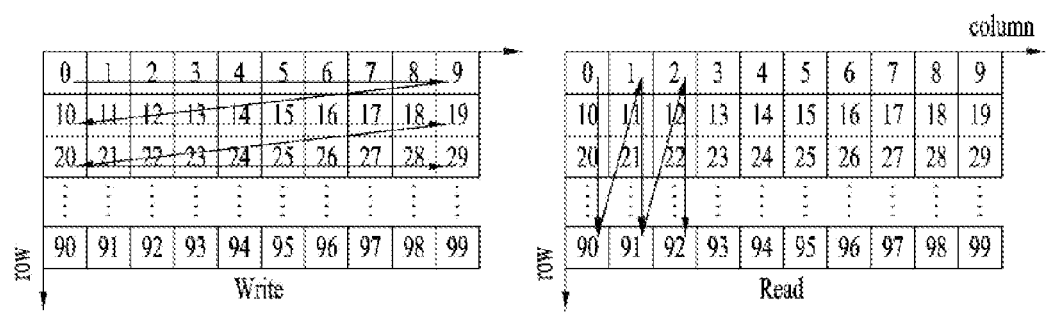
【FIG. 25】
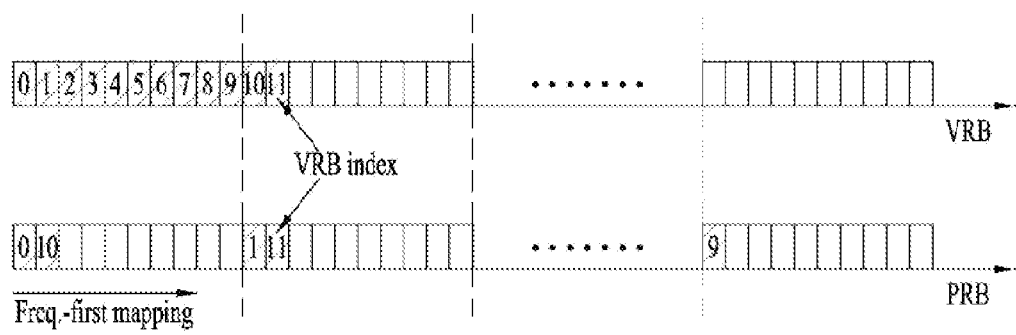

[FIG. 26]
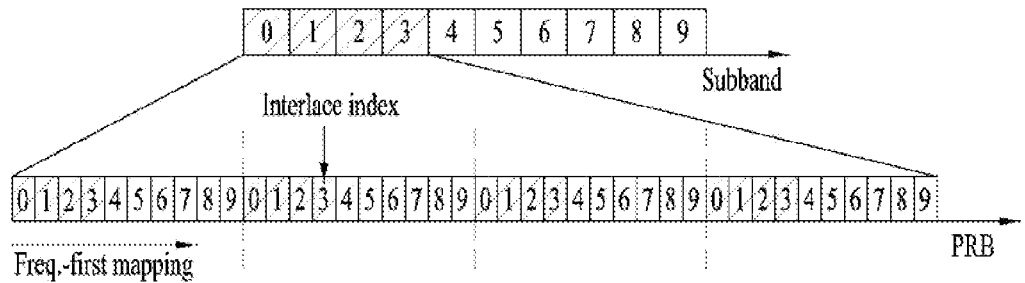
[FIG. 27]
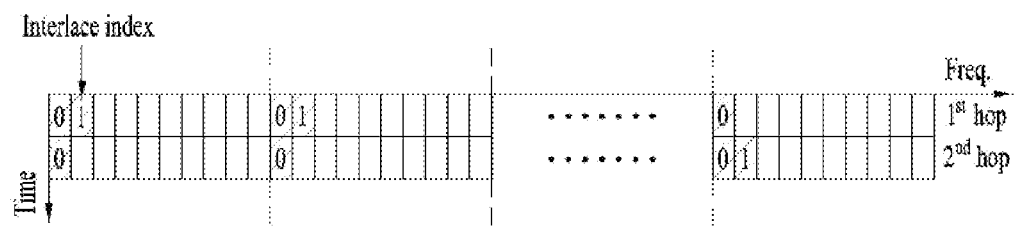
[FIG. 28]
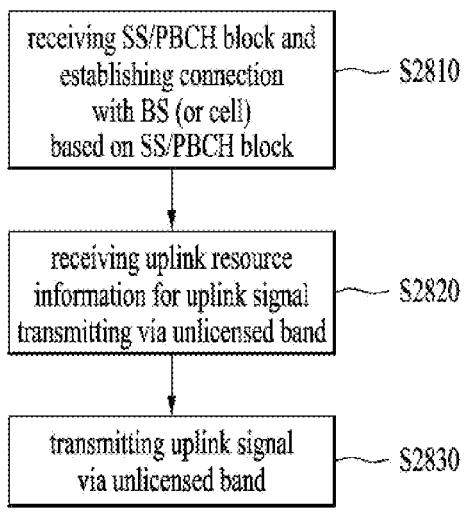

[FIG. 29]
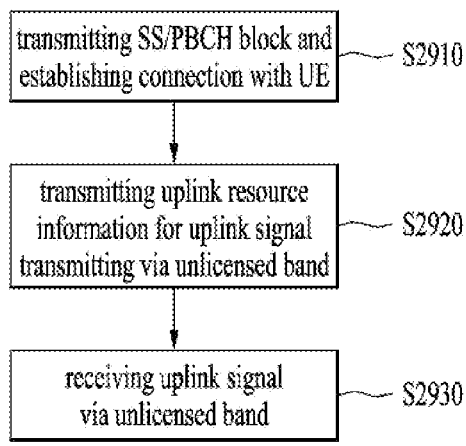
[FIG. 30]
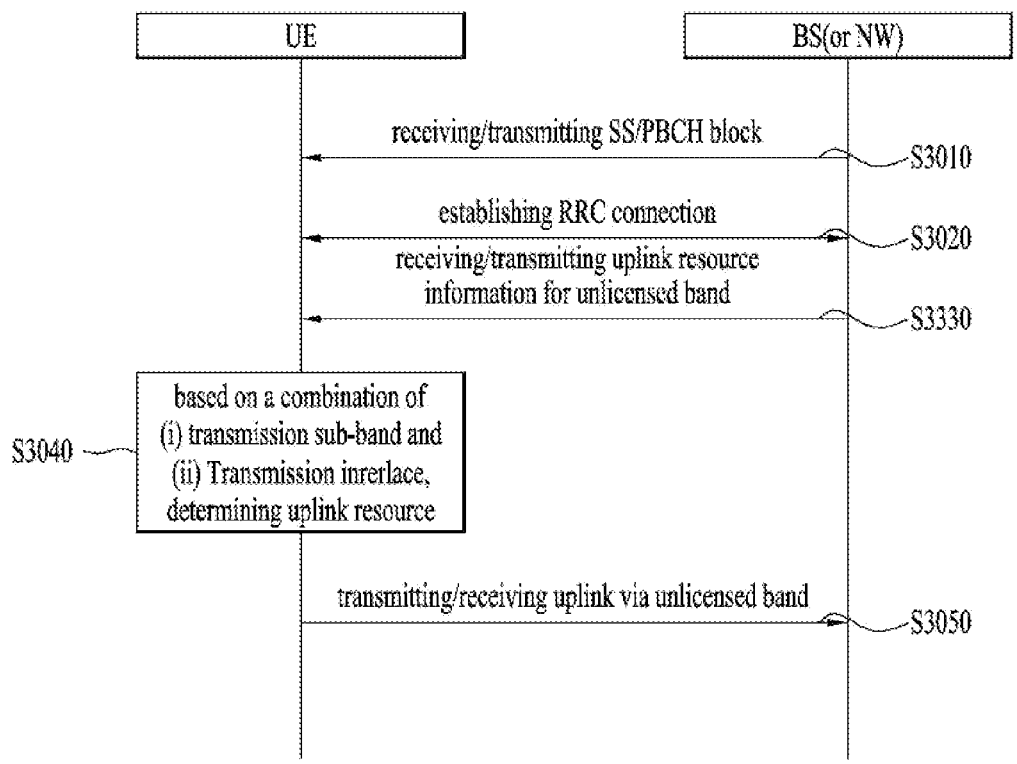

[FIG. 31]
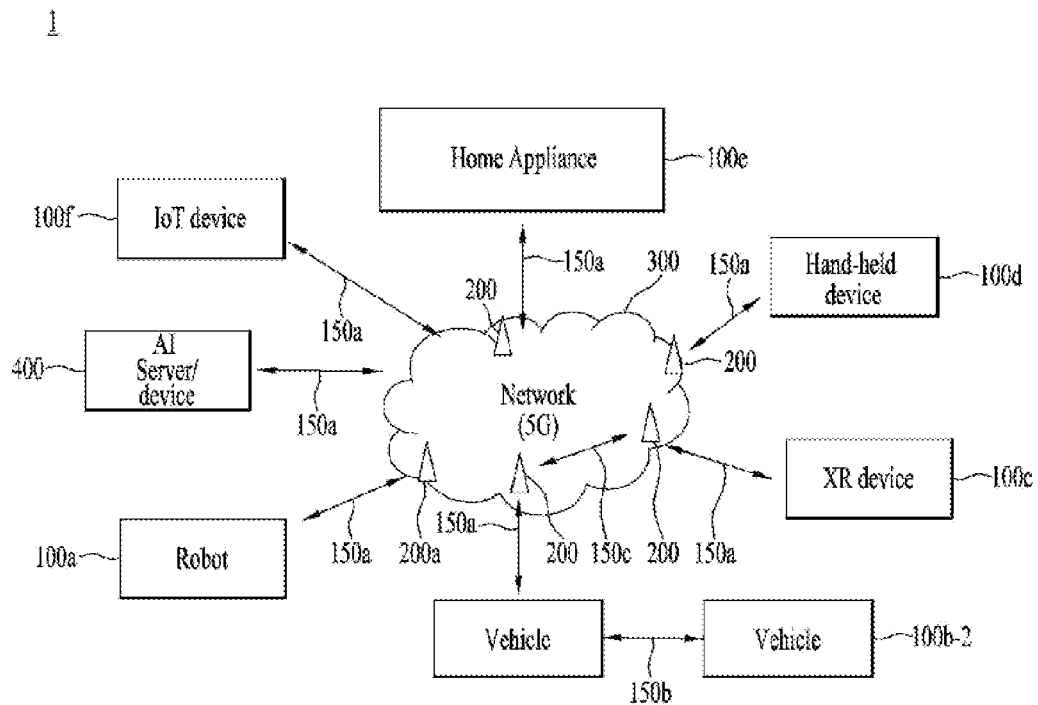
[FIG. 32]
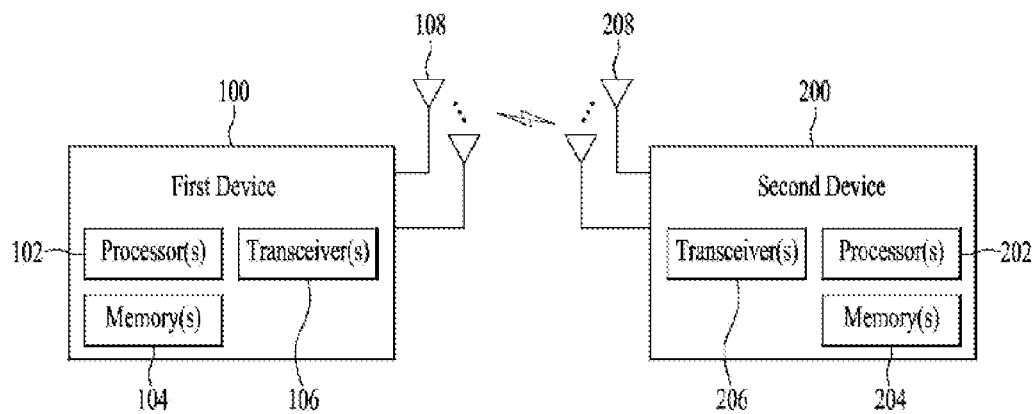

【FIG. 33】
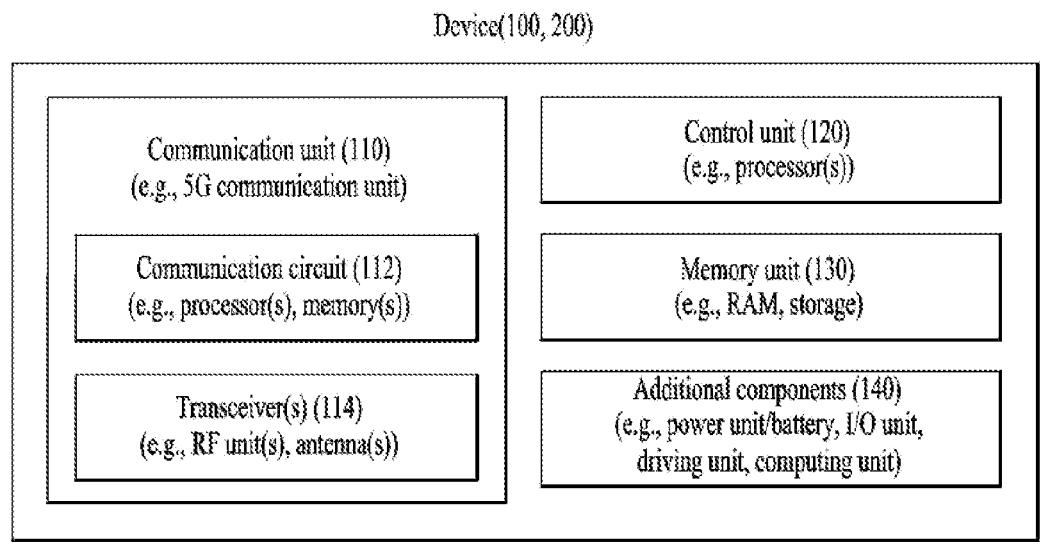
【FIG. 34】
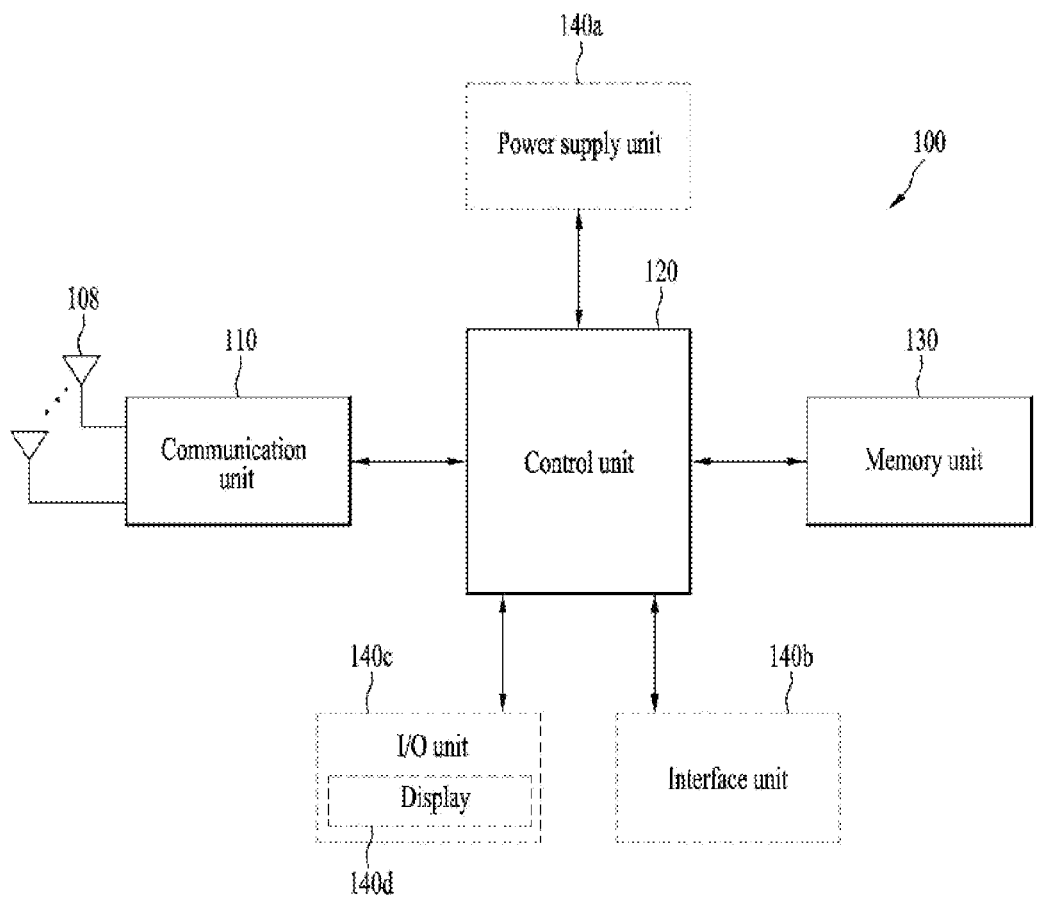

[FIG. 35]
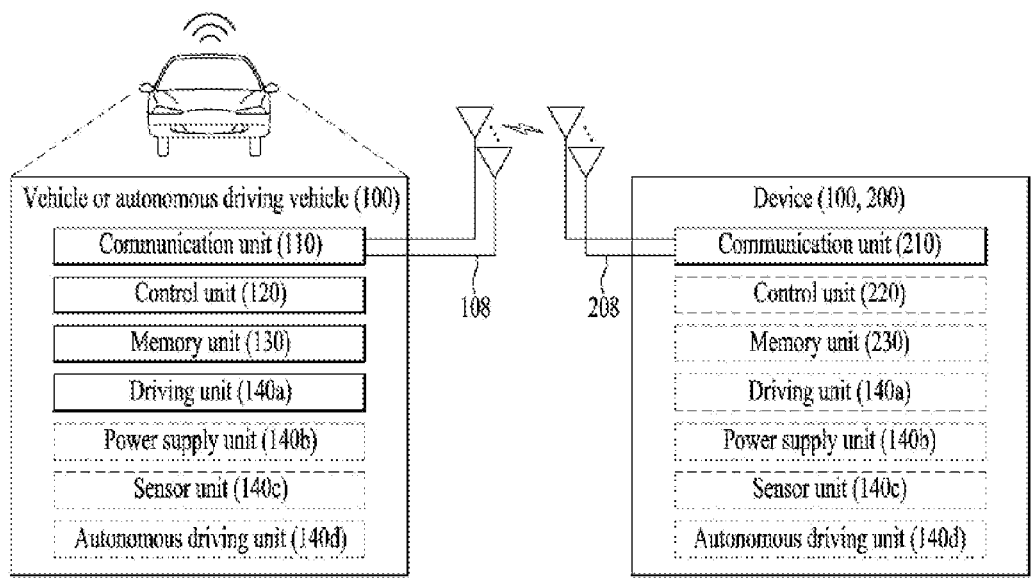

METHOD FOR TRANSMITTING OR RECEIVING UPLINK SIGNAL BETWEEN TERMINAL AND BASE STATION IN WIRELESS COMMUNICATION SYSTEM SUPPORTING UNLICENSED BAND, AND APPARATUS FOR SUPPORTING SAME

CROSS-REFERENCE TO RELATED APPLICATIONS

This application is the National Stage filing under 35 U.S.C. 371 of International Application No. PCT/KR2019/010087, filed on Aug. 9, 2019, which claims the benefit of U.S. Provisional Application No. 62/716,918 filed on Aug. 9, 2018, the contents of which is all incorporated by reference herein in its entirety.

TECHNICAL FIELD

The present disclosure relates to a wireless communication system, and more particularly to a method for transmitting and receiving uplink (UL) signals between a user equipment (UE) and a base station (BS) a wireless communication system, and an apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

Specifically, as more and more communication devices require a larger communication capacity, there is a need for mobile broadband communication enhanced over existing radio access technology. In addition, massive Machine Type Communications (MTC) capable of providing a variety of services anywhere and anytime by connecting multiple devices and objects is one of important issues to be considered in the next-generation communications. Communication system design considering services/UEs sensitive to reliability and latency is also under discussion. Thus, introduction of a new radio access technology considering enhanced mobile broadband communication (eMBB), massive MTC (mMTC), and Ultra-Reliable and Low Latency Communication (URLLC) is being discussed.

DISCLOSURE

Technical Problem

An object of the present disclosure is to provide a method for transmitting and receiving uplink (UL) signals between a user equipment (UE) and a base station (BS) in a wireless communication system supporting an unlicensed band, and devices for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present disclosure provides a method for transmitting and receiving uplink (UL) signals between a user equipment (UE) and a base station (BS) in a wireless communication system supporting an unlicensed band, and devices for supporting the same.

In accordance with one aspect of the present disclosure, a method for transmitting an uplink signal by a user equipment (UE) in a wireless communication system supporting an unlicensed band may include receiving a synchronization signal/physical broadcast channel (SS/PBCH) block from a cell supporting the unlicensed band, and establishing connection to the cell based on the synchronization signal/physical broadcast channel (SS/PBCH) block, receiving, from the cell, uplink resource information required to transmit the uplink signal through the unlicensed band, wherein the uplink resource information is constructed based on a combination of (i) sub-band information about some sub-bands from among the entire sub-band contained in the unlicensed band and (ii) interlace information about at least one interlace, and transmitting, based on uplink resources determined by the uplink resource information, the uplink signal through the unlicensed band.

A single interlace may include a plurality of resource blocks (RBs) spaced apart from each other at intervals of a predetermined frequency, such that, based on numerology applied to the unlicensed band, a spacing between resource blocks (RBs) contained in the single interlace is determined differently.

If the numerology applied to the unlicensed band is set to a 15 kHz subcarrier spacing (SCS), a spacing between resource blocks (RBs) contained in the single interlace may be set to 10 resource blocks (RBs). If the numerology applied to the unlicensed band is set to a 30 kHz subcarrier spacing (SCS), a spacing between resource blocks (RBs) contained in the single interlace may be set to 5 resource blocks (RBs).

If the numerology applied to the unlicensed band is set to a 60 kHz subcarrier spacing (SCS), a spacing between resource blocks (RBs) contained in the single interlace may be set to any one of 2.5 resource blocks (RBs), 3 resource blocks (RBs), and 5 resource blocks (RBs).

The uplink resource information may include (i) first information associated with at least one sub-band from among the entire sub-band contained in the unlicensed band, and (ii) second information associated with the at least one interlace from among the plurality of interlaces configured over the entire sub-band.

The uplink resources determined based on the uplink resource information including the first information and the second information may correspond to the at least one interlace associated with the second information from among a plurality of interlaces contained in the at least one sub-band associated with the first information.

The first information may correspond to either a resource indication value (RIV) associated with indexes of one or more consecutive sub-bands or bitmap information associated with indexes of one or more consecutive or discontinuous sub-bands.

The first information may be received through system information or higher layer signaling.

The second information may correspond to a resource indication value (RIV) indicating indexes of one or more consecutive interlaces.

The second information may correspond to bitmap information associated with indexes of one or more consecutive or discontinuous interlaces.

The uplink resource information may include resource indication values (RIVs) associated with one or more interlaces from among the plurality of interlaces configured either per entire sub-band contained in the unlicensed band or per sub-band.

The uplink resource information may include as many resource indication values (RIVs) as the number of sub-bands contained in the entire sub-band.

The transmitting the uplink signal through the unlicensed band by the user equipment (UE) may include transmitting, according to a channel access procedure (CAP) for one or more sub-bands determined based on the uplink resource information, the uplink signal through uplink resources determined by the uplink resource information in the unlicensed band.

The transmitting the uplink signal through the unlicensed band by the user equipment (UE) may include receiving information about the entire sub-band allocated to the user equipment (UE) through system information or higher layer signaling.

In accordance with another aspect of the present disclosure, a user equipment (UE) for operating in a wireless communication system supporting an unlicensed band may include at least one radio frequency (RF) module, at least one processor, and at least one memory operably connected to the at least one processor, and configured to store instructions so that execution of the instructions enables the at least one processor to perform a specific operation. In this case, the specific operation may include receiving a synchronization signal/physical broadcast channel (SS/PBCH) block from a cell supporting the unlicensed band, and establishing connection to the cell based on the synchronization signal/physical broadcast channel (SS/PBCH) block, receiving, from the cell, uplink resource information required to transmit the uplink signal through the unlicensed band, wherein the uplink resource information is constructed based on a combination of (i) sub-band information about some sub-bands from among the entire sub-band contained in the unlicensed band and (ii) interlace information about at least one interlace, and transmitting, based on uplink resources determined by the uplink resource information, the uplink signal through the unlicensed band.

The user equipment (UE) may communicate with at least one of a mobile terminal, a network, and an autonomous driving vehicle other than a vehicle equipped with the user equipment (UE).

In accordance with another aspect of the present disclosure, a base station (BS) for operating in a wireless communication system supporting an unlicensed band may include at least one radio frequency (RF) module, at least one processor, and at least one memory operably connected to the at least one processor, and configured to store instructions so that execution of the instructions enables the at least one processor to perform a specific operation. Here, the specific operation may include transmitting a synchronization signal/physical broadcast channel (SS/PBCH) block to a user equipment (UE), and establishing connection to the user equipment (UE), transmitting, to the user equipment (UE), uplink resource information required to transmit the uplink signal through the unlicensed band, wherein the uplink resource information is constructed based on a combination of (i) sub-band information about some sub-bands from among the entire sub-band contained in the unlicensed band and (ii) interlace information about at least one interlace, and receiving, based on uplink resources determined by the uplink resource information, the uplink signal through the unlicensed band from the user equipment (UE).

The above aspects of the present disclosure are just parts of preferred embodiments of the present disclosure, and various embodiments reflecting the technical features of the present disclosure can be derived and understood from the following description by those having ordinary skill in the technical field to which the present disclosure pertains.

Advantageous Effects

As is apparent from the above description, the embodiments of the present disclosure have the following effects.

In a wireless communication system supporting an unlicensed band, a base station (BS) can allocate the entire frequency band (e.g., an uplink bandwidth part (UL BWP)) having a predetermined size in the unlicensed band to a user equipment (UE), and can allocate resources of a sub-band (e.g., active sub-band) from among the entire frequency band to uplink (UL) resources.

In this case, the present disclosure can provide a method for allowing the base station (BS) to perform signaling for UL resource allocation and a method for allowing the UE to acquire information about the UL resource allocation.

As a result, the UE may transmit scheduled UL signals based on a channel access procedure (CAP) of the partial frequency band (sub-band).

It will be appreciated by persons skilled in the art that the effects that could be achieved with the present disclosure are not limited to what has been particularly described hereinabove and other advantages of the present disclosure will be more clearly understood from the following detailed description. That is, effects which are not intended by the present disclosure may be derived by those skilled in the art from the embodiments of the present disclosure.

DESCRIPTION OF DRAWINGS

The accompanying drawings, which are included to provide a further understanding of the present disclosure, illustrate the embodiments of the present disclosure together with detail explanation. However, the technical features of the present disclosure are not limited to a specific drawing. The features disclosed in each of the drawings are combined with each other to configure a new embodiment. Reference numerals in each drawing correspond to structural elements.

FIG. 1 is a diagram illustrating physical channels and a signal transmission method using the physical channels.

FIGS. 2 and 3 are diagrams illustrating radio frame structures in a long term evolution (LTE) system to which the embodiments of the present disclosure are applicable.

FIG. 4 is a diagram illustrating a slot structure in the LTE system to which the embodiments of the present disclosure are applicable.

FIG. 5 is a diagram illustrating a downlink subframe structure in the LTE system to which the embodiments of the present disclosure are applicable.

FIG. 6 is a diagram illustrating an uplink subframe structure in the LTE system to which the embodiments of the present disclosure are applicable.

FIG. 7 is a diagram illustrating a radio frame structure in a new radio access technology (NR) system to which the embodiments of the present disclosure are applicable.

FIG. 8 is a diagram illustrating a slot structure in the NR system to which the embodiments of the present disclosure are applicable.

FIG. 9 is a diagram illustrating a self-contained slot structure in the NR system to which the embodiments of the present disclosure are applicable.

FIG. 10 is a diagram illustrating a resource element group (REG) structure in the NR system to which the embodiments of the present disclosure are applicable.

FIGS. 11 and 12 are diagrams illustrating representative methods of connecting transceiver units (TXRUs) to antenna elements.

FIG. 13 is a schematic diagram illustrating a hybrid beamforming structure from the perspective of TXRUs and physical antennas according to an example of the present disclosure.

FIG. 14 is a schematic diagram illustrating a beam sweeping operation for a synchronization signal and system information in a downlink transmission procedure according to an example of the present disclosure.

FIG. 15 is a schematic diagram illustrating a synchronization signal/physical broadcast channel (SS/PBCH) block applicable to the present disclosure.

FIG. 16 is a schematic diagram illustrating an SS/PBCH block transmission configuration applicable to the present disclosure.

FIG. 17 is a diagram illustrating a radio resource control (RRC) state of a user equipment (UE) and RRC state transition of the UE. FIG. 18 is a conceptual diagram illustrating a concept of RRC state and RRC state transition of the UE and a procedure for supporting mobility between NR/NGC (NR/Next Gen Core) and E-UTRAN/EPC (Evolved-Universal Terrestrial Radio Access Network/Evolved Packet Core).

FIG. 19 is a diagram illustrating a discontinuous reception (DRX) cycle of the UE applicable to the present disclosure.

FIG. 20 illustrates an exemplary wireless communication system supporting an unlicensed band, which is applicable to the present disclosure.

FIG. 21 is a diagram illustrating a channel access procedure (CAP) for transmission in an unlicensed band, which is applicable to the present disclosure.

FIG. 22 is a diagram illustrating a partial transmission time interval (TTI) or a partial subframe/slot, which is applicable to the present disclosure.

FIG. 23 is a conceptual diagram illustrating examples of a cluster size and a cluster interval based on OFDM numerology.

FIGS. 24 and 25 are diagrams illustrating methods for allocating frequency domain resources according to one embodiment of the present disclosure.

FIG. 26 is a conceptual diagram illustrating a method for allocating frequency domain resources according to another embodiment of the present disclosure.

FIG. 27 is a conceptual diagram illustrating a method for performing frequency hopping of the UE in an unlicensed band according to the present disclosure.

FIG. 28 is a flowchart illustrating operations of the user equipment (UE) applicable to the present disclosure. FIG. 29 is a flowchart illustrating operations of the base station (BS) applicable to the present disclosure. FIG. 30 is a flowchart illustrating operations of the user equipment (UE) and the base station (BS) according to the present disclosure.

FIG. 31 is a diagram illustrating a communication system according to the present disclosure.

FIG. 32 is a diagram illustrating one example of a wireless device according to the present disclosure.

FIG. 33 is a diagram illustrating another example of a wireless device according to the present disclosure.

FIG. 34 is a diagram illustrating an example of a handheld device according to the present disclosure.

FIG. 35 is a diagram illustrating an example of a vehicle or an autonomous driving vehicle according to the present disclosure.

BEST MODE

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While the embodiments of the present disclosure are described in the context of 3GPP LTE/LTE-A systems and 3GPP NR system in order to clarify the technical features of the present disclosure, the present disclosure is also applicable to an IEEE 802.16e/m system, etc.

1. 3GPP LTE/LTE-A System 1.1. Physical Channels and Transmitting/Receiving Signal In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a Downlink Reference Signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

FIGS. 2 and 3 are diagrams illustrating radio frame structures in an LTE system to which the embodiments of the present disclosure are applicable.

The LTE system supports frame structure type 1 for frequency division duplex (FDD), frame structure type 2 for time division duplex (TDD), and frame structure type 3 for an unlicensed cell (UCell). In the LTE system, up to 31 secondary cells (SCells) may be aggregated in addition to a primary cell (PCell). Unless otherwise specified, the following operation may be applied independently on a cell basis.

In multi-cell aggregation, different frame structures may be used for different cells. Further, time resources (e.g., a subframe, a slot, and a subslot) within a frame structure may be generically referred to as a time unit (TU).

FIG. 2(a) illustrates frame structure type 1. Frame type 1 is applicable to both a full Frequency Division Duplex (FDD) system and a half FDD system.

A DL radio frame is defined by 10 1-ms subframes. A subframe includes 14 or 12 symbols according to a cyclic prefix (CP). In a normal CP case, a subframe includes 14 symbols, and in an extended CP case, a subframe includes 12 symbols.

Depending on multiple access schemes, a symbol may be an OFDM(A) symbol or an SC-FDM(A) symbol. For example, a symbol may refer to an OFDM(A) symbol on DL and an SC-FDM(A) symbol on UL. An OFDM(A) symbol may be referred to as a cyclic prefix-OFDMA(A) (CP-OFDM(A)) symbol, and an SC-FMD(A) symbol may be referred to as a discrete Fourier transform-spread-OFDM(A) (DFT-s-OFDM(A)) symbol.

One subframe may be defined by one or more slots according to a subcarrier spacing (SCS) as follows.

When SCS=7.5 kHz or 15 kHz, subframe #i is defined by two 0.5-ms slots, slot #2i and slot #2i+1 (i=0~9).

When SCS=1.25 kHz, subframe #i is defined by one 1-ms slot, slot #2i.

When SCS=15 kHz, subframe #i may be defined by six subslots as illustrated in Table 1.

Table 1 lists exemplary subslot configurations for one subframe (normal CP).

TABLE 1

| Subslot number | 0 | 1 | 2 | 3 | 4 | 5 |
|---|---|---|---|---|---|---|
| Slot number | | 2i | | | 2i + 1 | |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |
| Downlink subslot pattern 2 (Symbol number) | 0, 1 | 2, 3, 4 | 5, 6 | 0, 1 | 2, 3 | 4, 5, 6 |

FIG. 2(b) illustrates frame structure type 2. Frame structure type 2 is applied to a TDD system. Frame structure type 2 includes two half frames. A half frame includes 4 (or 5) general subframes and 1 (or 0) special subframe. According to a UL-DL configuration, a general subframe is used for UL or DL. A subframe includes two slots.

Table 2 lists exemplary subframe configurations for a radio frame according to UL-DL configurations.

TABLE 2

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. A special subframe includes a downlink pilot time slot (DwPTS), a guard period (GP), and an uplink pilot time slot (UpPTS). The DwPTS is used for initial cell search, synchronization, or channel estimation at a UE. The UpPTS is used for channel estimation at an eNB and acquisition of UL transmission synchronization at a UE. The GP is a period for cancelling interference of a UL caused by the multipath delay of a DL signal between a DL and the UL.

Table 3 lists exemplary special subframe configurations.

TABLE 3

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

In Table 3, X is configured by higher-layer signaling (e.g., radio resource control (RRC) signaling or the like) or given as 0.

FIG. 3 is a diagram illustrating frame structure type 3.

Frame structure type 3 may be applied to a UCell operation. Frame structure type 3 may be applied to, but not limited to, a licensed assisted access (LAA) SCell with a normal CP. A frame is 10 ms in duration, including 10 1-ms subframes. Subframe #i is defined by two consecutive slots, slot #2i and slot #2i+1. Each subframe in a frame may be used for a DL or UL transmission or may be empty. A DL transmission occupies one or more consecutive subframes, starting from any time in a subframe and ending at a boundary of a subframe or in a DwPTS of Table 3. A UL transmission occupies one or more consecutive subframes.

FIG. 4 is a diagram illustrating a slot structure in an LTE system to which embodiments of the present disclosure are applied.

Referring to FIG. 4, a slot includes a plurality of OFDM symbols in the time domain by a plurality of resource blocks (RBs) in the frequency domain. A symbol may refer to a symbol duration. A slot structure may be described by a resource grid including NDL/ULRBNRBsc subcarriers and NDL/ULsymb symbols. NDLRB denotes the number of RBs in a DL slot, and NULRB denotes the number of RBs in a UL slot. NDLRB and NULRB are dependent on a DL bandwidth and a UL bandwidth, respectively. NDLsymb denotes the number of symbols in the DL slot, and NULsymb denotes the number of symbols in the UL slot. NRBsc denotes the number of subcarriers in one RB. The number of symbols in a slot may vary depending on SCSs and CP lengths (see Table 1). For example, while one slot includes 7 symbols in a normal CP case, one slot includes 6 symbols in an extended CP case.

An RB is defined as NDL/ULsymb (e.g., 7) consecutive symbols in the time domain by NRBsc (e.g., 12) consecutive subcarriers in the frequency domain. The RB may be a physical resource block (PRB) or a virtual resource block (VRB), and PRBs may be mapped to VRBs in a one-to-one correspondence. Two RBs each being located in one of the two slots of a subframe may be referred to as an RB pair. The two RBs of an RB pair may have the same RB number (or RB index). A resource with one symbol by one subcarrier is referred to as a resource element (RE) or tone. Each RE in the resource grid may be uniquely identified by an index pair (k, l) in a slot, where k is a frequency-domain index ranging from 0 to NDL/ULRB×NRBsc−1 and 1 is a time-domain index ranging from 0 to NDL/ULsymb−1.

FIG. 5 illustrates a DL subframe structure in an LTE system to which the embodiments of the present disclosure are applicable.

Referring to FIG. 5, up to three (or four) OFDM(A) symbols at the beginning of the first slot of a subframe corresponds to a control region. The remaining OFDM(A) symbols correspond to a data region in which a PDSCH is allocated, and a basic resource unit of the data region is an RB. DL control channels include a physical control format indicator channel (PCFICH), a physical downlink control channel (PDCCH), a physical hybrid-ARQ indicator channel (PHICH), and so on.

The PCFICH is transmitted in the first OFDM symbol of a subframe, carrying information about the number of OFDM symbols (i.e., the size of a control region) used for transmission of control channels in the subframe. The PHICH is a response channel for a UL transmission, carrying a hybrid automatic repeat request (HARQ) acknowledgement (ACK)/negative acknowledgement (NACK) signal. Control information delivered on the PDCCH is called downlink control information (DCI). The DCI includes UL resource allocation information, DL resource control information, or a UL transmit (TX) power control command for any UE group.

FIG. 6 is a diagram illustrating a UL subframe structure in an LTE system to which the embodiments of the present disclosure are applicable.

Referring to FIG. 6, one subframe 600 includes two 0.5-ms slots 601. Each slot includes a plurality of symbols 602, each corresponding to one SC-FDMA symbol. An RB 603 is a resource allocation unit corresponding to 12 subcarriers in the frequency domain by one slot in the time domain.

A UL subframe is divided largely into a data region 604 and a control region 605. The data region is communication resources used for each UE to transmit data such as voice, packets, and so on, including a physical uplink shared channel (PUSCH). The control region is communication resources used for each UE to transmit an ACK/NACK for a DL channel quality report or a DL signal, a UL scheduling request, and so on, including a physical uplink control channel (PUCCH).

A sounding reference signal (SRS) is transmitted in the last SC-FDMA symbol of a subframe in the time domain.

FIG. 7 is a diagram illustrating a radio frame structure in an NR system to which the embodiments of the present disclosure are applicable.

In the NR system, UL and DL transmissions are based on a frame as illustrated in FIG. 7. One radio frame is 10 ms in duration, defined as two 5-ms half-frames. One half-frame is defined as five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM symbol) and an SC-FDMA symbol (or a DFT-s-OFDM symbol).

Table 4 lists the number of symbols per slot, the number of slots per frame, and the number of slots per subframe in the normal CP case, and Table 5 lists the number of symbols per slot, the number of slots per frame, and the number of slots per subframe in the extended CP case.

TABLE 4

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, Nslotsymb denotes the number of symbols in a slot, Nframe,μslot denotes the number of slots in a frame, and Nsubframe,μslot denotes the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

FIG. 8 is a diagram illustrating a slot structure in an NR system to which the embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined as a plurality of (e.g., 12) consecutive subcarriers in the frequency domain.

A bandwidth part (BWP) is defined as a plurality of consecutive (P)RBs in the frequency domain and may correspond to one numerology (e.g., SCS, CP length, and so on).

A carrier may include up to N (e.g., 5) BWPs. Data communication may be conducted in an active BWP, and only one BWP may be activated for one UE. In a resource grid, each element is referred to as an RE, to which one complex symbol may be mapped.

FIG. 9 is a diagram illustrating a self-contained slot structures in an NR system to which the embodiments of the present disclosure are applicable.

In FIG. 9, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, an eNB and a UE may sequentially perform DL transmission and UL transmission in one slot. That is, the eNB and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the eNB and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 8.

Further, the order of regions in one slot may vary in some embodiments. For example, one slot may be configured in the following order: DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH carries DL data (e.g., DL-shared channel transport block (DL-SCH TB)) and uses a modulation scheme such as quadrature phase shift keying (QPSK), 16-ary quadrature amplitude modulation (T6QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer is mapped to resources together with a demodulation reference signal (DMRS or DM-RS), created as an OFDM symbol signal, and then transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined as one OFDM symbol by one (P)RB.

FIG. 10 is a diagram illustrating the structure of one REG in an NR system to which the embodiments of the present disclosure are applicable.

In FIG. 10, D denotes an RE to which DCI is mapped, and R denotes an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH carries UL data (e.g., UL-shared channel transport block (UL-SCH TB)) and/or UCI and is transmitted based on a CP-OFDM waveform or a DFT-s-OFDM waveform. When the PUSCH is transmitted in the DFT-s-OFDM waveform, the UE transmits the PUSCH by applying transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. PUSCH transmission may be dynamically scheduled by a UL grant in DCI, or semi-statically scheduled by higher-layer (e.g., RRC) signaling (and/or layer 1 (L1) signaling such as a PDCCH) (configured grant). Both codebook based PUSCH transmission and non-codebook based PUSCH transmission may be allowed.

The PUCCH carries UCI, an HARQ-ACK, and/or an SR. Depending on the transmission duration of the PUCCH, the PUCCH is classified into a short PUCCH and a long PUCCH. Table 6 lists exemplary PUCCH formats.

TABLE 6

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI of up to 2 bits and is mapped in a sequence-based manner, for transmission. Specifically, the UE transmits specific UCI to the eNB by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 carries UCI of up to 2 bits and modulation symbols are spread with an orthogonal cover code (OCC) (which is configured differently depending on whether frequency hopping is performed) in the time domain. The DMRS is transmitted in a symbol in which a modulation symbol is not transmitted (ie., transmitted by time division multiplexing (TDM)).

PUCCH format 2 carries UCI of more than 2 bits and modulation symbols are transmitted by frequency division multiplexing (FDM) with the DMRS. The DMRS is located in symbols #1, #4, #7, and #10 of a given RB with a density of 1/3. A pseudo noise (PN) sequence is used for a DMRS sequence. For 2-symbol PUCCH format 2, frequency hopping may be activated.

PUCCH format 3 does not support UE multiplexing in the same PRBs and carries UCI of more than 2 bits. In other words, PUCCH resources of PUCCH format 3 include no OCC. Modulation symbols are transmitted by TDM with the DMRS.

PUCCH format 4 supports multiplexing of up to 4 UEs in the same PRBs and carries UCI of more than 2 bits. In other words, PUCCH resources of PUCCH format 3 includes an OCC. Modulation symbols are transmitted in TDM with the DMRS.

1.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

FIGS. 11 and 12 are diagrams illustrating representative methods for connecting TXRUs to antenna elements. Here, the TXRU virtualization model represents the relationship between TXRU output signals and antenna element output signals.

FIG. 11 shows a method for connecting TXRUs to sub-arrays. In FIG. 11, one antenna element is connected to one TXRU.

Meanwhile, FIG. 12 shows a method for connecting all TXRUs to all antenna elements. In FIG. 12, all antenna elements are connected to all TXRUs. In this case, separate addition units are required to connect all antenna elements to all TXRUs as shown in FIG. 12.

In FIGS. 11 and 12, W indicates a phase vector weighted by an analog phase shifter. That is, W is a major parameter determining the direction of the analog beamforming. In this case, the mapping relationship between channel state information reference signal (CSI-RS) antenna ports and TXRUs may be 1:1 or 1-to-many.

The configuration shown in FIG. 11 has a disadvantage in that it is difficult to achieve beamforming focusing but has an advantage in that all antennas can be configured at low cost.

On the contrary, the configuration shown in FIG. 12 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

FIG. 13 is a diagram schematically illustrating an exemplary hybrid BF structure from the perspective of TXRUs and physical antennas according to the present disclosure. In FIG. 13, the number of digital beams is L and the number analog beams is N.

Additionally, in the NR system to which the present disclosure is applicable, an BS designs analog BF to be changed in units of symbols to provide more efficient BF support to a UE located in a specific area. Furthermore, as illustrated in FIG. 13, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

FIG. 14 is a diagram schematically illustrating an exemplary beam sweeping operation for a synchronization signal and system information in a DL transmission procedure according to the present disclosure.

In FIG. 14 below, a physical resource (or physical channel) on which the system information of the NR system to which the present disclosure is applicable is transmitted in a broadcasting manner is referred to as an xPBCH. Here, analog beams belonging to different antenna panels within one symbol may be simultaneously transmitted.

As illustrated in FIG. 14, in order to measure a channel for each analog beam in the NR system to which the present disclosure is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

1.4. Synchronization Signal Block (SSB) or SS/PBCH Block

In the NR system to which the present disclosure is applicable, a primary synchronization signal (PSS), a secondary synchronization signal (SSS), and/or a physical broadcast signal (PBCH) may be transmitted in one synchronization signal (SS) block or SS PBCH block (hereinafter, referred to as an SSB or SS/PBCH block). Multiplexing other signals may not be precluded within the SSB.

The SS/PBCH block may be transmitted in a band other than the center of a system band. Particularly, when the BS supports broadband operation, the BS may transmit multiple SS/PBCH blocks.

FIG. 15 is a schematic diagram illustrating an SS/PBCH block applicable to the present disclosure.

As illustrated in FIG. 15, the SS/PBCH block applicable to the present disclosure may include 20 RBs in four consecutive OFDM symbols. Further, the SS/PBCH block may include a PSS, an SSS, and a PBCH, and the UE may perform cell search, system information acquisition, beam alignment for initial access, DL measurement, and so on based on the SS/PBCH block.

Each of the PSS and the SSS includes one OFDM symbol by 127 subcarriers, and the PBCH includes three OFDM symbols by 576 subcarriers. Polar coding and QPSK are applied to the PBCH. The PBCH includes data REs and DMRS REs in every OFDM symbol. There are three DMRS REs per RB, with three data REs between every two adjacent DMRS REs.

Further, the SS/PBCH block may be transmitted even in a frequency band other than the center frequency of a frequency band used by the network.

For this purpose, a synchronization raster being candidate frequency positions at which the UE should detect the SS/PBCH block is defined in the NR system to which the present disclosure is applicable. The synchronization raster may be distinguished from a channel raster.

In the absence of explicit signaling of the position of the SS/PBCH block, the synchronization raster may indicate available frequency positions for the SS/PBCH block, at which the UE may acquire system information.

The synchronization raster may be determined based on a global synchronization channel number (GSCN). The GSCN may be transmitted by RRC signaling (e.g., an MIB, a system information block (SIB), remaining minimum system information (RMSI), other system information (OSI), or the like).

The synchronization raster is defined to be longer along the frequency axis than the channel raster and characterized by a smaller number of blind detections than the channel raster, in consideration of the complexity of initial synchronization and a detection speed.

FIG. 16 is a schematic diagram illustrating an SS/PBCH block transmission structure applicable to the present disclosure.

In the NR system to which the present disclosure is applicable, the BS may transmit an SS/PBCH block up to 64 times for 5 ms. The multiple SS/PBCH blocks may be transmitted on different beams, and the UE may detect the SS/PBCH block on the assumption that the SS/PBCH block is transmitted on a specific one beam every 20 ms.

As the frequency band is higher, the BS may set a larger maximum number of beams available for SS/PBCH block transmission within 5 ms. For example, the BS may transmit the SS/PBCH block by using up to 4 different beams at or below 3 GHz, up to 8 different beams at 3 to 6 GHz, and up to 64 different beams at or above 6 GHz, for 5 ms.

1.5. Synchronization Procedure

The UE may acquire synchronization by receiving the above-described SS/PBCH block from the BS. The synchronization procedure largely includes cell ID detection and timing detection. The cell ID detection may include PSS-based cell ID detection and SSS-based cell ID detection. The timing detection may include PBCH DMRS-based timing detection and PBCH content-based (e.g., MIB-based) timing detection.

To this end, the UE may assume that reception occasions of a PBCH, a PSS, and an SSS are present in consecutive symbols (That is, as described above, it may be assumed that PBCH, PSS, and SSS construct SS/PBCH blocks). Subsequently, the UE may assume that SSS data, PBCH DM-RS data, PBCH data have the same Energy Per Resource Element (EPRE). In this case, the UE may assume that the ratio of PSS EPRE to SSS EPRE of SS/PBCH blocks contained in the corresponding cell is set to 0 dB or 3 dB. Alternatively, when dedicated higher layer parameters are not provided to the UE, it is assumed that the ratio of PDCCH DMRS EPRE to SSS EPRE of the UE configured to monitor a PDCCH for DCI format 1_0 having a cyclic redundancy check (CRC) scrambled by a System Information-Random Network Temporary Identifier (SI-RNTI), a Paging-Random Network Temporary Identifier (P-RNTI), or a Random Access-Random Network Temporary Identifier (RA-RNTI) is in the range of −8 dB to 8 dB.

First, the UE may acquire timing synchronization and the physical cell ID of a detected cell by detecting a PSS and an SSS. More specifically, the UE may acquire the symbol timing of the SSB and detect a cell ID within a cell ID group, by PSS detection. Subsequently, the UE detects the cell ID group by SSS detection.

Further, the UE may detect the time index (e.g., slot boundary) of the SSB by the DMRS of the PBCH. The UE may then acquire half-frame boundary information and system frame number (SFN) information from an MIB included in the PBCH.

The PBCH may indicate that a related (or corresponding) RMSI PDCCH/PDSCH is transmitted in the same band as or a different band from that of the SS/PBCH block. Accordingly, the UE may then receive RMSI (e.g., system information other than the MIB) in a frequency band indicated by the PBCH or a frequency band carrying the PBCH, after decoding of the PBCH.

In SS/PBCH blocks in the half frame, first symbol indexes for candidate SS/PBCH blocks can be determined according to subcarrier spacing of the SS/PBCH blocks. In this case, Index #0 corresponds to a first symbol of a first slot contained in the half frame.

(Case A: 15 kHz subcarrier spacing) In Case A, first symbols of the candidate SS/PBCH blocks may have {2, 8}+14*n symbols. For the frequency band of 3 GHz or less, 'n' is set to 0 or 1. For the frequency band of 3 GHz to 6 GHz, 'n' is set to 0, 1, 2, or 3.

(Case B: 30 kHz subcarrier spacing) In Case B, first symbols of the candidate SS/PBCH blocks may have {4, 8, 16, 32}+28*n symbols. For the frequency band of 3 GHz or less, 'n' is set to zero 0. For the frequency band of 3 GHz to 6 GHz, 'n' is set to 0 or 1.

(Case C: 30 kHz subcarrier spacing) In Case C, first symbols of the candidate SS/PBCH blocks may have {2, 8}+14*n symbols. For the frequency band of 3 GHz or less, 'n' is set to 0 or 1. For the frequency band of 3 GHz to 6 GHz, 'n' is set to 0, 1, 2, or 3.

(Case D: 120 kHz subcarrier spacing) In Case D, first symbols of the candidate SS/PBCH blocks may have {4, 8, 16, 20}+28*n symbols. For the frequency band of 6 GHz or more, 'n' is set to 0, 1, 2, 3, 5, 6, 7, 8, 19, 11, 12, 13, 15, 16, 17, or 18.

(Case E: 240 kHz subcarrier spacing) In Case E, first symbols of the candidate SS/PBCH blocks may have {8, 12, 16, 20, 32, 36, 40, 44}+56*n symbols. For the frequency band of 6 GHz or more, 'n' is set to 0, 1, 2, 3, 5, 6, 7, or 8.

In relation to the above-mentioned operations, the UE may acquire system information (SI).

MIB includes information/parameters required for monitoring a PDCCH that schedules a PDSCH carrying SystemInformationBlock1 (SIB1), and is transmitted to the UE on the PBCH in the SS/PBCH block by the base station (BS).

The UE may check whether there is a CORESET for a Type0-PDCCH common search space, based on the MIB. The Type0-PDCCH common search space is a kind of PDCCH search space and used to transmit a PDCCH that schedules an SI message.

In the presence of a Type0-PDCCH common search space, the UE may determine (i) a plurality of contiguous RBs included in the CORESET and one or more consecutive symbols and (ii) a PDCCH occasion (e.g., a time-domain position for PDCCH reception), based on information (e.g., pdcch-ConfigSIB1) included in the MIB.

In the absence of a Type0-PDCCH common search space, pdcch-ConfigSIB1 provides information about a frequency position at which the SSB/SIB1 exists and a frequency range in which the SSB/SIB1 does not exist.

SIB1 includes information about the availability and scheduling (e.g., a transmission period, SI-window size, etc.) of the other SIBs (hereinafter, referred to as SIBx where x is 2 or a larger integer). For example, SIB1 may indicate whether SIBx is periodically broadcast or provided in an on-demand manner (or upon request of the UE). When SIBx is provided in the on-demand manner, SIB1 may include information required for an SI request of the UE. SIB1 is transmitted on a PDSCH. A PDCCH that schedules SIB1 is transmitted through a Type0-PDCCH common search space, and SIB1 is transmitted on a PDSCH indicated by the PDCCH.

1.6. Synchronization Raster

A synchronization raster refers to a frequency position of a synchronization signal block (SSB) that can be used by a UE for system information (SI) acquisition in a situation in which there is no explicit signaling for the SSP position. The global synchronization raster is defined for all frequencies. The frequency position of the SSB is defined by a $SS_{REF}$ and a Global Synchronization Channel Number (GSCN). Parameters defining $SS_{REF}$ and GSCN for all frequency ranges are as follows.

TABLE 7

| Frequency range | SS Block frequency position $SS_{REF}$ | GSCN | Range of GSCN |
|---|---|---|---|
| 0-3000 MHz | N * 1200 kHz + M * 50 kHz, N = 1:2499, M ε {1, 3, 5} (Note 1) | 3N + (M − 3)/2 | 2-7498 |
| 3000-24250 MHz | 3000 MHz + N * 1.44 MHz N = 0:14756 | 7499 + N | 749-22255 |

NOTE 1:
The default value for operating bands with SCS spaced channel raster is M = 3.

Mapping between the synchronization raster and resource blocks (RBs) of the SSB corresponding to the synchronization raster may be based on the following Table 8. Such mapping depends on a total number of RBs allocated to the channel, and can be applied to both of UL and DL.

TABLE 8

| Resource element index k | 0 |
|---|---|
| Physical resource block number $n_{PRB}$ of the SS block | $n_{PRB} = 10$ |

1.7. Antenna ports quasi co-location

A list required for configuring a maximum of M Transmission Configuration Indicator (TCI) states can be configured for one UE. The above-mentioned process for configuring M TCI states may be configured by a higher layer parameter (PDSCH-Config) in a manner that a PDSCH can be decoded (by the UE) according to detection of a PDCCH including DCI that is intended for the UE and a given serving cell. Here, M may be determined depending on UE capability.

Each TCI state includes a parameter for setting the relationship of QCL (quasi co-location) between DMRS ports of a PDSCH and one or two DL reference signals. The QCL relationship is established based on a higher layer parameter 'qcl-Type1' for a first downlink reference signal (DL RS) and a higher layer parameter 'qcl-Type2' (where, if qcl-Type2 is set) for a second DL RS. For the above cases of two DL RSs, the QCL types should not be identical to each other, regardless of whether the reference signals (RSs) are the same DL RSs or different DL RSs. The QCL types correspond to DL RSs given by higher layer parameters (qcl-Type) in a higher layer parameter (QCL-Info), respectively. Each of the QCL types may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives an activation command used to map a maximum of 8 TCI states to a code point (codepoint) of a Transmission Configuration Indication (TCI) field in DCI. If an HARQ-ACK signal corresponding to a PDSCH including the activation command is transmitted from Slot #n, such mapping between the code point of the TCI field of the DCI and the TCI states can be applied from Slot #(n+3* $N^{subframe,\mu}_{slot}$+1). Here, $N^{subframe,\mu}_{slot}$ is determined based on Table 1 or Table 2. The UE assumes that DMRS port(s) of a PDSCH of the serving cell is quasi co-located (QCL) with SS/PBCH blocks decided in the initial access procedure from the viewpoint of 'QCL-TypeA'. Moreover, at the above-mentioned time point, the UE may assume that DMRS port(s) of a PDSCH of the serving cell are quasi co-located (QCL) with SS/PBCH blocks decided in the initial access procedure from the viewpoint of 'QCL-TypeD'.

If the higher layer parameter (tci-PresentInDCI) is set to 'enabled' for a CORESET scheduling the PDSCH, the UE assumes that the TCI field is present in the PDCCH of DCI format 1_1 transmitted on the CORESET. If a higher layer parameter 'tci-PresentInDCI' is not configured for a CORESET scheduling the PDSCH, or if the PDSCH is scheduled by DCI format 1_0 and a time offset between a reception time of a DL DCI and a reception time of a PDSCH corresponding to the DL DCI is equal to or higher than a threshold value 'Threshold-Sched-Offset' (where, the threshold value is determined based on UE capability), the UE may assume that TCI states or QCL assumption for the PDSCH is identical to TCI states or QCL assumption applied to the CORESET used for PDCCH transmission, such that the UE can determine a PDSCH antenna port QCL using such assumption.

In a situation in which a higher layer parameter 'tci-PresentInDCI' is set to 'enabled' and the TCI field contained in DCI scheduling a component carrier (CC) indicates (or points to) activated TCI states in the scheduled CC or DL BW, if the PDSCH is scheduled by DCI format 1_1, the UE may use a TCI state (TCI-State) based on the TCI field contained in DCI of the detected PDCCH, such that the UE can determine the PDSCH antenna port QCL using the TCI field. If a time offset between a reception time of DL DCI and a reception time of PDSCH is equal to or higher than a threshold value 'Threshold-Sched-Offset' (here, the threshold value is determined based on the reported UE capability), the UE may assume that DMRS port(s) of the PDSCH of the serving cell is quasi co-located (QCL) with RS(s) contained in a TCI state about QCL-type parameter(s) given by an indicated TCI state. If a single slot PDSCH is configured for the UE, the indicated TCI state should be based on TCI states activated in slot(s) of the scheduled PDSCH. If a CORESET associated with a Search Space Set (SSS) for cross-carrier scheduling is configured for the UE, the UE may assume that a higher layer parameter 'tci-PresentInDCI' for the CORESET is set to 'enabled', and if one or more TCI states configured for the serving cell scheduled by the search space set (SSS) include 'QCL-TypeD' information, the UE expects that a time offset between a reception time of a PDCCH detected in the SSS and a reception time of a PDSCH corresponding to the detected PDCCH is equal to or higher than a threshold value 'Threshold-Sched-Offset'.

In one case in which the higher layer parameter 'tci-PresentInDCI' is set to 'enabled' or in another case in which the higher layer parameter 'tci-PresentInDCI' is not configured in an RRC connection mode, if a time offset between a reception time of a DL DCI and a reception time of a PDSCH corresponding to the DL DCI is less than a threshold value 'Threshold-Sched-Offset' in the above-mentioned two cases, the UE assumes the following items (i) and (ii). In the first item (i), the UE assumes that PDSCH DMRS port(s) of the serving cell are quasi co-located (QCL) with RS(s) and QCL parameter(s) of TCI states. In the second item (ii), the above-mentioned QCL parameter(s) may refer to o QCL parameter(s) used to indicate a PDCCH QCL of a CORESET associated with a search space monitored by the lowest CORESET-ID of the last slot within at least one CORESET contained in the activated BWP of the serving cell monitored by the UE. (For both the cases when higher layer parameter tci-PresentInDCI is set to 'enabled' and the higher layer parameter tci-PresentInDCI is not configured in RRC connected mode, if the offset between the reception of the DL DCI and the corresponding PDSCH is less than the threshold Threshold-Sched-Offset, the UE may assume that the DM-RS ports of PDSCH of a serving cell are quasi co-located with the RS(s) in the TCI state with respect to the QCL parameter(s) used for PDCCH quasi co-location indication of the CORESET associated with a monitored search space with the lowest CORESET-ID in the latest slot in which one or more CORESETs within the active BWP of the serving cell are monitored by the UE.)

In this case, if 'QCL-TypeD' of a PDSCH DMRS is different from 'QCL-TypeD' of a PDCCH DMRS overlapped in at least one symbol, the UE expects to prioritize reception of a PDCCH associated with the corresponding CORESET. The corresponding operation can also be equally applied to an intra-band CA (if PDSCH and CORESET are present in different CCs). If a TCI state including 'QCL-TypeD' is not present in the configured TCI states, the UE obtains another QCL assumption from the TCI state indicated for the scheduled PDSCH, regardless of a time offset between a reception time of DL DCI and a reception time of PDSCH corresponding to the DL DCI.

For periodic CSI-RS resources in a predetermined higher layer parameter 'NZP-CSI-RS-ResourceSet' in which a higher layer parameter 'trs-Info' is set, the UE should assume that a TCI state indicates one of the following QCL type(s):

when QCL-TypeC (or QCL-TypeD) about SS/PBCH blocks is applicable (when applicable), the UE should assume that the TCI state indicates 'QCL-TypeD' about the same SS/PBCH block, or
  when QCL-TypeC (or QCL-TypeD) about SS/PBCH blocks is applicable (when applicable), the UE should assume that the TCI state indicates 'QCL-TypeD' about periodic CSI-RS resources contained in a predetermined higher layer parameter 'NZP-CSI-RS-ResourceSet' in which a higher layer parameter 'repetition' is set.

For CSI-RS resources contained in the predetermined higher layer parameter 'NZP-CSI-RS-ResourceSet' that has been set without the higher layer parameters 'trs-Info' and 'repetition', the UE should assume that the TCI state indicates one of the following QCL type(s):

when QCL-TypeA (or QCL-TypeD) about CSI/RS resources contained in the predetermined higher layer parameter 'NZP-CSI-RS-ResourceSet' in which the higher layer parameter 'trs-Info' is set is applicable (when applicable), the UE should assume that the TCI state indicates 'QCL-TypeD' about the same CSI-RS resources, or
  when QCL-TypeA (or QCL-TypeD) about CSI/RS resources contained in the predetermined higher layer parameter 'NZP-CSI-RS-ResourceSet' in which the higher layer parameter 'trs-Info' is set is applicable, the UE should assume that the TCI state indicates 'QCL-TypeD' about the SS/PBCH blocks, or
  when QCL-TypeA (or QCL-TypeD) about CSI/RS resources contained in the predetermined higher layer parameter 'NZP-CSI-RS-ResourceSet' in which the higher layer parameter 'trs-Info' is set is applicable, the UE should assume that the TCI state indicates 'QCL-TypeD' about periodic CSI-RS resources contained in the predetermined higher layer parameter 'NZP-CSI-RS-ResourceSet' in which the higher layer parameter 'repetition' is set.

When QCL-TypeB and/or QCL-TypeD about CSI/RS resources contained in the predetermined higher layer parameter 'NZP-CSI-RS-ResourceSet' in which the higher layer parameter 'trs-Info' is set is not applicable, the UE should assume that the TCI state indicates one of the following QCL type(s), for CSI-RS resources contained in the predetermined higher layer parameter 'NZP-CSI-RS-ResourceSet' in which the higher layer parameter 'repetition' is set:

when QCL-TypeA (or QCL-TypeD) about CSI/RS resources contained in the predetermined higher layer parameter 'NZP-CSI-RS-ResourceSet' in which the higher layer parameter 'trs-Info' is set is applicable, the UE should assume that the TCI state indicates 'QCL-TypeD' about the same CSI-RS resources, or when QCL-TypeA (or QCL-TypeD) about CSI/RS resources contained in the predetermined higher layer parameter 'NZP-CSI-RS-ResourceSet' is applicable, the UE should assume that the TCI state indicates 'QCL-TypeD' about CSI-RS resources contained in the predetermined higher layer parameter 'NZP-CSI-RS-ResourceSet' in which the higher layer parameter 'repetition' is set, or when QCL-TypeC and QCL-TypeD about SS/PBCH blocks are applicable, the UE should assume that the TCI state indicates 'QCL-TypeD' about the same SS-PBCH blocks.

For DMRS of the PDCCH, the UE should assume that the TCI state indicates one of the following QCL type(s):

when QCL-TypeA (or QCL-TypeD) about CSI/RS resources contained in the predetermined higher layer parameter 'NZP-CSI-RS-ResourceSet' in which the higher layer parameter 'trs-Info' is set is applicable, the UE should assume that the TCI state indicates 'QCL-TypeD' about the same CSI-RS resources, or when QCL-TypeA (or QCL-TypeD) about CSI/RS resources contained in the predetermined higher layer parameter 'NZP-CSI-RS-ResourceSet' in which the higher layer parameter 'trs-Info' is set is applicable, the UE should assume that the TCI state indicates 'QCL-TypeD' about CSI-RS resources contained in the predetermined higher layer parameter 'NZP-CSI-RS-ResourceSet' in which the higher layer parameter 'repetition' is set, or when QCL-TypeA (or QCL-TypeD) about CSI/RS resources contained in the predetermined higher layer parameter 'NZP-CSI-RS-ResourceSet' that has been set without the higher layer parameters 'trs-Info' and 'repetition' is applicable, the UE should assume that the TCI state indicates 'QCL-TypeD' about the same CSI-RS resources, or For a DMRS of PDSCH, the UE should assume that the TCI state indicates one of the following QCL types:

when QCL-TypeA (or QCL-TypeD) about CSI/RS resources contained in the predetermined higher layer parameter 'NZP-CSI-RS-ResourceSet' in which the higher layer parameter 'trs-Info' is set is applicable, the UE should assume that the TCI state indicates 'QCL-TypeD' about the same CSI-RS resources, or when QCL-TypeA (or QCL-TypeD) about CSI/RS resources contained in the predetermined higher layer parameter 'NZP-CSI-RS-ResourceSet' in which the higher layer parameter 'trs-Info' is set is applicable, the UE should assume that the TCI state indicates 'QCL-TypeD' about the same CSI-RS resources contained in the predetermined higher layer parameter 'NZP-CSI-RS-ResourceSet' in which the higher layer parameter 'repetition' is set, or when QCL-TypeA (or QCL-TypeD) about CSI/RS resources contained in the predetermined higher layer parameter 'NZP-CSI-RS-ResourceSet' that has been set without the higher layer parameters 'trs-Info' and 'repetition' is applicable, the UE should assume that the TCI state indicates 'QCL-TypeD' about the same CSI-RS resources.

1.8. Bandwidth Part (BWP)

In the NR system to which the present disclosure is applicable, a frequency resource of up to 400 MHz may be allocated/supported for each CC. When a UE operating in such a wideband CC always operates with a radio frequency (RF) module for the entire CCs turned on, battery consumption of the UE may increase.

Alternatively, considering various use cases (e.g., enhanced mobile broadband (eMBB), ultra-reliable and low latency communication (URLLC), and massive machine type communication (mMTC), and so on) operating within a single wideband CC, a different numerology (e.g., SCS) may be supported for each frequency band within the CC.

Alternatively, the maximum bandwidth capability may be different for each UE.

In consideration of the above situation, the BS may indicate/configure the UE to operate only in a partial bandwidth instead of the entire bandwidth of the wideband CC. The partial bandwidth may be defined as a BWP.

A BWP may include consecutive RBs on the frequency axis, and one BWP may correspond to one numerology (e.g., SCS, CP length, slot/mini-slot duration, and so on).

The BS may configure a plurality of BWPs in one CC configured for the UE. For example, the BS may configure a BWP occupying a relatively small frequency region in a PDCCH monitoring slot, and schedule a PDSCH indicated by the PDCCH (or a PDSCH scheduled by the PDCCH) in a larger BWP. Alternatively, when UEs are concentrated on a specific BWP, the BS may configure another BWP for some of the UEs, for load balancing. Alternatively, the BS may exclude some spectrum of the entire bandwidth and configure both of the BWPs in the same slot in consideration of frequency-domain inter-cell interference cancellation between neighboring cells.

The BS may configure at least one DL/UL BWP for the UE associated with the wideband CC and activate at least one DL/UL BWP among the configured DL/UL BWP(s) at a specific time (through L1 signaling (e.g., DCI), MAC or RRC signaling, etc.). The activated DL/UL BWP may be called an active DL/UL BWP. The UE may fail to receive DL/UL BWP configurations from the BS during an initial access procedure or before setting up an RRC connection. A DL/UL BWP assumed by such a UE is defined as an initial active DL/UL BWP.

1.9. CORESET (Control Resource Set)

One CORESET includes $N^{CORESET}_{RB}$ resource blocks (RBs) in a frequency domain, and includes $N^{CORESET}_{symb}$ (where $N^{CORESET}_{symb}$ is set to 1, 2, or 3) symbols in a time domain.

One control channel element (CCE) includes 6 REGs (Resource Element groups), and one REG is identical to one RB on one OFDM symbol. REGs in the CORESET may be numbered in a time-first manner. Specifically, such numbering may start from '0' for the first OFDM symbol contained in the CORESET and for a radio block (RB) having the lowest number.

A plurality of CORESETs may be allocated to one UE. Each CORESET is associated only with one CCE-to-REG mapping.

CCE-to-REG mapping for one CORESET may be interleaved or non-interleaved.

Configuration information for the CORESET may be set by a higher layer parameter 'ControlResourceSet IE'.

In addition, configuration information for CORESET 0 (e.g., common CORESET) may be set by a higher layer parameter 'ControlResourceSetZero IE'.

1.10. Downlink (DL) Measurement

In order for the BS to support a UE handover operation or inter-cell interference coordination, the UE should perform DL measurement and has to report the measured result to the BS. Various measurement schemes (for example, measurement for Radio Link Monitoring (RLM), measurement for Channel State Information (CSI) report, and Radio Resource Management (RRM)) and various measurement values are used for DL measurement.

For example, RRM measurement may include DL measurement information used in a process of detecting Radio Link Failure (RLF) and searching for a new radio link. For example, measurement for CSI may include information about UE measurement in which the UE selects/calculates/reports a proper rank indicator, a precoding matrix indicator, and a channel quality indicator by measuring the quality of a DL channel. RRM measurement may include, for example, information about measurement for determining whether or not the UE is handed over.

RRM measurement may include Reference Signal Received Power (RSRP) measurement, Reference Signal Received Quality (RSRQ) measurement, Received Signal Strength Indicator (RSSI) measurement, signal to noise and interference ratio (SINR) measurement, etc.

In the NR system according to the present disclosure, at least one of a synchronization signal (SS) and a channel state information reference signal (CSI-RS) may be used as a reference signal for RRM measurement.

SS-RSRP is defined as a linear average of power of resource elements (REs) that carry an SSS contained in the measured frequency bandwidth. Measurement time resources for SS-RSRP may be limited to within an SS/PBCH Block Measurement Time Configuration (SMTC) window interval. If SS-RSRP is used for L1-RSRP that is set for report configuration, such measurement time resource limitation by the SMTC window interval is not applied.

In order to determine the SS-RSRP, a PBCH DM-RS as well as the SSS can be used. In addition, upon receiving a request from a higher layer, CSI-RS may also be used to determine the SS-RSRP. The SS-RSRP using either PBCH DM-RS or CSI-RS may be defined as a linear average of power of REs that carry the corresponding reference signals in consideration of power scaling of such reference signals. If SS-RSRP is not used for L1-RSRP, the CSI-RS is not additionally utilized for SS-RSRP determination.

SS-RSRP can be measured only by reference signals (RSs) corresponding to SS/PBCH blocks that have the same SS/PBCH block indexes and the same physical layer cell identifiers.

CSI-RSRP is defined as the linear average of power of resource elements (REs) carrying the CSI-RS. At this time, CSI-RS configured for RSRP measurement may be set in the measurement frequency bandwidth that is considered in the set CSI-RS occasions.

SS-RSRQ is defined as a specific value obtained by dividing a multiplication value by 'NR carrier RSSI', as represented by SS-RSRQ=N×SS-RSRP/(NR carrier RSSI) (where, a denominator is 'N×SS-RSRP', and a numerator is 'NR carrier RSSI'). Here, the multiplication value is obtained when the SS-RSRP is multiplied by the number (N) of resource blocks contained in the NR carrier RSSI measurement bandwidth. Here, the specific value is obtained by dividing the multiplication value by NR carrier RSSI. The denominator (N×SS-RSRP) and the numerator (NR carrier RSSI) are measured for the same resource block set.

In association with reception signals from all sources that include co-channel serving and non-serving cells, adjacent channel interference, thermal noise, etc., 'NR carrier RSSI' may include the linear average of total reception power measured by the UE only in OFDM symbols of measurement time resources within the measured bandwidth over N resource blocks. Measurement time resources for the NR carrier RSSI may be limited to within the SMTC window interval. In addition, if there is a message indicated by higher layer signaling, the NR carrier RSSI may be measured from slots and symbols that are indicated by higher layer signaling.

CSI-RSRP is defined as a specific value obtained by dividing a multiplication value by 'CSI-RSSI', as represented by CSI-RSRQ=N×CSI-RSRP/(CSI RSSI) (where, a denominator is 'N×CSI-RSRP', and a numerator is CSI-RSSI). Here, the multiplication value is obtained when the CSI-RSRP is multiplied by the number (N) of resource blocks contained in the CSI-RSSI measurement bandwidth. That is, the above-mentioned specific value is obtained by dividing the multiplication value by CSI-RSSI. The denominator (N×CSI-RSRP) and the numerator (CSI-RSSI) are measured for the same resource block set.

In association with reception signals from all sources that include co-channel serving and non-serving cells, adjacent channel interference, thermal noise, etc., 'CSI-RSSI' may include the linear average of total reception power measured by the UE only in OFDM symbols of measurement time resources within the measured bandwidth over N resource blocks. Measurement time resources for the CSI-RSSI may correspond to OFDM symbols including the configured CSI-RS occasions.

SS-SINR is defined as a specific value obtained when a linear average of power of resource elements (REs) carrying the SSS within the same frequency bandwidth is divided by a linear average of noise and interference power of REs carrying the SSS. Measurement time resources for SS-SINR are limited to within the SMTC window interval. For SS-SINR determination, a PBCH DMRS can be additionally applied to the SSS.

CSI-SINR is defined as a specific value obtained when a linear average of power of resource elements (REs) carrying the CSI-RS within the same frequency bandwidth is divided by a linear average of noise and interference power of REs carrying the CSI-RS.

1.11. RRC State

FIG. 17 is a diagram illustrating a radio resource control (RRC) state of a user equipment (UE) and RRC state transition of the UE. The UE may have only one RRC state at a specific time.

FIG. 18 is a conceptual diagram illustrating a concept of RRC state and RRC state transition of the UE and a procedure for supporting mobility between NR/NGC (NR/Next Gen Core) and E-UTRAN/EPC (Evolved-Universal Terrestrial Radio Access Network/Evolved Packet Core).

RRC state indicates whether the RRC layer of the UE is logically connected to an NG Radio Access Network (NG RAN) layer. If RRC connection is established, the UE may be in an RRC_CONNECTED or RRC_INACTIVE state. Alternatively, if RRC connection is not established, the UE is in the RRC_IDLE state.

If the UE is in the RRC_CONNECTED or RRC_INACTIVE state, the UE has RRC connection, such that the NG RAN can recognize UE presence for each cell. In contrast, if the UE is in the RRC_IDLE state, it is impossible for the UE to be recognized by the NG RAN, and the UE is managed by a core network in units of a tracking area larger in size than the cell.

If a first user turns on (or powers on) the UE, the UE finds a proper cell and then maintains the RRC IDLE state in the found cell. If it is necessary to establish RRC connection only, the UE in the RRC IDLE state may establish RRC connection to the NG RAN, and may transition to the RRC_CONNECTED or RRC_INACTIVE state.

RRC states of the UE have the following features.
(1) RRC_IDLE state
Discontinuous reception may be configured in the UE by higher layer signaling.
UE mobility is controlled based on network configuration.
UE monitors a paging channel.
UE measures a neighbor cell, and performs cell (re) selection.
UE obtains system information.
(2) RRC_INACTIVE State
Discontinuous reception may be configured in the UE by a higher layer or a radio resource control (RRC) layer.
UE mobility is controlled based on network configuration.
UE stores Access Stratum (AS) context therein.
UE monitors a paging channel.
UE performs neighbor cell measurement and cell (re) selection.
If UE moves out of a RAN-based notification region, the UE updates a RAN-based notification area.
UE obtains system information.
(3) RRC_CONNECTED State
UE stores Access Stratum (AS) context therein.
UE transmits/receives unicast data.
In a lower layer, UE-specific DRX may be configured in the UE.
For an increased bandwidth, the UE supporting Carrier Aggregation (CA) can use one or more SCells combined with a Special Cell (SpCell).
For an increased bandwidth, the UE supporting Dual Connectivity (DC) can use a Secondary Cell Group (SCG) combined with a Master Cell Group (MCG).
UE monitors a paging channel.
When data is scheduled for the UE, the UE monitors control channels associated with a shared data channel.
UE provides a channel quality and feedback information.
UE performs neighbor cell measurement and cell (re) selection.
UE obtains system information.

Specifically, the UE staying in the RRC_IDLE and/or RRC_INACTIVE state can operate as follows

TABLE 9

| | UE procedure |
|---|---|
| $1^{st}$ step | a public land mobile network (PLMN) selection when a UE is switched on |
| $2^{nd}$ Step | cell (re)selection for searching a suitable cell |
| $3^{rd}$ Step | tune to its control channel (camping on the cell) |
| $4^{th}$ Step | Location registration and a RAN-based Notification Area (RNA) update |

1.12. DRX (Discontinuous Reception)

The UE according to embodiments of the present disclosure can perform the DRX operation. The UE in which DRX is set may discontinuously receive DL signals, thereby reducing power consumption. DRX can be performed in the RRC(Radio Resource Control) IDLE state, the RRC_INACTIVE state, and/or the RRC_CONNECTED state. In the RRC_IDLE state and the RRC_INACTIVE state, DRX is used to discontinuously receive a paging signal. Hereinafter, DRX to be performed in the RRC_CONNECTED state will be described in detail (RRC_CONNECTED DRX).

FIG. 19 is a diagram illustrating a discontinuous reception (DRX) cycle of the UE applicable to the present disclosure. In FIG. 19, the DRX cycle corresponds to a DRX cycle of the UE staying in the RRC_CONNECTED state.

Referring to FIG. 19, the DRX cycle includes On Duration and Opportunity for DRX. The DRX cycle defines a time interval in which On Duration is periodically repeated. On Duration is a time period during which the UE monitors to receive a PDCCH. When DRX is configured, the UE performs PDCCH monitoring during the On Duration. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception occasions (e.g., slots having PDCCH search spaces) may be configured discontinuously according to a DRX configuration in the present disclosure. On the contrary, if DRX is not configured, PDCCH monitoring/reception may be performed continuously in the time domain, when the afore-described/proposed procedures and/or methods are performed. For example, if DRX is not configured, PDCCH reception occasions (e.g., slots having PDCCH search spaces) may be configured continuously in the present disclosure. PDCCH monitoring may be limited in a time period configured as a measurement gap, irrespective of whether DRX is configured.

Table 10 describes a UE operation related to DRX (in the RRC_CONNECTED state). Referring to Table 10, DRX configuration information is received by higher-layer (RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure, as illustrated in FIG. 19.

TABLE 10

| | Type of signals | UE procedure |
|---|---|---|
| $1^{st}$ step | RRC signalling (MAC-CellGroupConfig) | Receive DRX configuration information |
| $2^{nd}$ Step | MAC CE ((Long) DRX command MAC CE) | Receive DRX command |
| $3^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the length of the starting duration of a DRX cycle.

Value of drx-InactivityTimer: defines the length of a time duration in which the UE is in the awake state after a PDCCH occasion in which a PDCCH indicating initial UL or DL data has been detected.

Value of drx-HARQ-RTT-TimerDL: defines the length of a maximum time duration from reception of a DL initial transmission to reception of a DL retransmission.

Value of drx-HARQ-RTT-TimerDL: defines the length of a maximum time duration from reception of a grant for a DL initial transmission to reception of a grant for a UL retransmission.

drx-LongCycleStartOffset: defines the time duration and starting time of a DRX cycle.

drx-ShortCycle (optional): defines the time duration of a short DRX cycle.

When at least one of drx-OnDurationTimer, drx-InactivityTimer, drx-HARQ-RTT-TimerDL, or drx-HARQ-RTT-TimerDL is running, the UE performs PDCCH monitoring in each PDCCH occasion, while staying in the awake state.

2. Unlicensed Band System

FIG. 20 illustrates an exemplary wireless communication system supporting an unlicensed band, which is applicable to the present disclosure.

Herein, a cell operating in a licensed band (L-band) is defined as an L-cell, and a carrier in the L-cell is defined as a (DL/UL) LCC. A cell operating in an unlicensed band (U-band) is defined as a U-cell, and a carrier in the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on an LCC and a UCC where carrier aggregation is applied as shown in FIG. 20 (a), the LCC and the UCC may be set to a primary CC (PCC) and a secondary CC (SCC), respectively.

The BS and UE may transmit and receive signals on one UCC or on a plurality of UCCs where the carrier aggregation is applied as shown in FIG. 20 (b). In other words, the BS and UE may transmit and receive signals on UCC(s) with no LCC.

Signal transmission and reception operations in U-bands, which will be described later in the present disclosure, may be applied to all of the aforementioned deployment scenarios (unless specified otherwise).

2.1. Radio Frame Structure for U-Band

For operation in U-bands, LTE frame structure type 3 (see FIG. 3) or the NR frame structure (see FIG. 7) may be used. The configuration of OFDM symbols reserved for UL/DL signal transmission in a frame structure for U-bands may be determined by a BS. In this case, the OFDM symbol may be replaced with an SC-FDM(A) symbol.

To transmit a DL signal in a U-band, the BS may inform a UE of the configuration of OFDM symbols used in subframe #n through signaling. Herein, a subframe may be replaced with a slot or a time unit (TU).

Specifically, in the LTE system supporting U-bands, the UE may assume (or recognize) the configuration of occupied OFDM symbols in subframe #n based on a specific filed in DCI (e.g., 'Subframe configuration for LAA' field, etc.), which is received in subframe #n−1 or subframe #n from the BS.

Table 11 shows how the Subframe configuration for LAA field indicates the configuration of OFDM symbols used to transmit DL physical channels and/or physical signals in the current or next subframe.

TABLE 11

| Value of 'Subframe configuration for LAA' field in current subframe | Configuration of occupied OFDM symbols (current subframe, next subframe) |
|---|---|
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14,* ) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

To transmit a UL signal in a U-band, the BS may provide information on a UL transmission interval to the UE through signaling.

Specifically, in the LTE system supporting U-bands, the UE may obtain 'UL duration' and 'UL offset' information for subframe #n from the UL duration and offset' field in detected DCI.

Table 12 shows how the UL duration and offset field indicates the configurations of a UL offset and a UL duration.

TABLE 12

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |

TABLE 12-continued

| Value of 'UL duration and offset' field | UL offset, l (in subframes) | UL duration, d (in subframes) |
|---|---|---|
| 11001 | 8 | 1 |
| 11010 | 6 | 2 |
| 13011 | 6 | 3 |
| 11100 | 6 | 4 |
| 11101 | 6 | 5 |
| 11110 | 6 | 6 |
| 11111 | reserved | reserved |

For example, when the UL duration and offset field configures (or indicates) a UL offset 1 and UL a duration d for subframe #n, the UE may not need to receive DL physical channels and/or physical signals in subframe #n+l+i (where i=0, 1, . . . , d−1)

2.2. Downlink Channel Access Procedures

To transmit a DL signal in a U-band, a BS may perform a channel access procedure (CAP) for the U-band as follows. In the following description, it is assumed that a BS is basically configured with a PCell corresponding to an L-band and at least one SCell, each corresponding to a U-band. The U-band may be referred to as a licensed assisted access (LAA) SCell. Hereinafter, a description will be given of DL CAP operation applicable to the present disclosure. In this case, the DL CAP operation may be equally applied when the BS is configured only with U-bands.

2.2.1. Channel Access Procedure for Transmission(s) Including PDSCH/PDCCH/EPDCCH A BS may transmit a transmission including a PDSCH/PDCCH/EPDCCH on a carrier on which LAA SCell(s) transmission(s) are performed after sensing whether the channel is idle during the slot durations of a defer duration Td and after a counter N becomes zero in step 4. In this case, the counter N is adjusted by sensing the channel for an additional slot duration according to the following steps.

1) N is set to Ninit (N=Ninit), where Ninit is a random number uniformly distributed between 0 and CWp. Then, step 4 proceeds.
2) If N>0 and the BS chooses to decrease the counter, N is set to N−1 (N=N−1).
3) The channel for the additional slot duration is sensed. If the additional slot duration is idle, step 4 proceeds. Otherwise, step 5 proceeds.
4) If N=0, the corresponding process is stopped. Otherwise, step 2 proceeds.
5) The channel is sensed until either a busy slot is detected within an additional defer duration Td or all the slots of the additional defer duration Td are detected to be idle.
6) If the channel is sensed to be idle during all the slot durations of the additional defer duration Td, step 4 proceeds. Otherwise, step 5 proceeds.

The CAP for the transmission including the PDSCH/PDCCH/EPDCCH performed by the BS may be summarized as follows.

FIG. 21 is a diagram for explaining a CAP for U-band transmission applicable to the present disclosure.

For DL transmission, a transmission node (e.g., BS) may initiate a CAP to operate in LAA SCell(s), each corresponding to a U-band cell (S2110).

The BS may randomly select a backoff counter N within a contention window (CW) according to step 1. In this case, N is set to an initial value, Ninit (S2120). Ninit may have a random value between 0 and CWp.

If the backoff counter value (N) is 0 (YES in S2130), the BS terminates the CAP according to step 4 (S2132). Then, the BS may transmit a transmission (Tx) burst including the PDSCH/PDCCH/EPDCCH (S2134). If the backoff counter value is non-zero (NO in S2130), the BS decreases the backoff counter value by 1 according to step 2 (S2140).

The BS checks whether the channel of the LAA SCell(s) is idle (S2150). If the channel is idle (YES in S2150), the BS checks whether the backoff counter value is 0 (S2130).

If the channel is not idle in S2150, that is, if the channel is busy (NO in S2150), the BS checks whether the corresponding channel is idle during the defer duration Td (longer than or equal to 25 usec), which is longer than the slot duration (e.g., 9 usec), according to step 5 (S2160). If the channel is idle (YES in S2170), the BS may resume the CAP.

For example, when the backoff counter value Ninit is 10, if the channel is determined to be busy after the backoff counter value is reduced to 5, the BS determines whether the channel is idle by sensing the channel during the defer duration. In this case, if the channel is idle during the defer duration, the BS performs the CAP again starting at the backoff counter value of 5 (or at 4 by decreasing the backoff counter value by 1), instead of configuring the backoff counter value Ninit.

On the other hand, if the channel is busy during the defer duration (NO in S2170), the BS performs steps S2160 again to check whether the channel is idle during a new defer duration.

When the BS does not transmit the transmission including the PDSCH/PDCCH/EPDCCH on the carrier on which the LAA SCell(s) transmission(s) are performed after step 4 in the above procedure, the BS may transmit the transmission including the PDSCH/PDCCH/EPDCCH on the carrier if the following conditions are satisfied.

When the BS is ready to transmit the PDSCH/PDCCH/EPDCCH and the channel is sensed to be idle at least in a slot duration Tsl; and when the channel is sensed to be idle during all the slot durations of the defer duration Td immediately before the transmission.

If the channel is sensed not to be idle during the slot duration Tsl when the BS senses the channel after being ready to transmit or if the channel is sensed not to be idle during any one of the slot durations of the defer duration Td immediately before the intended transmission, the BS proceeds to step 1 after sensing the channel to be idle during the slot durations of the defer duration Td.

The defer duration Td includes a duration Tf (=16 us) immediately followed by mp consecutive slot durations. Here, each slot duration (Tsl) is 9 us long, and Tf includes an idle slot duration Tsl at the start thereof.

When the BS senses the channel during the slot duration Tsl, if the power detected by the BS for at least 4 us within the slot duration is less than an energy detection threshold X Thresh, the slot duration Tsl is considered to be idle. Otherwise, the slot duration Tsl is considered to be busy.

$CW_{min,p} \leq CW_p \leq CW_{max,p}$ represents the CW. The adjustment of CWp will be described in detail in section 2.2.3.

$CW_{min,p}$ and $CW_{max,p}$ are selected before step 1 of the above procedure.

$m_p$, $CW_{min,p}$, and $C_{max,p}$ are determined based on channel access priority classes associated with transmissions at the BS (see Table 13 below).

The adjustment of $X_{Thresh}$ will be described in section 2.2.4.

TABLE 13

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

When N>0 in the above procedure, if the BS transmits a discovery signal not including the PDSCH/PDCCH/EPDCCH, the BS may not decrease the counter N during slot duration(s) overlapping with the discovery signal transmission.

The BS may not continuously perform transmission on the carrier on which the LAA SCell(s) transmission(s) are performed for a period exceeding Tmcot,p in Table 13 above.

For p=3 and p=4 in Table 13 above, if the absence of any other technologies sharing the carrier can be guaranteed on a long term basis (e.g. by level of regulation), Tmcot,p is set to 10 ms. Otherwise, Tmcot,p is set to 8 ms.

2.2.2. Channel Access Procedure for Transmissions Including Discovery Signal Transmission(s) and not Including PDSCH When a BS has a transmission duration less than or equal to 1 ms, the BS may performs transmission including a discovery signal but not including a PDSCH on a carrier on which LAA SCell(s) transmission(s) are performed immediately after sensing that the channel is idle at least for a sensing interval Tdrs of 25 us. Tdrs includes a duration Tf (=16 us) immediately followed by one slot duration Tsl of 9 us. Tf includes an idle slot duration Tsl at the start thereof. When the channel is sensed to be idle during the slot durations of Tdrs, the channel is considered to be idle for Tdrs.

2.2.3. Contention Window Adjustment Procedure

If a BS transmits transmissions including PDSCHs that are associated with the channel access priority class p on a carrier, the BS maintains the CW value CWp and adjusts CWp for the transmissions before step 1 of the procedure described in section 2.2.1 (i.e., before performing the CAP) according to the following steps.

1> For every priority class p∈{1,2,3,4}, CWp is set to CWmin, p.
2> If at least Z=80% of HARQ-ACK values corresponding to PDSCH transmission(s) in reference subframe k are determined as NACK, CWp for every priority class p∈{1,2,3,4} increases to a next higher allowed value, and step 2 remains. Otherwise, step 1 proceeds.

In other words, the probability that the HARQ-ACK values corresponding to the PDSCH transmission(s) in reference subframe k are determined as NACK is at least 80%, the BS increases the CW values configured for the individual priority classes to next higher allowed values, respectively. Alternatively, the BS may maintain the CW value configured for each priority class as an initial value.

In this case, reference subframe k is the starting subframe of the most recent transmission on the carrier made by the BS, for which at least some HARQ-ACK feedback is expected to be available.

The BS may adjust the value of CWp for every priority class p∈{1,2,3,4} based on given reference subframe k only once.

If CWp=CWmax, p, the next higher allowed value for adjusting CWp is CWmax,p.

To determine the probability Z that the HARQ-ACK values corresponding to the PDSCH transmission(s) in reference subframe k are determined as NACK, the following may be considered.

When the BS's transmission(s) for which HARQ-ACK feedback is available start in the second slot of subframe k, HARQ-ACK values corresponding to PDSCH transmission(s) in subframe k+1 are also used in addition to the HARQ-ACK values corresponding to the PDSCH transmission(s) in subframe k.

When the HARQ-ACK values correspond to PDSCH transmission(s) on an LAA SCell that are assigned by a (E)PDCCH transmitted on the same LAA SCell, If no HARQ-ACK feedback is detected for a PDSCH transmission by the BS, or if the BS detects 'DTX' state, 'NACK/DTX' state, or 'any' state, it is counted as NACK.

When the HARQ-ACK values correspond to PDSCH transmission(s) on an LAA SCell that are assigned by a (E)PDCCH transmitted on another serving cell, If the HARQ-ACK feedback for a PDSCH transmission is detected by the BS, the 'NACK/DTX' state or the 'any' state is counted as NACK and the 'DTX' state is ignored.

If no HARQ-ACK feedback is detected for a PDSCH transmission by the BS,

If PUCCH format 1b with channel selection, which is configured by the BS, is expected to be used by the UE, the 'NACK/DTX' state corresponding to 'no transmission' is counted as NACK, and the 'DTX' state corresponding to 'no transmission' is ignored. Otherwise, the HARQ-ACK for the PDSCH transmission is ignored.

When a PDSCH transmission has two codewords, the HARQ-ACK value of each codeword is considered separately.

Bundled HARQ-ACKs across M subframes are considered as M HARQ-ACK responses.

If the BS transmits transmissions including a PDCCH/EPDCCH with DCI format 0A/0B/4A/4B and not including a PDSCH that are associated with the channel access priority class p on a channel starting from time t0, the BS maintains the CW value CWp and adjusts CWp for the transmissions before step 1 of the procedure described in section 2.2.1 (i.e., before performing the CAP) according to the following steps.

1> For every priority class p∈{1,2,3,4}, CWp is set to CWmin, p.
2> If less than 10% of the UL transport blocks scheduled for the UE by the BS according to a Type 2 CAP (which will be described in section 2.3.1.2) in a time interval from t0 and t0+TCO are received successfully, CWp for every priority class p∈{1,2,3,4} increases to a next higher allowed value, and step 2 remains. Otherwise, step 1 proceeds.

The calculation of TCO will be described in section 2.3.1.

If CWp=CWmax, p is consecutively used K times to generate Ninit, CWp is reset to CWmin, p only for the priority class p for which CWp=CWmax, p is consecutively used K times to generate Ninit. In this case, K is selected by the BS from a set of values {1, 2, . . . 8} for each priority class p∈{1, 2, 3, 4}

2.2.4. Energy Detection Threshold Adaptation Procedure

ABS accessing a carrier on which LAA SCell(s) transmission(s) are performed may set an energy detection threshold (XThresh) to be less than or equal to a maximum energy detection threshold XThresh_max.

The maximum energy detection threshold XThresh_max is determined as follows.

If the absence of any other technologies sharing the carrier can be guaranteed on a long term basis (e.g., by level of regulation), $$X_{Thresh\_max} = \min\left\{ \begin{array}{l} T_{max} + 10 \text{ dB}, \\ X_r \end{array} \right\}$$

Xr is a maximum energy detection threshold defined by regulatory requirements in dBm when such requirements are defined. Otherwise, $X_r = T_{max} + 10$ dB.
Otherwise, $$X_{Thres\_max} = \max\left\{ \begin{array}{l} -72 + 10 \cdot \log10(BW \text{ MHz}/20 \text{ MHz})\text{dBm}, \\ \min\left\{ \begin{array}{l} T_{max}, \\ T_{max} - T_A + (P_H + 10 \cdot \log10(BW \text{ MHz}/20 \text{ MHz}) - P_{TX}) \end{array} \right\} \end{array} \right\}$$

Each variable is defined as follows:
$T_A = 10$ dB for transmission(s) including PDSCH;
$T_A = 5$ dB for transmissions including discovery signal transmission(s) and not including PDSCH;
$P_H = 23$ dBm:
$P_{TX}$ is the set maximum eNB output power in dBm for the carrier;
eNB uses the set maximum transmission power over a single carrier irrespective of whether single carrier or multi-carrier transmission is employed
$T_{max}$ (dBm)=10·log 10(3.16228·10$^{-8}$ (mW/MHz)·BWMH=(MHz));
BWMHz is the single carrier bandwidth in MHz.

2.2.5. Channel Access Procedure for Transmission(s) on Multiple Carriers

A BS may access multiple carriers on which LAA Scell(s) transmission(s) are performed according to one of the following Type A or Type B procedures.

2.2.5.1. Type A Multi-Carrier Access Procedures

A BS may perform channel access on each carrier $c_i \in C$ according to the aforementioned procedures, where C is a set of carriers on which the BS intends to transmit, and i=0, 1, . . . , q−1, where q is the number of carriers on which the BS intends to transmit.

The counter N described in section 2.2.1 (i.e., the counter N considered in the CAP) is determined for each carrier $c_i$. The counter for each carrier is denoted as $N_{c_i}$. $N_{c_i}$ is maintained according to clause 2.2.5.1.1 or 2.2.5.1.2.

2.2.5.1.1. Type A1

The counter N described in section 2.2.1 (i.e., the counter N considered in the CAP) is independently determined for each carrier $c_i$, and the counter for each carrier is denoted as $N_{c_i}$.

When the BS ceases transmission on any one carrier $c_j \in C$ for each carrier (where $c_i \neq c_j$), if the absence of any other technologies sharing the carrier cannot be guaranteed on a long term basis (e.g. by level of regulation), the BS may resume decreasing $N_{c_i}$ when an idle slot is detected after waiting for a duration of $4 \cdot T_{sl}$, or after reinitializing $N_{c_i}$.

2.2.5.1.2. Type A2

The counter N may be determined as described in section 2.2.1 for each carrier $c_i \in C$ and the counter for each carrier is denoted as $N_{c_j}$, where $c_j$ is a carrier having the largest CWp value. For each carrier $c_i$, $N_{c_i} = N_{c_j}$.

When a BS ceases transmission on any one carrier for which $N_{c_i}$ is determined, the BS reinitializes $N_{c_i}$ for all carriers.

2.2.5.2. Type B Multi-Carrier Access Procedure

A carrier $c_j \in C$ may be selected by a BS as follows.

The BS uniformly randomly selects $c_j$ from C before performing transmission on multiple carriers $c_i \in C$, or The BS selects $c_j$ no more frequently than once every 1 second.

C is a set of carriers on which the BS intends to transmit, and i=0, 1, . . . , q−1, where q is the number of carriers on which the BS intends to transmit.

To perform transmission on the carrier $c_j$, the BS performs channel access on the carrier $c_j$ according to the procedures described in section 2.2.1 with the following modifications, which will be described in 2.2.5.2.1 or 2.2.5.2.2.

To perform transmission on a carrier $c_i \neq c_j$ among carriers $c_i \in C$,

For each carrier $c_i$, the BS senses a carrier $c_i$ for at least a sensing interval $T_{mc} = 25$ us immediately before transmission on the carrier $c_j$. Then, the BS may transmit on the carrier $c_i$ immediately after sensing the carrier $c_i$ to be idle for at least the sensing interval $T_{mc}$. The carrier $c_i$ is considered to be idle for $T_{mc}$ if the channel is sensed to be idle during all the time durations in which such sensing for determining the idle state is performed on the carrier $c_j$ in the given interval $T_{mc}$ The BS may not continuously perform transmission on the carrier $c_i \neq c_j$ (where $c_i \in C$) for a period exceeding Tmcot,p given in Table 6, where Tmcot,p is determined based on channel access parameters used for the carrier $c_j$.

2.2.5.2.1. Type B1

A single CWp value is maintained for a set of carriers C.

To determine CWp for channel access on a carrier $c_j$, step 2 of the procedure described in section 2.2.3 may be modified as follows.

If at least Z=80% of HARQ-ACK values corresponding to PDSCH transmission(s) in reference subframe k of all carriers $c_i \in C$ are determined as NACK, CWp for each priority class p∈{1,2,3,4} increases to a next higher allowed value. Otherwise, step 1 proceeds.

2.2.5.2.2. Type B2

A CWp value is maintained independently for each carrier $c_i \in C$ according to the procedure described in section 2.2.3. To determine Ninit for a carrier $c_j$, the CWp value of a carrier $c_{j1} \in C$ is used, where $c_{j1}$ is a carrier with the largest CWp value among all carriers in the set C.

2.3. Uplink Channel Access Procedures

A UE and a BS scheduling UL transmission for the UE may perform the following procedures to access channel(s) on which LAA SCell(s) transmission(s) are performed. In the following description, it is assumed that a UE and a BS are basically configured with a PCell corresponding to an L-band and at least one SCell, each corresponding to a U-band. The U-band may be referred to as an LAA SCell. Hereinafter, a description will be given of UL CAP operation applicable to the present disclosure. In this case, the UL CAP operation may be equally applied when the UE and BS are configured only with U-bands.

2.3.1. Channel Access Procedure for Uplink Transmission(s)

A UE may access a carrier on which LAA SCell(s) UL transmission(s) are performed according to either a Type 1 UL CAP or a Type 2 UL CAP. The Type 1 CAP will be described in section 2.3.1.1, and the Type 2 CAP will be described in section 2.3.1.2.

If a UL grant scheduling PUSCH transmission indicates the Type 1 CAP, the UE performs the Type 1 CAP for transmitting transmissions including the PUSCH transmission unless specified otherwise in this clause.

If a UL grant scheduling PUSCH transmission indicates the Type 2 CAP, the UE performs the Type 2 CAP for transmitting transmissions including the PUSCH transmission unless specified otherwise in this clause.

The UE performs the Type 1 CAP for transmitting an SRS not including PUSCH transmission. A UL channel access priority class p=1 is used for SRS transmission including no PUSCH.

TABLE 14

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms.

When the 'UL configuration for LAA' field configures a 'UL offset' l and a 'UL duration' d for subframe n, If the end of UE transmission occurs in or before subframe n+l+d−1, the UE may use the Type 2 CAP for transmission in subframe n+l+i (where i=0, 1, ..., d−1).

When the UE is scheduled to perform transmission including a PUSCH in a set of subframes $n_0, n_1, \ldots, n_{w-1}$ using PDCCH DCI format 0B/4B, if the UE is incapable of accessing a channel for transmission in subframe nk, the UE shall attempt to make a transmission in subframe nk+1 according to the channel access type indicated by DCI, where k∈{0,1, ... w−2}, and w is the number of scheduled subframes indicated by the DCI.

When the UE is scheduled to perform transmission including a PUSCH without gaps in a set of subframes $n_0, n_1, \ldots, n_{w-1}$ using one or more PDCCH DCI Format 0A/0B/4A/4B, if the UE performs transmission in subframe $n_k$ after accessing a carrier according to one of the Type 1 or Type 2 UL CAPs, the UE may continue transmission in subframes after nk, where k∈{0,1, ... w−1}

If the start of a UE transmission in subframe n+1 immediately follows the end of a UE transmission in subframe n, the UE is not expected to be indicated with different channel access types for the transmissions in the subframes.

When the UE is scheduled to perform transmission without gaps in subframes $n_0, n_1, \ldots, n_{w-1}$ using one or more PDCCH DCI Format 0A/0B/4A/4B, if the UE stops transmitting during or before subframe nk1 (where k1∈{0,1, ... w−2}), and if the UE senses that the channel is continuously idle after stopping the transmission, the UE may transmit after subframe nk2 (where k2∈{1, ... w−1}) using the Type 2 CAP. If the UE senses that the channel is not continuously idle after stopping the transmission, the UE may transmit after subframe nk2 (where k2∈{1, ... w−1}) using the Type 1 CAP with a UL channel access priority class indicated by DCI corresponding to subframe nk2.

When the UE receives a UL grant, if the DCI indicates the start of PUSCH transmission in subframe n using the Type 1 CAP, and if the UE has an ongoing Type 1 CAP before subframe n, If a UL channel access priority class value p1 used for the ongoing Type 1 CAP is greater than or equal to a UL channel access priority class value p2 indicated by the DCI, the UE may perform the PUSCH transmission in response to the UL grant by accessing the carrier based on the ongoing Type 1 CAP.

If the UL channel access priority class value p1 used for the ongoing Type 1 CAP is smaller than the UL channel access priority class value p2 indicated by the DCI, the UE terminates the ongoing CAP.

When the UE is scheduled to transmit on a set of carriers C in subframe n, if UL grants scheduling PUSCH transmissions on the set of carriers C indicate the Type 1 CAP, if the same 'PUSCH starting position' is indicated for all carriers in the set of carriers C, and if the carrier frequencies of the set of carriers C are a subset of one of the predetermined carrier frequency sets, The UE may perform transmission on a carrier $c_i \in C$ using the Type 2 CAP.

If the Type 2 CAP is performed on the carrier $c_i$ immediately before the UE performs transmission on a carrier $c_j \in C$ (where i≠J), and If the UE has accessed the carrier $c_j$ using the Type 1 CAP, The UE selects the carrier $c_j$ uniformly and randomly from the set of carriers C before performing the Type 1 CAP on any carrier in the set of carriers C.

When the BS has transmitted on the carrier according to the CAP described in section 2.2.1, the BS may indicate the Type 2 CAP in DCI of a UL grant scheduling transmission including a PUSCH on a carrier in subframe n.

Alternatively, when the BS has transmitted on the carrier according to the CAP described in section 2.2.1, the BS may indicate using the 'UL configuration for LAA' field that the UE may perform the Type 2 CAP for transmission including a PUSCH on a carrier in subframe n.

Alternatively, when subframe n occurs within a time interval that starts at t0 and ends at t0+TCO, the eNB may schedule transmission including a PUSCH on a carrier in subframe n, which follows transmission by the BS on a carrier with a duration of $T_{short\_ul}$=25, where $T_{CO}=T_{mcot,p}+T_g$. The other variables are defined as follows.

t0: a time instant when the BS starts transmission

Tmcot,p: a value determined by the BS as described in section 2.2

Tg: the total duration of all gaps greater than 25 us that occur between DL transmission from the BS and UL transmission scheduled by the BS and between any two UL transmissions scheduled by the BS starting from t0

The BS schedules UL transmissions between t0 and t0+TCO in consecutive subframes if the UL transmissions are capable of being scheduled contiguously.

For a UL transmission on a carrier that follows a transmission by the BS on the carrier within a duration of $T_{short\_ul}$=25 us, the UE may use the Type 2 CAP for the UL transmission.

If the BS indicates the Type 2 CAP for the UE in the DCI, the BS indicates the channel access priority class used to obtain access to the channel in the DCI.

2.3.1.1. Type 1 UL Channel Access Procedure

A UE may perform transmission using the Type 1 CAP after sensing a channel to be idle during the slot durations of a defer duration Td and after a counter N becomes zero in step 4. In this case, the counter N is adjusted by sensing a channel for additional slot duration(s) according to the following steps.

1) N is set to Ninit (N=Ninit), where Ninit is a random number uniformly distributed between 0 and CWp. Then, step 4 proceeds.
2) If N>0 and the UE chooses to decrease the counter, N is set to N-1 (N=N-1).
3) The channel for the additional slot duration is sensed. If the additional slot duration is idle, step 4 proceeds. Otherwise, step 5 proceeds.
4) If N=0, the corresponding process is stopped. Otherwise, step 2 proceeds.
5) The channel is sensed until either a busy slot is detected within an additional defer duration Td or all the slots of the additional defer duration Td are detected to be idle.
6) If the channel is sensed to be idle during all the slot durations of the additional defer duration Td, step 4 proceeds. Otherwise, step 5 proceeds.

The Type 1 UL CAP performed by the UE may be summarized as follows.

For UL transmission, a transmission node (e.g., UE) may initiate a CAP to operate in LAA SCell(s), each corresponding to a U-band cell (S2110).

The UE may randomly select a backoff counter N within a CW according to step 1. In this case, N is set to an initial value, Ninit (S2120). Ninit may have a random value between 0 and CWp.

If the backoff counter value (N) is 0 (YES in S2130), the UE terminates the CAP according to step 4 (S2132). Then, the UE may transmit a Tx burst (S2134). If the backoff counter value is non-zero (NO in S2130), the UE decreases the backoff counter value by 1 according to step 2 (S2140).

The UE checks whether the channel of the LAA SCell(s) is idle (S2150). If the channel is idle (YES in S2150), the UE checks whether the backoff counter value is 0 (S2130).

If the channel is not idle in S2150, that is, if the channel is busy (NO in S2150), the UE checks whether the corresponding channel is idle during the defer duration Td (longer than or equal to 25 usec), which is longer than the slot duration (e.g., 9 usec), according to step 5 (S2160). If the channel is idle (YES in S2170), the UE may resume the CAP.

For example, when the backoff counter value Ninit is 10, if the channel is determined to be busy after the backoff counter value is reduced to 5, the UE determines whether the channel is idle by sensing the channel during the defer duration. In this case, if the channel is idle during the defer duration, the UE performs the CAP again starting at the backoff counter value of 5 (or at 4 by decreasing the backoff counter value by 1), instead of configuring the backoff counter value Ninit.

On the other hand, if the channel is busy during the defer duration (NO in S2170), the UE performs steps S2160 again to check whether the channel is idle during a new defer duration.

When the UE does not transmit the transmission including the PUSCH on the carrier on which the LAA SCell(s) transmission(s) are performed after step 4 in the above procedure, the UE may transmit the transmission including the PUSCH on the carrier if the following conditions are satisfied:

When the UE is ready to perform the transmission including the PUSCH and the channel is sensed to be idle at least in a slot duration Tsl; and When the channel is sensed to be idle during all the slot durations of the defer duration Td immediately before the transmission including the PUSCH.

If the channel is sensed not to be idle during the slot duration Tsl when the UE senses the channel after being ready to transmit or if the channel is sensed not to be idle during any one of the slot durations of the defer duration Td immediately before the intended transmission including the PUSCH, the UE proceeds to step 1 after sensing the channel to be idle during the slot durations of the defer duration Td.

The defer duration Td includes a duration Tf (=16 us) immediately followed by mp consecutive slot durations. Here, each slot duration (Tsl) is 9 us long, and Tf includes an idle slot duration Tsl at the start thereof.

When the UE senses the channel during the slot duration Tsl, if the power detected by the UE for at least 4 us within the slot duration is less than an energy detection threshold X Thresh, the slot duration Tsl is considered to be idle. Otherwise, the slot duration Tsl is considered to be busy.

$CW_{min,p} \cdot CW_p \leq CW_{max,p}$ represents the CW. The adjustment of CWp will be described in detail in section 2.3.2.

$CW_{min,p}$ and $CW_{max,p}$ are selected before step 1 of the above procedure.

$m_p$, $CW_{min,p}$, and $CW_{max,p}$ are determined based on channel access priority classes signaled to the UE (see Table 14 above).

The adjustment of $X_{Thresh}$ will be described in section 2.3.3.

2.3.1.2. Type 2 UL Channel Access Procedure

If a UE uses the Type 2 CAP for transmission including a PUSCH, the UE may transmit the transmission including the PUSCH immediately after sensing a channel to be idle for at least a sensing interval $T_{short\_ul}$. Tshort_ul includes a duration $T_f$=16 us immediately followed by one slot duration $T_{sl}$=9 us, and $T_f$ includes an idle slot duration $T_{sl}$ at the start thereof. When the channel is sensed to be idle during the slot durations of Tshort_ul, the channel is considered to be idle for Tshort_ul.

2.3.2. Contention Window Adjustment Procedure

If a UE transmits transmissions using the Type 1 channel access procedure that are associated with the channel access priority class p on a carrier, the UE maintains the CW value CWp and adjusts CWp for the transmissions before step 1 of the procedure described in section 2.3.1 (i.e., before performing the CAP) according to the following steps.

If the value of a new data indicator (NDI) for at least one HARQ process associated with HARQ_ID_ref is toggled, For every priority class p∈{1,2,3,4} CWp is set to CWmin,p.

Otherwise, CWp for every priority class p∈{1,2,3,4} increases to a next higher allowed value.

Here, HARQ_ID_ref refers to the ID of a HARQ process of a UL-SCH in reference subframe nref. Reference subframe nref is determined as follows.

If the UE receives a UL grant in subframe ng, subframe nw is the most recent subframe before subframe ng-3 in which the UE has transmitted a UL-SCH using the Type 1 channel access procedure.

If the UE performs transmission including the UL-SCH without gaps starting from subframe n0 and in subframes $n_0, n_1, \ldots, n_w$, reference subframe nref is subframe n0.

Otherwise, reference subframe nref is subframe nw.

When the UE is scheduled to perform transmission including a PUSCH without gaps in a set of subframes $n_0, n_1, \ldots, n_{w-1}$ using the Type 1 channel access procedure, if the UE is unable to perform any transmission including the PUSCH in the subframe set, the UE may maintain the value of CWp for every priority class $p \in \{1,2,3,4\}$ without any changes.

If the reference subframe for the last scheduled transmission is also nref, the UE may maintain the value of CWp for every priority class $p \in \{1,2,3,4\}$ to be the same as that for the last scheduled transmission including the PUSCH using the Type 1 channel access procedure.

If CWp=CWmax, p, the next higher allowed value for adjusting CWp is CWmax,p.

If CWp=CWmax, p is consecutively used K times to generate Ninit, CWp is reset to CWmin, p only for the priority class p for which CWp=CWmax, p is consecutively used K times to generate Ninit. In this case, K is selected by the UE from a set of values {1, 2, 8} for each priority class $p \in \{1, 2, 3, 4\}$ 2.3.3. Energy Detection Threshold Adaptation Procedure A UE accessing a carrier on which LAA Scell(s) transmission(s) are performed may set an energy detection threshold (XThresh) to be less than or equal to a maximum energy detection threshold XThresh_max.

The maximum energy detection threshold XThresh_max is determined as follows.

If the UE is configured with a higher layer parameter "maxEnergyDetectionThreshold-r14', XThresh_max is set equal to a value signaled by the higher layer parameter.

Otherwise,

The UE shall determine X'Thresh_max according to the procedure described in section 2.3.3.1.

If the UE is configured with a higher layer parameter 'maxEnergyDetectionThresholdOffset-r14'

XThresh_max is set by adjusting X'Thresh_max according to an offset value signaled by the higher layer parameter.

Otherwise,

The UE sets $X_{Thresh\_max} = X'_{Thresh\_max}$.

2.3.3.1. Default Maximum Energy Detection Threshold Computation Procedure

If a higher layer parameter 'absenceOfAnyOtherTechnology-r14' indicates TRUE, $$X'_{Thresh\_max} = \min\left\{ \begin{array}{l} T_{max} + 10dB, \\ X_r \end{array} \right\}.$$

Xr is a maximum energy detection threshold defined by regulatory requirements in dBm when such requirements are defined. Otherwise, $X_r = T_{max} + 10$ dB.

Otherwise, $$X'_{Thres\_max} = \max\left\{ \begin{array}{l} -72 + 10 \cdot \log 10(BW \text{ MHz}/20 \text{ MHz}) dBm, \\ \min\left\{ \begin{array}{l} T_{max}, \\ T_{max} - T_A + (P_H + 10 \cdot \log 10(BW \text{ MHz}/20 \text{ MHz}) - P_{TX}) \end{array} \right\} \end{array} \right\}$$

Each variable is defined as follows:
$T_A = 10$ dB
$P_H = 23$ dBm.
$P_{TX}$ is the set to the value of $P_{CMAX\_H,c}$ as defined 3GPP TS 36.101
$T_{max}(dBm) = 10 \cdot \log 10(3.16228 \cdot 10^*(mW/MHZ) \cdot BWMHz (MHz))$
BWMHz is the single carrier bandwidth in MHz 2.4. Subframe/Slot Structure Applicable to U-band System FIG. 22 is a diagram illustrating a partial transmission time interval (TTI) or a partial subframe/slot applicable to the present disclosure.

In the Rel-13 LAA system, a partial TTI is defined using the DwPTS to make the best use of a maximum channel occupancy time (MCOT) during transmission of a DL Tx burst and support continuous transmission. The partial TTI (or partial subframe) refers to an interval in which a signal is transmitted in a shorter period than the legacy TTI (e.g., 1 ms) in PDSCH transmission.

In the present disclosure, a starting partial TTI or a starting partial subframe refers to a format in which some symbols located at the fore part of a subframe are left blank, and an ending partial TTI or an ending partial subframe refers to a format in which some symbols located at the rear part of a subframe are left blank (whereas a complete TTI is referred to as a normal TTI or a full TTI).

FIG. 22 illustrates various types of partial TTIs. In FIG. 22, the first block represents an ending partial TTI (or an ending partial subframe/slot), the second block represents a starting partial TTI (or a starting partial subframe/slot), and the third block represents a partial TTI (or a partial subframe/slot) where some symbols located at the fore and rear parts of a subframe are left blank. Here, a time interval obtained by removing a portion for signal transmission from a normal TTI is referred to as a transmission gap (Tx gap).

While FIG. 22 is based on DL operation, the present disclosure may be equally applied to UL operation. For example, the partial TTI structure shown in FIG. 22 is applicable to PUCCH and/or PUSCH transmission.

3. Proposed Embodiments

Structural characteristics of the structure proposed by the present disclosure will hereinafter be described with reference to the above-mentioned technical features.

In more detail, embodiments of the present disclosure provide a method for controlling the UE to transmit a PUCCH or PUSCH in an unlicensed band in a wireless communication system including a base station (BS) and the user equipment (UE), and a method for controlling the BS to receive a PUCCH or PUSCH from the BS.

In recent years, the 5R NR (New RAT) system, standardization of which has been discussed in 3GPP standardization organizations, aims to support a plurality of logical network in a single physical system. To this end, the 5R NR system supports various TTIs (Transmission Time Intervals) and/or OFDM numerology (e.g., OFDM symbol duration, subcarrier spacing (SCS)), such that the 5R NR system can support services having various requirements (e.g., enhanced mobile broadband (eMBB), massive machine type communications (mMTC), ultra-reliable low-latency communication (URLLC), etc.).

In addition, data traffic has been rapidly increasing with the advent of smart devices or the like. Accordingly, similar to a License-Assisted Access (LAA) system of the legacy 3GPP LTE system, many developers and companies are conducting intensive research into methods for utilizing and applying the unlicensed band to cellular communication even in NR systems. Specifically, unlike the LAA system that additionally uses the unlicensed band using the licensed band, the NR system aims to support standalone operations for an NR U-Cell (i.e., a new RAT (NR) cell in an unlicensed band). Therefore, the NR system aims to PUCCH or PUSCH transmission from the UE in the NR cell (without using an additional licensed band).

On the other hand, according to regional regulations for the unlicensed band, before a communication node (or an arbitrary communication node) in the unlicensed band transmits signals, there is a need for the communication node in the unlicensed band to perform listen before talk (LBT) or a channel access procedure (CAP) corresponding to a process of determining whether to use channels of other nodes based on energy detection about such channels or the like.

In addition, an operation of confirming whether other communication nodes transmit signals in the LBT operation is defined as carrier sensing (CS). In addition, an example in which it is determined that other communication nodes transmit no signals is defined as clear channel assessment (CCA) confirmation. In LTE systems or NR systems, the base station (BS) and the UE have to perform LBT operation to perform signal transmission in the unlicensed band. In addition, the BS and the UE should fairly compete with other RAT(s) (e.g., Wi-Fi or the like) belonging to the unlicensed band in terms of channel occupancy. For reference, a CCA threshold, which is an energy detection threshold for CCA in Wi-Fi standards (802.11ac), is defined either as −62 dBm for non-WiFi signals or as −82 dBm for Wi-Fi signals. This means that, when signals other than Wi-Fi signals are received at power of 62 dBm or more, the arbitrary communication node does not perform signal transmission to prevent signal interference.

Moreover, according to regional regulations for the unlicensed band, when an arbitrary node transmits signals in the unlicensed band, (i) there is a limitation in occupying the system bandwidth of X % or more, and (ii) there may also occur a Power Spectral Density (PSD) limitation in which the magnitude of transmission (Tx) power for each 1 MHz band is restricted to Y dBm. For example, according to European Telecommunications Standards Institute (ETSI) regulations corresponding to European regulations, X may be set to 80 (X=80) and Y may be set to 10 (Y=10).

Thus, when the UE transmits a PUCCH or PUSCH, the number of exemplary cases in which transmission (Tx) power is restricted by such regulations should be minimized. Thus, the UE has to transmit a PUCCH or PUSCH using a block-interleaved FDMA (B-IFDMA) structure.

In this case, the B-IFDMA structure can be defined as follows. The entire system band includes a plurality of interlaces. When K consecutive resource elements (REs) construct one cluster in a frequency domain, one interlace includes a plurality of clusters. In this case, a plurality of clusters may correspond to a plurality of clusters in which a gap (or interval) between two contiguous clusters is denoted by L REs (or L RBs).

For example, when 100 RBs are present in a 20 MHz system band, the system bandwidth can be classified into 10 interlaces, each of which has a cluster size denoted by one RB (1 RB), and a spacing (or interval) between clusters from among the 10 interlaces is denoted by 10 RBs.

In the following description, the UE can receive a PDSCH scheduled by DL assignment (e.g., DCI contained in PDCCH), and can transmit uplink control information (UCI) such as HARQ-ACK or CSI for the received PDSCH. In this case, PUCCH can be classified into the following PUCCH formats according to a payload size of UCI and a transmission duration time (e.g., the number of PUCCH transmission symbols) of UCI.

(1) PUCCH Format 0
  Supportable UCI payload size: up to K bits (e.g., K=2)
  The number of OFDM symbols constructing one PUCCH: 1~X symbols (e.g., X=2)
  Transmission Structure: The transmission structure is comprised of only UCI signals without DMRS. The transmission structure may be designed to transmit a specific UCI state by selecting/transmitting only one sequence from among a predetermined number of sequences.

(2) PUCCH Format 1
  Supportable UCI payload size: up to K bits (e.g., K=2)
  The number of OFDM symbols constructing one PUCCH: Y~Z symbols (e.g., Y=4, Z=14)
  Transmission Structure: DMRS and UCI may be constructed/mapped in TDM formats in different symbols. UCI may be formed in a shape that is constructed by multiplying a modulation symbol (e.g., QPSK) by a specific sequence. Cyclic Shift/Orthogonal Cover Code (CS/OCC) may be applied to both UCI and DMRS. Therefore, multiplexing between the plurality of UEs can be supported in the same RB.

(2) PUCCH Format 2
  Supportable UCI payload size: more than K bits (e.g., K=2)
  The number of OFDM symbols constructing one PUCCH: 1~X symbols
  Transmission Structure: DMRS and UCI may be constructed/mapped in FDM formats in the same symbol. Transmission of DMRS and UCI may be achieved by applying only Inverse Fast Fourier Transform (IFFT) to coded UCI bits without applying Discrete Fourier Transform (DFT) to the coded UCI bits.

(3) PUCCH Format 3
  Supportable UCI payload size: more than K bits
  The number of OFDM symbols constructing one PUCCH: Y~Z symbols
  Transmission Structure: DMRS and UCI may be constructed/mapped in TDM formats in different symbols, and DFT may be applied to coded UCI bits, such that the transmission structure can transmit signals without multiplexing between the plurality of UEs.

(4) PUCCH Format 4
  Supportable UCI payload size: more than K bits
  The number of OFDM symbols constructing one PUCCH: Y~Z symbols
  Transmission Structure: DMRS and UCI may be constructed/mapped in TDM formats in different symbols, and DFT may be applied to coded UCI bits. In addition, OCC is applied to a front end of DFT, and CS (or IFDM mapping) is applied to DMRS, such that it may be possible to support multiplexing between the UEs.

Based on the above-mentioned technical structures, (i) a flexible OFDM numerology of the NR system, (ii) the B-IFDMA structure for U-band, and (iii) a method for transmitting a PUCCH and PUSCH of the NR system considering CAP (or LBT) operations of the UE will hereinafter be described with reference to the attached drawings.

In the following description, the term "RB (resource block)" may refer to a resource allocation unit on a frequency axis (frequency domain). For example, RB may refer to a unit composed of 12 consecutive resource elements (REs) on the frequency axis (frequency domain) or 12 subcarriers on the frequency axis (frequency domain).

In the following description, the bandwidth part (BWP) may refer to a sub-band that can be used to transmit/receive data in the entire system band.

3.1 Interlace Structure

In accordance with the present disclosure, one interlace resource on the frequency axis (frequency domain) may be defined as a plurality of clusters, each of which has a constant cluster size and a constant cluster interval. Here, when PRB(s) of multiple interlace resource(s) are allocated to PUSCH (or PUCCH) transmission resources, the cluster size and the cluster interval of such interlace resources can be defined as any one of the following cluster sizes (1), (2) and (3) according to OFDM numerology.

(1) Opt. 1: Cluster size: Scalable (e.g., 1 RB), Cluster interval: Scalable (e.g., 10 RBs)
(2) Opt. 2: Cluster size: Scalable (e.g., 1 RB), Cluster interval: Fixed (e.g., 1.8 MHz)
(3) Opt. 3: Cluster size: Fixed (e.g., 180 kHz), Cluster interval: Fixed (e.g., 1.8 MHz)

In this case, the term "Scalable" indicating that the cluster size (or cluster interval) is scalable may mean that the cluster size (or cluster interval) is determined by the number of resources (e.g., subcarriers) in the OFDM grid. In other words, the term "Scalable" may mean that an absolute size (or cluster interval) can be changed according to the applied OFDM numerology. In addition, the term "Fixed" indicating that the cluster size (or cluster interval) is fixed may mean that the cluster size is determined based on absolute values on the frequency axis (frequency domain).

In the present disclosure, the cluster may refer to a set (or aggregation) of consecutive frequency resources in the frequency axis (frequency domain). The cluster size may refer to the size of a frequency domain constructing the cluster (in the frequency domain), and the cluster interval may refer to the distance between contiguous clusters (in the frequency domain).

In more detail, in NR U-band, signal transmission based on multiple clusters for UE/BS may be considered useful by referring to regulations (e.g., restriction that the system bandwidth of 80% or more should be occupied) for bandwidth usage about the unlicensed band and regulations about PSD restriction. In other words, one interlace resource may be defined as a plurality of clusters, each of which has a constant cluster size and a constant cluster interval. In this case, the UE can transmit a PUSCH (or PUCCH) through multiple interlaces in the NR U-band.

Meanwhile, considering that the NR system can support different OFDM numerologies, the cluster size and the cluster interval, that are configured to construct one interlace resource, may also be defined differently. To this end, the following three options can be considered:

1) Opt. 1: Cluster size: Scalable (e.g., 1 RB), Cluster interval: Scalable (e.g., 10 RBs)
2) Opt. 2: Cluster size: Scalable (e.g., 1 RB), Cluster interval: Fixed (e.g., 1.8 MHz)
3) Opt. 3: Cluster size—Fixed (e.g., 180 kHz), Cluster interval: Fixed (e.g., 1.8 MHz)

Considering that one cluster constructs granularity of resource allocation for PUSCH (or PUCCH) transmission and demodulation performance having a predetermined level or more should be guaranteed for each cluster, it may be desirable for the cluster size to be defined in units of RBs.

The cluster interval has been introduced to mainly overcome PSD limitations for each 1 MHz, and it may be desirable for the cluster interval to be defined based on absolute values in the frequency domain. In order to minimize interference of interlace resources having different OFDM numerologies, it may be desirable that the size of the cluster interval be fixed to only one value (regardless of various OFDM numerologies).

FIG. 23 is a conceptual diagram illustrating examples of a cluster size and a cluster interval based on OFDM numerology.

In consideration of the above-mentioned matters, the cluster size and the cluster interval can be established as follows according to the OFDM numerologies, as shown in FIG. 23.

For example, for 15 kHz numerology, the cluster size may be set to 1 RB, and the cluster interval may be set to 1.8 MHz (e.g., 10 RBs). For 30 kHz numerology, the cluster size may be set to 1 RB, and the cluster interval may be set to 1.8 MHz (e.g., 5 RBs).

In contrast, in case of 60 kHz numerology, the 1.8 MHz cluster interval may correspond to 2.5 RBs. Thus, as an exceptional example, the cluster size may be designed to be 0.5 RB. Alternatively, the cluster interval may be designed to be 3.6 MHz (e.g., 5 RBs) corresponding to a multiple of 1.8 MHz.

Alternatively, in case of 60 kHz numerology, the cluster interval may also be set to 2 RBs or 3 RBs close to the 1.8 MHz size (i.e., 2.5 RBs).

The above-mentioned features may be combined with other features of the present disclosure without being co-located with the other features, so that the combined structures and features can be simultaneously used.

3.2. Resource Allocation in Frequency Domain 3.2.1. First Frequency Resource Allocation Method In the first frequency resource allocation method, one interlace resource in the frequency domain may be defined as a plurality of clusters, each of which has a constant cluster size and a constant cluster interval. In addition, when PRBs of multiple interlace resources are allocated to PUSCH (or PUCCH) transmission resources, the BS can allocate frequency resources to the UE using any one of the following four methods (1), (2), (3) and (4).

(1) Opt. 1: In the first option (Opt 1), the BS can divide the entire transmission band into a plurality of interlace resources, and can allocate consecutive interlace indexes to the UE in the interlace index domain.

(2) Opt. 2: In the second option (Opt 2), the BS allocates consecutive RBs (or REs) to the UE in a Virtual Resource Block (VRB) domain, so that the BS can allocate UL signal transmission resources to the UE. In more detail, according to VRB-to-PRB mapping in which consecutive RBs (or REs) in the VRB domain are allocated to consecutive RBs (or REs) of interlace resources in the physical resource block (PRB) domain, the UE can allocate resources to UL signal transmission resources.

In this case, the base station (BS) may determine whether to use VRB-to-PRB mapping through system information, higher layer signaling (e.g., RRC signaling), and/or DCI, and may configure the determined information in the UE.

In addition, data mapping in PRBs corresponding to VRBs may be performed using a frequency-first mode. For example, data mapping in PRBs may be performed in the order of low PRB index→high PRB index.

(3) Opt. 3: In the third option (Opt 3), the BS divides the entire transmission into a plurality of sub-bands, selects (consecutive) sub-band indexes in the sub-band index domain, and allocates (consecutive) interlace indexes in the interlace index domain to the selected sub-bands.

In this case, the size of the sub-band (frequency domain) may be identical or proportional to the cluster interval.

In the third option (Opt 3), the BS can provide the UE with related resource information using two resource indication value (RIV) fields contained in DCI.

(4) Opt. 4: In the fourth option (Opt 4), the BS may divide the entire transmission band into a plurality of sub-bands, may divide each sub-band into a plurality of interlace resources, and may allocate consecutive interlace indexes in the interlace index domain to the UE.

In this case, the size of the sub-band (frequency domain) may be identical to or proportional to the cluster interval.

In the fourth option (Opt 4), the BS can provide the UE with related resource information using as many RIV fields as the number of sub-bands contained in DCI.

For resource allocation based on all of the above-mentioned methods, the BS can transmit DCI including a UL grant to the UE. Alternatively, for resource allocation based on all of the above-mentioned methods, the BS can provide the UE with a combination of RRC signaling information and DCI including the UL grant.

In this case, for a method for allocating consecutive resources (e.g., interlaces, RBs, or REs), the BS can use a resource indication value (RIV) method in which the start point for resource allocation and the length for resource allocation are indicated by promised (or predetermined) values.

However, if the UE transmits data using less frequency resources than the frequency resources allocated for PUCCH/PUSCH transmission (according to U-band characteristics, UE situations, or the like), the UE can select frequency resources utilized for actual signal transmission using any one of the following methods (Opt 1 and Opt 2).

1) Opt. 1: The following steps can be repeated for available frequency resources.

Step 1: In Step 1, an interlace having an earlier index value can be selected with higher priority.

Step 2: In Step 2, a PRB having an earlier index value (in the interlace) can be selected with higher priority.

However, the UE can select frequency resources in different ways according to the number of interlaces used for PUCCH/PUSCH transmission. For example, if only frequency resources corresponding to a single interlace are used for PUCCH/PUSCH transmission, the UE can always use all PRBs contained in the single interlace (without excluding a specific PRB), such that the UE can transmit PUCCH and/or PUSCH using the PRBs. In other words, the UE can perform PUCCH/PUSCH transmission using all of the frequency resources contained in one interlace without performing Step 2.

In another example, assuming that frequency resources corresponding to multiple interlaces are used for PUCCH/PUSCH transmission, only when some PRBs (contained in a specific interlace) are excluded from the specific interlace for the PUCCH/PUSCH transmission and PUCCH/PUSCH resources are constructed, the UE can select frequency resources using Step 1 and Step 2.

2) Opt. 2: (In case of using VRB-to-PRB mapping) VRB having a low index value may be selected with higher priority.

In addition, as a modified example of the above-mentioned method (Opt 4), the BS provides the UE with bitmap information about the sub-band index domain, such that the BS can select/configure (discontinuous) sub-band indexes. Thereafter, the BS can also allocate (consecutive) interlace indexes in the interlace index domain to the selected sub-bands (using the above-mentioned UL grant DCI and so on).

In the LTE eLAA system, the BS has allocated frequency resources to the UE on an interlace basis in consideration of unlicensed band regulations that should occupy the system bandwidth of 80% or more. Similar to LTE eLAA, for PUSCH (or PUCCH) transmission for NR U-band to which the present disclosure is applicable, the BS can allocate frequency resources to the UE on an interlace basis.

However, according to recent unlicensed band regulations, assuming that the transmission band of the corresponding signal is set to 2 MHz or more without occupying the system bandwidth of 80%, temporary transmission of the corresponding signal can newly be allowed. Therefore, a method for supporting fine granularity about frequency-domain resource allocation may be considered in NR U-band in consideration of coexistence with the LTE eLAA system. Fine granularity may have advantages in that various transport block sizes (TBSs) are supported based on standalone operations of the NR U-band. In addition, when frequency resources are allocated in units of interlaces, it is possible to mitigate (or overcome) the shortcoming in that frequency granularity is determined based on the BWP size.

Therefore, the BS can allocate resources required to transmit UL signals in U-band to the UE using the following methods.

For example, the BS can allocate frequency domain resources to the UE using the following mapping methods (i) and (ii). In the first method (i), the BS allocates consecutive RBs (or REs) in the VRB domain to the UE. In the second method (ii), the BS can allocate consecutive RBs (or REs) in the VRB domain to interlace resources in the PRB domain. To this end, the BS and the UE can use VRB-to-PRB mapping in which consecutive RBs (or REs) in the VRB domain are mapped to RBs (or REs) of interlace resources in the PRB domain.

In one example, it is assumed that the entire transmission band is denoted by N RBs, the cluster size is denoted by 1 RB, and the cluster interval is denoted by L RBs. In addition, VRB-to-PRB mapping may be represented using a block interleaver shape in which the number of columns is denoted by ceil(N/L) or floor(N/L). In this case, ceil(X) may refer to a minimum integer of X or greater, and floor(X) may refer to a maximum integer of X or less.

For VRB-to-PRB mapping, the VRB index may be a value that is written in the block interleaver on a row-by-row basis, and the PRB index may be read from the block interleaver on a column-by-column basis (See FIG. 24).

FIGS. 24 and 25 are diagrams illustrating methods for allocating frequency domain resources according to one embodiment of the present disclosure.

Referring to FIGS. 24 and 25, it is assumed that the entire transmission band is denoted by 100 RBs, the cluster size is denoted by 1 RB, and the cluster interval is denoted by 10 RBs. In this case, the VRB index and the PRB index can be mapped to each other as shown in the following Table 15. The operation for allocating the actual data to PRBs corresponding to specific consecutive VRBs according to the VRB-to-PRB mapping method can be carried out according to the order of frequency domain resources. This is because, when the frequency domain orders of data are mixed in a situation in which data obtained by DFT spreading is divisionally transmitted in units of blocks (e.g., B-IFDM), low PAPR characteristics can be damaged.

TABLE 15

| VRB index | 0 | 1  | 2  | ... | 9   | 10 | ... |
|-----------|---|----|----|-----|-----|----|-----|
| PRB index | 0 | 10 | 20 | ... | 100 | 1  | ... |

In another example, (i) the entire transmission band is divided into a plurality of sub-bands by the BS, (ii) consecutive sub-band indexes are selected from among the sub-band index domain by the BS, and (iii) the consecutive interlace indexes in the interlace index domain can be allocated to the selected sub-bands by the BS.

FIG. 26 is a conceptual diagram illustrating a method for allocating frequency domain resources according to another embodiment of the present disclosure.

Referring to FIG. 26, it is assumed that the entire transmission band is denoted by 100 RBs, the cluster size is denoted by 1 RB, and the cluster interval is denoted by 10 RBs. In addition, consecutive sub-bands can be selected/set from among the 10 sub-bands by a field of RIV 1 (included in UL grant DCI). Thereafter, the BS can allocate/set consecutive interlace indexes in the interlace index domain in the selected sub-bands using the RIV 2 field (included in UL grant DCI).

According to the above-mentioned operation, the base station (BS) may allow the UE to perform data transmission in some of the entire band. Therefore, the above-mentioned resource allocation method is beneficial to FDM communication between data segments having different BWP sizes.

The above-mentioned features may be combined with other features of the present disclosure without being co-located with the other features, so that the combined structures and features can be simultaneously used.

3.2.2. Second Frequency Resource Allocation Method

In the present disclosure, one interlace resource in the frequency domain may be defined as a plurality of clusters, each of which has a constant cluster size and a constant cluster interval. When PRBs in the plurality of interlace resources are allocated to PUSCH (or PUCCH) transmission resources, the BS can additionally provide the following information about the bandwidth (BW).

(1) Reference BW for Interlace Configuration

A reference BW may refer to a reference bandwidth (BW) in which interlace resources are defined, and the reference BW may be commonly promised or configured in UEs.

Information about the reference BW may be indicated by system information or higher layer signaling.

(2) UL BWP

UL BWP may refer to a bandwidth part (BWP) through which the UE performs actual UL transmission.

UL BWP may be indicated by system information or higher layer signaling.

(3) Active Sub-band(s) or De-active Sub-band(s)

Here, active sub-band(s) or de-active sub-band(s) may refer to sub-bands that can be used (or cannot be used) for actual data transmission in the reference BW or the UL BWP.

Information about the Active Sub-bands or De-active Sub-bands (3) may be indicated by higher layer signaling and/or DCI.

In the above-mentioned constituent elements, the reference BW may include a UL BWP, and the UL BWP may include one or more sub-bands.

In the present disclosure, each sub-band may be identical in size to the bandwidth scheduled for LBT (or CAP) execution.

Here, the format of indicating sub-bands that can be used (or cannot be used) for actual data transmission may be implemented using the bitmap scheme.

In the NR system according to one embodiment of the present disclosure, UL BWP scheduled to perform actual UL transmission for each UE may be configured differently. In this case, when the interlace resource structure is defined for each UL BWP, it may be difficult to support multiplexing between UL transmission signals that are transferred from different UL BWPs.

Therefore, the present disclosure provides a method for defining interlace resources for the reference BW that is commonly promised or configured in UEs, and a method for allowing the UE to perform actual UL transmission to be performed only within the UL BWP. In addition, even in the UL BWP, in order to protect data transmission of other UEs having different UL BWPs, the BS can inform a specific UE of information about sub-bands (that can be used (or cannot be used) for actual UL transmission) using higher layer signaling and/or DCI.

As a result, the UE can transmit a PUCCH or PUSCH to the BS through a predetermined frequency band contained in the unlicensed band (U-band) upon receiving signaling information from the BS.

The above-mentioned features may be combined with other features of the present disclosure without being co-located with the other features, so that the combined structures and features can be simultaneously used.

3.2.3. Third Frequency Resource Allocation Method

In accordance with the present disclosure, one interlace resource in the frequency domain may be defined as a plurality of clusters, each of which has a constant cluster size and a constant cluster interval. In addition, (consecutive) PRBs (RA Type A) in the transmission band or PRBs (RA Type B) in interlace resources can be allocated to PUSCH (or PUCCH) transmission resources. In this case, the BS can provide the UE with the above-mentioned two RA types (RA Type A and RA Type B) using any one of the following methods (1) and (2).

(1) Opt. 1: In the first method (Opt 1), the BS may (semi-statically) allocate one of RA Type A and RA Type B to the UE through system information or higher layer signaling (e.g., RRC signaling).

(2) Opt. 2: In the second method (Opt 2), the BS can (dynamically) set or indicate one of RA Type A and RA Type B to the UE through higher layer signaling and/or DCI.

In more detail, in the NR system, if waveforms of a PUSCH to be transmitted by the UE correspond to DFT-s-OFDM (Discrete Fourier Transform-spread-orthogonal frequency division multiplexing) in NR (i.e., if the UE transmits a PUSCH using Transform Precoding), the BS can allocate U-band frequency resources to the UE according to a resource allocation method (e.g., RA Type A, or UL RA Type 1 defined in LTE/NR system) for allocating some (consecutive) PRBs in the transmission band.

RA type A may be advantageous over the interlace-based resource allocation method in terms of efficient UL resource utilization and coverage increment based on low PAPR characteristics. Therefore, in the region in which the regulations of occupying the unlicensed band of 80% or the PSD regulations are mitigated, the BS can provide the UE with U-band frequency resources based on the RA Type A method proposed by the present disclosure, without using the interlace-based resource allocation method.

In general, information about whether the BS will allocate either consecutive PRBs or PRBs in interlaces to the UE may be dependent upon the regulation contents of the corresponding unlicensed band. In consideration of the above-mentioned description, the BS can (semi-statically) configure the RA type scheme in the UE through system information (for example, Master Information Block (MIB), System Information Block (SIB), and Remaining Minimum System Information (RMSI)), and/or higher layer signals.

Alternatively, transmission (Tx) power (that is configured in the UE by the BS) may be dynamically configured by the BS (based on communication environments, a resource scheduling method, etc.). For example, when Tx power of the UE is set to a low power level by the BS, the BS can allocate U-band frequency resources to the UE without using the interlace structure. In contrast, when Tx power of the UE is set to a high power level by the BS, the BS has to use the interlace structure (in consideration of U-band regulations), such that the BS can allocate U-band frequency resources to the UE using the interlace structure. In consideration of the above-mentioned description, as an example of resource allocation methods, the BS may dynamically provide the UE with information about whether the BS will use resource allocation of consecutive PRBs or will use resource allocation of PRBs belonging to interlaces through signals such as DCI. For example, the above-mentioned information can be indicated through a separate field (e.g., RA Type indicator field) contained in DCI or a specific combination of legacy fields.

The above-mentioned features may be combined with other features of the present disclosure without being co-located with the other features, so that the combined structures and features can be simultaneously used.

3.2.4. Fourth Frequency Resource Allocation Method

In the present disclosure, one interlace resource in the frequency domain may be defined as a plurality of clusters, each of which has a constant cluster size and a constant cluster interval. PRBs in multiple interlace resources can be allocated to PUSCH (or PUCCH) transmission resources. In this case, during PUCCH/PUSCH transmission, the UE can perform the following frequency hopping methods (1) and (2) in the same interlace resources.

(1) Opt. 1: In the first method (Opt 1), the UE can perform frequency hopping only for PRBs belonging to the corresponding interlace in units of interlaces.

(2) Opt. 2: (In case of using VRB-to-PRB mapping) the UE perform frequency hopping in the VRB domain, such that the UE can transmit PUCCH and/or PUSCH.

In this case, the method for enabling the UE to perform frequency hopping for interlace PRBs can be performed based on a (frequency domain) mirroring method or a frequency hopping offset application method, etc.

In the present disclosure, when frequency hopping for PUSCH (or PUCCH) transmission resources allocated to consecutive frequency resources are used, a frequency hopping interval (or a frequency hopping offset) can be restricted to be valid only when a frequency hopping interval (or a frequency hopping offset) is set to a predetermined band or more (e.g., 2 MHz or more).

In the NR system, the frequency hopping operation can be supported to obtain a frequency diversity gain during PUSCH (or PUCCH) transmission. Similarly, in NR U-band, if PUSCH (or PUCCH) resources are allocated to some PRBs belonging to the interlace, the frequency hopping operation of the UE may still be valid.

However, in consideration of resource allocation in the unlicensed band, the following items contrasted with frequency hopping supported by the NR system can be additionally considered.

Two frequency hops (e.g., a first hop ($1^{st}$ hop) and a second hop ($2^{nd}$ hop)) according to frequency hopping can be configured in a manner that the two frequency hops are present in the same interlace resources.

As a result, increase in interlace resources occupied by PUSCH (or PUCCH), according to the frequency hopping operation from the viewpoint of resource allocation, is prevented. In one example, a method for performing frequency hopping about PRBs contained in the corresponding interlace on an interlace basis, or a method for performing frequency hopping about the VRB domain (during VRB-to-PRB mapping) may be considered.

FIG. 27 is a conceptual diagram illustrating a method for performing frequency hopping of the UE in an unlicensed band according to the present disclosure.

Referring to FIG. 27, it is assumed that all PRBs (contained in the interlace) are allocated to Interlace Index 0 and only some PRBs (contained in the interlace) are allocated to Interlace Index 1. In this case, as shown in FIG. 27, frequency hopping belonging to the corresponding interlace can be applied to PRBs allocated to Interlace Index 1.

The above-mentioned features may be combined with other features of the present disclosure without being co-located with the other features, so that the combined structures and features can be simultaneously used.

3.2.5. Fourth Frequency Resource Allocation Method

In the present disclosure, when the UE transmits a PUSCH (or PUCCH) through the unlicensed band, a minimum number of PRBs can be set to any one of the following values.

(1) Opt. 1: X PRB (e.g., X=2)
(2) Opt. 2: A minimum number of PRBs satisfying Y MHz or more (e.g., Y=2)

In this case, the parameter 'X' may be a predetermined value between the UE and the BS, or may be set to a value configured through higher layer signaling. In addition, the value of X may be configured differently according to OFDM numerologies applied to PUSCH (or PUCCH).

As described above, in accordance with recent unlicensed band regulations, if the transmission band of the corresponding signal is set to 2 MHz or more without occupying the system bandwidth of 80%, temporary transmission of the corresponding signal may be allowed when the transmission band of the corresponding signal is set to 2 MHz or more.

Therefore, a minimum bandwidth for PUSCH (or PUCCH) transmission by the UE may be set to 2 MHz.

In more detail, as an example of a method for satisfying such regulations, at least 2 PRBs can always be allocated for PUSCH (or PUCCH) transmission by the BS, and the band for transmitting 2 PRBs may be set to 2 MHz or more by the BS. In this case, 2 PRBs may be two PRBs in a specific interlace.

In another method for satisfying the above-mentioned regulations, when consecutive PRBs (in the frequency domain) are allocated to transmission resources of PUSCH (or PUCCH) by the BS, a minimum number of PRBs may be defined by the BS such that the band occupied by consecutive PRBs is set to 2 MHz or more according to the applied OFDM numerology. For example, if SCS (subcarrier spacing) is set to 15 kHz, 1 PRB is set to 0.18 MHz so that the BS can allocate at least 12 PRBs to the UE such that a minimum of 12 PRBs can be used as PUSCH (or PUCCH) transmission resources.

The above-mentioned features may be combined with other features of the present disclosure without being co-located with the other features, so that the combined structures and features can be simultaneously used.

FIG. 28 is a flowchart illustrating operations of the user equipment (UE) applicable to the present disclosure. FIG. 29 is a flowchart illustrating operations of the base station (BS) applicable to the present disclosure. FIG. 30 is a flowchart illustrating operations of the user equipment (UE) and the base station (BS) according to the present disclosure.

The UE may receive a synchronization signal/physical broadcast channel (SS/PBCH) block from the BS (a network or a cell) in steps S2810 and S3010. In this case, the BS can support the unlicensed band, and can receive the SS/PBCH block through the unlicensed band.

In response to the above-mentioned operation, the BS (or cell) can transmit the SS/PBCH block to the UE in steps S2910 and S3010. As described above, when the BS supports the unlicensed band, the SS/PBCH block can be transmitted through the unlicensed band.

Subsequently, the UE may establish connection to the BS based on the SS/PBCH block in steps S2810 and S3020. The BS may receive a random access procedure (RACH) preamble (and so on) as a response to the SS/PBCH block, and may establish connection to the UE in steps S2910 and S3020.

The BS may transmit, to the UE, UL resource information required to transmit UL signals through the unlicensed band in steps S2920 and S3030. In response to the above-mentioned signal transmission, the UE can receive the UL resource information from the BS in steps S2820 and S3030.

In this case, as a method for signaling the above-mentioned UL resource information, various methods (e.g., (i) RRC signaling, (ii) DCI, and (iii) a combination of RRC signaling and DCI) can be used and applied.

The UE having received UL resource information may determine UL resources based on a combination of (i) transmission sub-bands obtained by the UL resource information and (ii) transmission interlaces obtained by the UL resource information in step S3040.

The UE can transmit UL signals to the BS through the determined UL resources on the unlicensed band in steps S2830 and S3050. In response to such UL signal transmission, the BS can receive the UL signals from the UE through the above UL resources in the unlicensed band.

The UE can transmit UL signals to the BS through the determined UL resources on the unlicensed band in steps S3130 and S3350. In response to such UL signal transmission, the BS can receive the UL signals from the UE through the above UL resources in the unlicensed band.

In the present disclosure, the UL signal may include a PUCCH signal, a PUSCH signal, and various UL reference signals (e.g., DMRS, CSI-RS, and SRS (Sounding Reference Signal)).

In the present disclosure, one interlace may include a plurality of RBs spaced apart from each other at intervals of a predetermined frequency. In this case, according to the numerology applied to the unlicensed band, a spacing between RBs contained in one interlace may be set to different spacing values.

In one example, if the numerology applied to the unlicensed band is set to 15 kHz SCS (subcarrier spacing), the spacing between RBs contained in one interlace may be set to 10 RBs.

In another example, if the numerology applied to the unlicensed band is set to 30 kHz SCS, the spacing between RBs contained in one interlace may be set to 5 RBs.

In still another example, if the numerology applied to the unlicensed band is set to 60 kHz SCS, the spacing between RBs contained in one interlace may be set to 2.5 RBs, 3 RBs, or 5 RBs.

In one example of the present disclosure, the UL resource information may include (i) first information associated with at least one sub-band from among the entire sub-band (all sub-bands) contained in the unlicensed band, and (ii) second information associated with at least one interlace from among the plurality of interlaces established over the entire sub-band.

In this case, the UL resources determined based on the UL resource information composed of the first information and the second information may correspond to at least one interlace associated with the second information from among the plurality of interlaces contained in the at least one sub-band associated with the first information.

In this case, the first information may correspond to either a resource indication value (RIV) associated with indexes of one or more consecutive sub-bands or bitmap information associated with either indexes of one or more consecutive or discontinuous sub-bands.

In addition, the first information may be received through system information or higher layer signaling.

In addition, the second information may correspond to a resource indication value (RIV) indicating one or more consecutive interlace indexes. Alternatively, the second information may correspond to bitmap information associated with indexes of one or more consecutive or discontinuous interlaces.

In another example of the present disclosure, the UL resource information may include RIVs associated with one or more interlaces from among the plurality of interlaces configured either per the entire sub-band contained in the unlicensed band or per sub-band.

In this case, the UL resource information may include as many RIVs as the number of sub-bands contained in the entire sub-band.

In the present disclosure, the above-mentioned operation for enabling the UE to transmit UL signals through the unlicensed band may include a step of transmitting UL signals through UL resources determined by the UL resource information contained in the unlicensed band, according to a channel access procedure (CAP) for one or more sub-bands determined based on the UL resource information.

In addition, the UE can receive information about all the sub-bands allocated to the UE through system information or higher layer signaling.

In the present disclosure, all of embodiments and examples described above (especially described above in FIGS. 28 to 30) can be combined or coupled to each other in so far as they can be compatible with one another. In other words, the UE and the BS according to the present disclosure can be combined or coupled to each other so that the UE and the BS can perform the combined/coupled operations in so far as the above-mentioned examples (especially described above in FIGS. 28 to 30) can be compatible with each other.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged).

Further, it may be regulated that information indicating whether the proposed methods are applied (or information about the rules of the proposed methods) is indicated to a UE by a predefined signal (or a physical-layer or higher-layer signal) by a BS.

4. Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 31 illustrates a communication system 1 applied to the present disclosure.

Referring to FIG. 31, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

5. Example of Wireless Devices Applicable to the Present Disclosure

FIG. 32 illustrates an example of wireless devices applicable to the present disclosure.

Referring to FIG. 32, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 31.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

6. Examples of Wireless Devices to which the Present Disclosure is Applied

FIG. 33 illustrates another example of a wireless device applied to the present disclosure. The wireless device may be implemented in various forms according to a use-case/service (refer to FIG. 31).

Referring to FIG. 33, wireless devices 100 and 200 may correspond to the wireless devices 100 and 200 of FIG. 32 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 32. For example, the transceiver(s) 114 may include the one or more transceivers 106 and 206 and/or the one or more antennas 108 and 208 of FIG. 32. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 31), the vehicles (100b-1 and 100b-2 of FIG. 31), the XR device (100c of FIG. 31), the hand-held device (100d of FIG. 31), the home appliance (100e of FIG. 31), the IoT device (100f of FIG. 31), a digital broadcast terminal, a hologram device, a public safety device, an MTC device, a medicine device, a fintech device (or a finance device), a security device, a climate/environment device, the AI server/device (400 of FIG. 31), the BSs (200 of FIG. 31), a network node, etc. The wireless device may be used in a mobile or fixed place according to a use-example/service.

In FIG. 33, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 33 will be described in detail with reference to the drawings.

6.1. Example of a Hand-Held Device Applied to the Present Disclosure

FIG. 34 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 34, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 33, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

6.2. Example of a Vehicle or an Autonomous Driving Vehicle Applied to the Present Disclosure FIG. 35 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 35, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 33, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

It will be apparent to those skilled in the art that various modifications and variations can be made in the present disclosure without departing from the spirit or scope of the invention. Therefore, the above-mentioned detailed description must be considered only for illustrative purposes instead of restrictive purposes. The scope of the present disclosure must be decided by a rational analysis of the claims, and all modifications within equivalent ranges of the present disclosure are within the scope of the present disclosure. And, it is apparently understandable that an embodiment is configured by combining claims failing to have relation of explicit citation in the appended claims together or can be included as new claims by amendment after filing an application.

INDUSTRIAL APPLICABILITY

The embodiments of the present disclosure are applicable to various wireless access systems. Examples of the various wireless access systems include 3GPP (3rd Generation Partnership Project) system, 3GPP2 system, and the like. The embodiments of the present are applicable to all technical fields having the various wireless access systems applied thereto as well as to various wireless access systems. Further, the proposed method is applicable to mmWave communication systems configured to use a super-high frequency band. In addition, the proposed method can also be applied to a vehicle communication system or autonomous driving system to which the above-mentioned radio access system is applied.

The invention claimed is:

1. A method for transmitting an uplink signal by a user equipment (UE) in a wireless communication system, the method comprising:
   receiving downlink control information (DCI) including uplink resource information,
   wherein the uplink resource information includes (i) information on an allocation of one or more interlaces and (ii) information on an allocation of one or more resource block (RB) sets; and
   transmitting the uplink signal on RBs included in an intersection of the one or more interlaces and the one or more RB sets in an uplink bandwidth part based on the uplink resource information,
   wherein the one RB set is a frequency band unit on which a channel access procedure is performed, and
   wherein the information on the allocation of one or more interlaces comprises a bitmap for the one or more interlaces, and the information on the allocation of one or more RB sets consist of a resource indication value (RIV) for a starting RB set index and a number of contiguous RB sets.

2. A user equipment (UE) for operating in a wireless communication system, the UE comprising:
   at least one radio frequency (RF) module including a transceiver;
   at least one processor; and
   at least one memory operably connected to the at least one processor, and configured to store instructions so that execution of the instructions enables the at least one processor to perform a specific operation, wherein the specific operation includes:
receiving downlink control information (DCI) including uplink resource information,
wherein the uplink resource information includes (i) information on an allocation of one or more interlaces and (ii) information on an allocation of one or more resource block (RB) sets; and
transmitting the uplink signal on RBs included in an intersection of the one or more interlaces and the one or more RB sets in an uplink bandwidth part based on the uplink resource information,
wherein the one RB set is a frequency band unit on which a channel access procedure is performed, and
wherein the information on the allocation of one or more interlaces comprises a bitmap for the one or more interlaces, and the information on the allocation of one or more RB sets consist of a resource indication value (RIV) for a starting RB set index and a number of contiguous RB sets.

3. The UE according to claim 2, wherein:
the UE communicates with at least one of a mobile terminal, a network, and an autonomous driving vehicle other than a vehicle equipped with the UE.

4. A base station (BS) for operating in a wireless communication system supporting an unlicensed band comprising:
at least one radio frequency (RF) module;
at least one processor; and
at least one memory operably connected to the at least one processor, and configured to store instructions so that execution of the instructions enables the at least one processor to perform a specific operation,
wherein the specific operation includes:
transmitting downlink control information (DCI) including uplink resource information, wherein the uplink resource information includes (i) information on an allocation of one or more interlaces and (ii) information on an allocation of one or more resource block (RB) sets; and
receiving the uplink signal on RBs included in an intersection of the one or more interlaces and the one or more RB sets in an uplink bandwidth part based on the uplink resource information,
wherein the one RB set is a frequency band unit on which a channel access procedure is performed, and
wherein the information on the allocation of one or more interlaces comprises a bitmap for the one or more interlaces, and the information on the allocation of one or more RB sets consist of a resource indication value (RIV) for a starting RB set index and a number of contiguous RB sets.

* * * * *